US009383187B2

(12) United States Patent
Podoleanu et al.

(10) Patent No.: US 9,383,187 B2
(45) Date of Patent: Jul. 5, 2016

(54) METHOD AND APPARATUS FOR PROCESSING THE SIGNAL IN SPECTRAL DOMAIN INTERFEROMETRY AND METHOD AND APPARATUS FOR SPECTRAL DOMAIN OPTICAL COHERENCE TOMOGRAPHY

(71) Applicant: University of Kent, Canterbury, Kent (GB)

(72) Inventors: Adrian Podoleanu, Canterbury (GB); Adrian Bradu, Faversham (GB)

(73) Assignee: UNIVERSITY OF KENT, Canterbury, Kent (GB)

( * ) Notice: Subject to any disclaimer, the term of this patent is extended or adjusted under 35 U.S.C. 154(b) by 0 days.

(21) Appl. No.: 14/440,278

(22) PCT Filed: Nov. 1, 2013

(86) PCT No.: PCT/GB2013/052854
§ 371 (c)(1),
(2) Date: May 1, 2015

(87) PCT Pub. No.: WO2014/068323
PCT Pub. Date: May 8, 2014

(65) Prior Publication Data
US 2015/0292860 A1 Oct. 15, 2015

(30) Foreign Application Priority Data

Nov. 2, 2012 (GB) .................................. 1219761.2
Mar. 12, 2013 (GB) .................................. 1304388.0
Jul. 15, 2013 (GB) .................................. 1312629.7

(51) Int. Cl.
*G01J 3/45* (2006.01)
*G01B 9/02* (2006.01)

(52) U.S. Cl.
CPC ........ *G01B 9/02044* (2013.01); *G01B 9/02004* (2013.01); *G01B 9/02064* (2013.01); *G01B 9/02088* (2013.01); *G01B 9/02091* (2013.01); *G01B 2290/60* (2013.01)

(58) Field of Classification Search
CPC ............ G01B 9/02; G01B 11/02; G06K 9/40; G01N 21/64
See application file for complete search history.

(56) References Cited

U.S. PATENT DOCUMENTS

2007/0012884 A1* 1/2007 Fishkin .............. G01N 21/6408
250/458.1

(Continued)

OTHER PUBLICATIONS

Podoleanu, A. et. al., "Master-slave interferometry for parallel spectral domain interferometry sensing and versatile 3D optical coherence . . . " Optics Express, vol. 21, No. 16, 2013.

(Continued)

*Primary Examiner* — Tarifur Chowdhury
*Assistant Examiner* — Jamil Ahmed
(74) *Attorney, Agent, or Firm* — Leason Ellis LLP

(57) ABSTRACT

Real-time depth measurements in sensing in spectral domain interferometry and for en-face and cross section image production in optical coherence tomography can operate without any need to linearize the data to maximize the output signal and achieve the theoretical depth resolution. Novel interferometry is disclosed, where parameters of a master interferometer dictate the results in a slave interferometer. The master interferometer can be the same measuring interferometer used in two stages. The master interferometer parameters are at least optical path difference (OPD) or the speed of variation of the OPD in the master interferometer. Coherence gated data are produced from selected axial positions which can be from positive or negative optical path differences, in parallel, enabling generation of en-face (C-scan) OCT images simultaneously from several depths, free from mirror terms, and production of A-scans and B-scan OCT images using plural reflectivity values measured in parallel from different depths within A-scans.

15 Claims, 39 Drawing Sheets

(56) References Cited

U.S. PATENT DOCUMENTS

| | | | |
|---|---|---|---|
| 2007/0046953 A1* | 3/2007 | De Groot | G01B 11/0675 356/512 |
| 2009/0263040 A1* | 10/2009 | Rolland | A61B 5/0059 382/255 |
| 2011/0292400 A1* | 12/2011 | Fleming | A61B 5/0066 356/479 |
| 2012/0188538 A1* | 7/2012 | Patil | A61B 3/102 356/301 |

OTHER PUBLICATIONS

Biedermann B. R et. al. "Real time en face Fourier-domain optical coherence tomography with direct hardward frequency . . . " Optics Letters, The Optical Society, vol. 33, No. 21, 2008.

Zhang, K. et. al. "real-time 4D signal processing and visualization using graphics processing unit on a regular nonlinar-k Fourier-domain . . . ", Optics Express, vol. 18, No. 11, 2010.

* cited by examiner

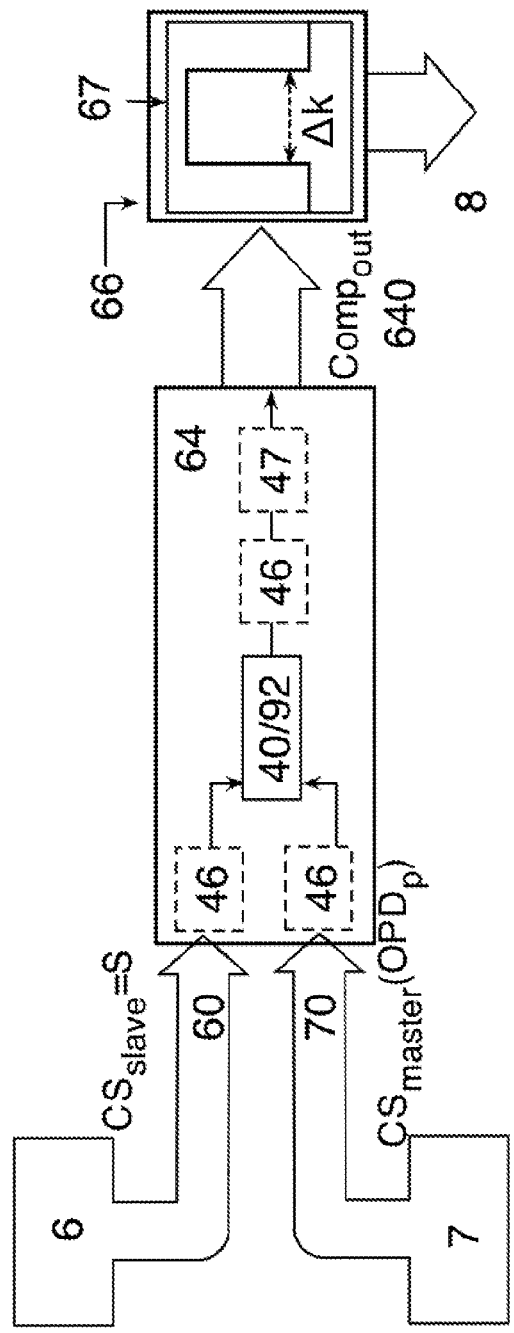
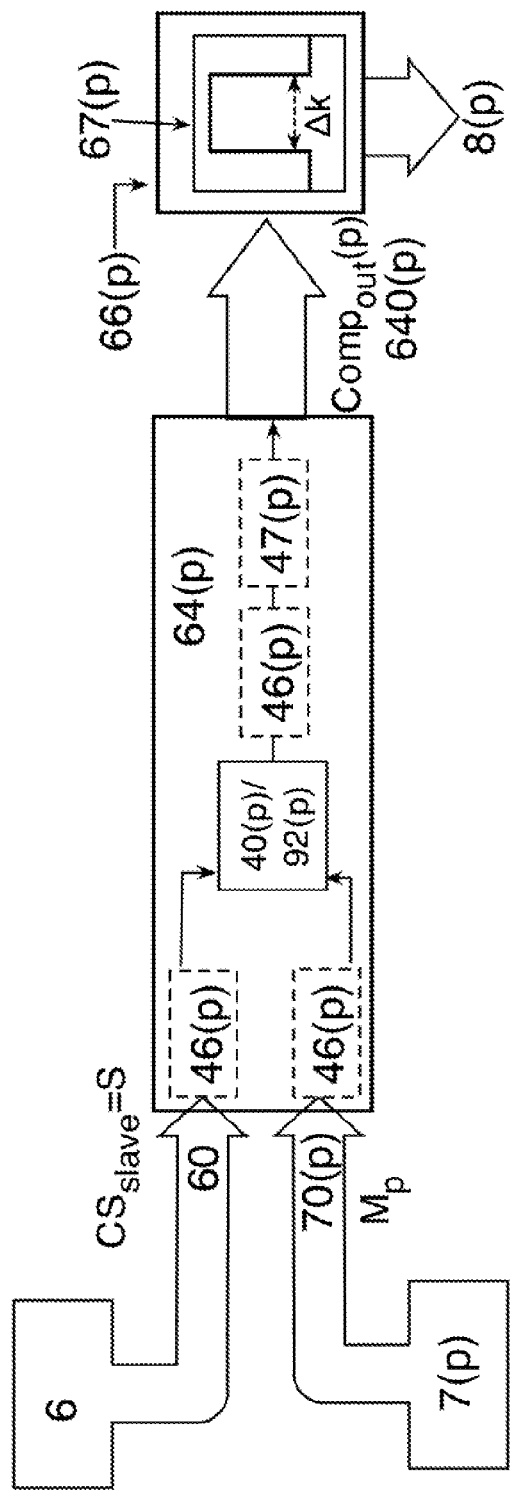
Figure 5a
Figure 5b

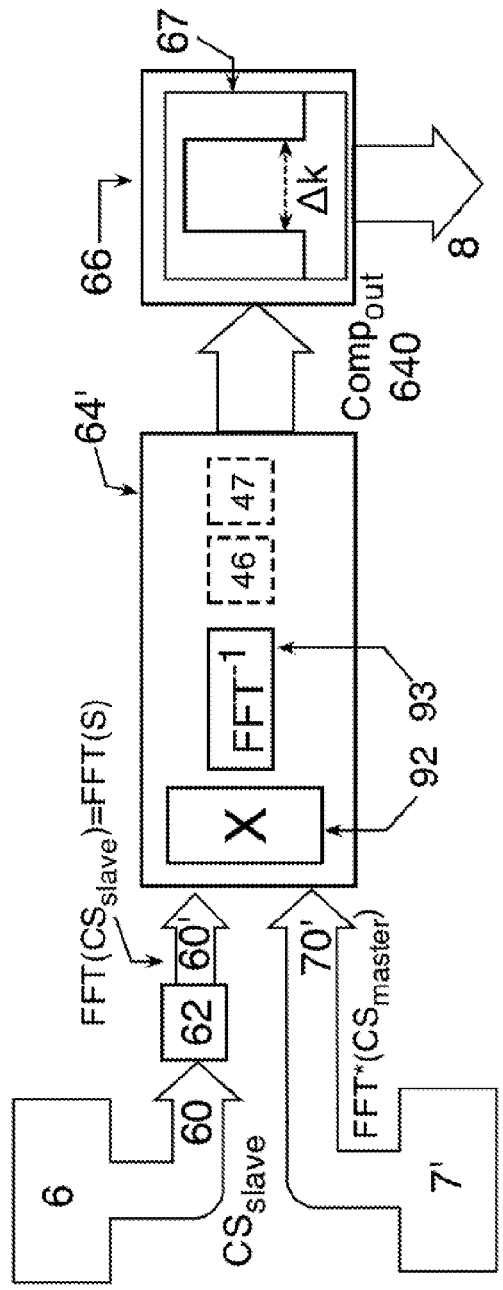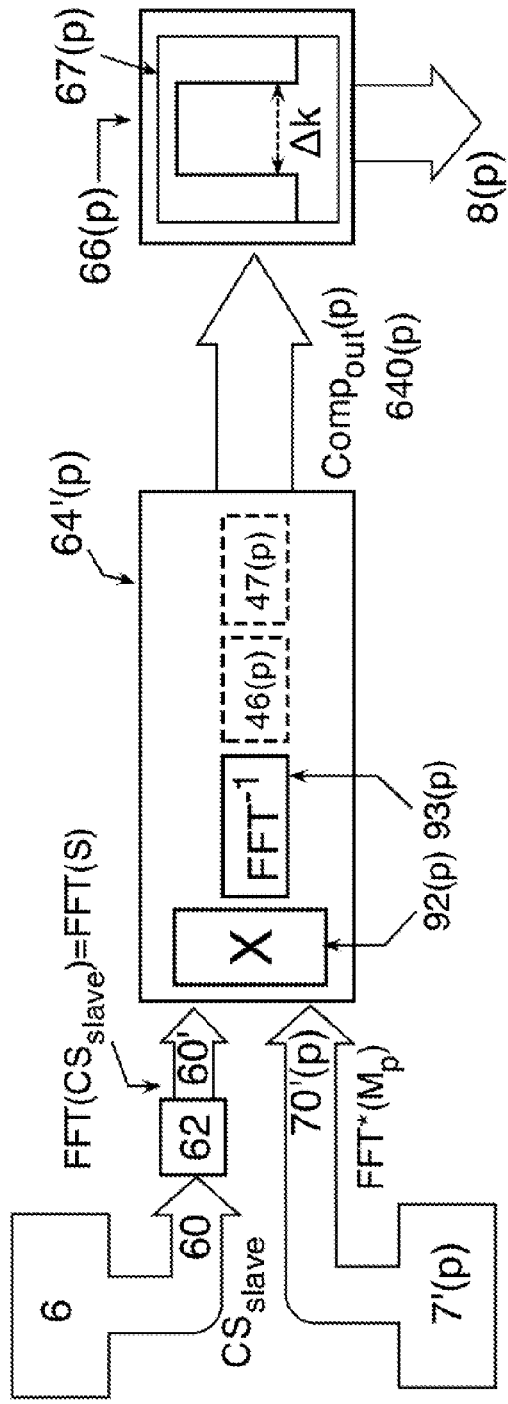
Figure 5'a
Figure 5'b

METHOD AND APPARATUS FOR PROCESSING THE SIGNAL IN SPECTRAL DOMAIN INTERFEROMETRY AND METHOD AND APPARATUS FOR SPECTRAL DOMAIN OPTICAL COHERENCE TOMOGRAPHY

CROSS-REFERENCE TO RELATED APPLICATIONS

This application is a U.S. National Stage Application under 35 U.S.C. §371 of International Patent Application No. PCT/GB2013/052854, filed Nov. 1, 2013, which claims priority to Great Britain Patent Application No. 1312629.7, filed Jul. 15, 2013, Great Britain Patent Application No. 1304388.0, filed Mar. 12, 2013, and Great Britain Patent Application No. 1219761.2, filed Nov. 2, 2012, the contents of which are hereby incorporated by reference in their respective entireties.

1. FIELD OF THE INVENTION

The present invention relates to spectral domain (SD) interferometry and provides apparatuses and methods, which can be used to provide measurement of a signal reflected from an axial position inside an object or of signals reflected from points at several axial positions inside an object. Embodiments are disclosed where axial reflectivity profiles are created with no need for linearization or calibration of data. The method can be used to measure distances, or for sensing applications. Axial reflectivity profiles are constructed from several measurement points acquired and processed in parallel. For imaging technology, the invention discloses apparatuses and methods to deliver in real time, in parallel, several en-face images from different depths in the volume of an object being imaged. Embodiments are disclosed where en-face optical coherence tomography (OCT) images are created with no need for software cuts of the volume of data collected and no need of linearization or calibration of data. Embodiments are disclosed where dispersion is automatically compensated for or compounds are detected based on the spectrum measured at the output of an interferometer.

2. BACKGROUND AND PRIOR ART

SD-interferometry and SD-OCT are technologies based on analyzing the spectrum of the interference signal produced between optical signal from an object under investigation and a local optical reference signal. OCT can produce in real time a cross section image of the object, i.e. a two dimensional (2D) image in the space (lateral coordinate, axial coordinate). SD methods can be implemented in two formats, as described in the article "Optical coherence tomography", by A. Podoleanu, published in Journal of Microscopy, 2012 doi: 10.1111/j.1365-2818.2012.03619.x: (i) spectrometer based (SB) or (ii) by using a tunable laser or a swept source (SS).

OCT schematic diagrams implementing different SD-OCT modalities are presented in FIGS. 1 and 2. They consist in an optical source, 1, a Michelson interferometer, where an optical Splitter 2 and a Reference Mirror, 4, are used to produce a reference beam. A Microscopy Interface optics, 5, is employed to convey light from the Splitter 2 to, and from the Object 3 to be examined, up to a optical spectrum reader, 6, that performs spectral analysis of the interference of light between the reference beam returned by reference mirror 4 and the beam returned by the Object, 3, in the form of an electrical signal, 60, in relation to the spectrum of light at the interferometer output. The path traversed by the object wave from the splitter 2 to the object 3 and back represents the object path length, OPL. The path traversed by the reference wave from 2 to 4 and back represents the reference path length, RPL. An optical path difference (OPD) in the interferometer is defined as OPD=(OPL−RPL). The interface optics 5 contains a transversal scanning unit, 51, consisting in one or two transversal scanners, 511 and 512 to scan the object beam laterally over the object 3. The interference signal resulting from the superposition of the object and reference beams is filtered spatially in the interface optics 5 by other elements in 52, such as lenses, converging mirrors, pinhole (not detailed) before being sent to the optical spectrum reader unit 6.

For those skilled in the art it should be obvious that this is a generic scheme describing the principle of spectral domain interferometry (SDI) equipped with lateral scanning to perform OCT. In practice, fibre optics can be used, to convey light from 5 to 6, in which case the fibre performs the role of the pinhole 52. The splitter 2 can also be implemented in fibre. Also, a reference beam can be provided by light recirculation between optical splitters, as shown in FIG. 17. Obviously, other interferometers can be used as well.

Mechanical scanning of the OPD in time domain (TD)-OCT is replaced by reading the charges on the array in the spectrometer 61 in SB-OCT in FIG. 1 or by tuning the frequency of the laser source 12, in SS-OCT in FIG. 2.

2E points are sampled from the spectrum, either by using 2E pixels on the linear camera in the spectrometer, in case of the SB-SDI or by tuning the emission of the tuning source 12 in at least 2E resolvable spectral points in the case of SS-SDI.

The depth resolution is determined in both cases by the coherence length, cl, calculated by using the full width at half maximum (FWHM) of the spectrum bandwidth, Δλ, of the optical source 11 in SB-SDI or by using the tuning bandwidth Δλ of the SS 12 in SS-SDI, as cl∼$\lambda^2$/Δλ, where λ is the central wavelength. Parameters cl and 2E are shown as determining the axial resolution and the axial range respectively of the A-scan so obtained in FIGS. 1 and 2. In both cases, 2EδX=Δλ and the axial range is proportional with another coherence length, cl∼$\lambda^2$/δλ, where δλ is the bandwidth per photo-pixel of the camera in 61 or the line-width of the SS, 12.

The larger the modulus of OPD, the larger the number of peaks and troughs in the spectrum of the Michelson interferometer output, hence the reference to such spectrum as channelled, as shown in FIG. 3. Using 2E pixels, up to E cycles can be translated out of the signal 60. The optical spectrum reader 6 translates the channelled spectrum (CS), into an electrical signal 60. Irrespective of SB or SS method, the reading of the channelled spectrum at the output of the optical spectrum reader 6 delivers a signal of frequency proportional to the modulus of the OPD:

$$f = U|OPD| \qquad (1)$$

where U is a conversion factor characterizing each SDI set-up.

SD-OCT refers to spectral interrogation of the spectrum at the interferometer output, ie of the CS signal. There are two possibilities, as illustrated in FIGS. 1 and 2. The operation of SD-OCT is based on the demodulation of the optical spectrum output of a low coherence interferometer. Inspecting the prior art in FIGS. 1 and 2, both SDI concepts, SB based SDI and SS based SDI, fit within the same structure, as sketched in FIG. 3(a)'. The spectral analysis of the interference spectrum at the output of the interferometer is performed having different elements in the source 1 and optical spectrum reader 6, either by using a broadband source, 11 in 1 and a spectrometer, 61 in 6 in the SB-SDI case in FIG. 1 or by tuning the optical source 12 in 1 and using a photo-detector 63 in 6, in the SS-SDI case in FIG. 2. The prior art executes spectral analysis using an FFT processor, 62. For the FFT operation to work properly, a calibrator, 620 is necessary to provide the channelled spectrum in equal slots of optical frequency, as explained below.

Spectrometer Based Optical Coherence Tomography (SB-OCT)

In FIG. 1, the optical source 1 is broadband, 11, the Processing Unit 6 employs a spectrometer, 61, usually built using a prism or a diffraction grating, and a linear photo-detector array, using a charge coupled device (CCD) or a complementary metal oxide semiconductor (CMOS) linear camera. Such method is referred to in what follows as spectrometer based (SB)-OCT. The spectrum exhibits peaks and troughs (channelled spectrum) and the period of such a modulation is proportional to the OPD in the interferometer, as shown in the article "Displacement sensor using channelled spectrum dispersed on a CCD array" published by Taplin et al., in Electron. Lett. 29, No. 10, (1993), pp. 896-897. The larger the OPD, the larger the number of peaks in the spectrum, S, 60, as shown in FIG. 3($a$) when using a mirror as Object, 3, for two OPD values, for OPD of ~3cl (left) and ~6 cl (right). The linear camera in the spectrometer 61 needs pixels of sufficient small size, $\delta\lambda$, as shown in FIG. 3($b$) to be able to sample the succession of peaks and troughs in the channelled spectrum. By downloading its charge content, the linear camera in the spectrometer transforms the optical spectrum into an electrical signal in time, as shown in FIG. 3($c$). If multi-layered objects are imaged, such as retina or skin, each layer imprints its own spectrum modulation periodicity, depending on its depth.

The spectrum at the interferometer output, CS, is read in a time T by downloading the charge from the linear camera array, in 61. In doing so, an output signal, 60, is delivered by the Processing unit 6.

A block 62, FFT processor, provides fast Fourier transform (FFT) of the signal, 60, delivered by the linear camera in the spectrometer 61 and translates the periodicity of the signal CS, into peaks of different frequency, related to the OPD. Such a profile is essentially the A-scan profile of the square root of reflectivity in depth, signal 60', as shown in FIG. 3($d$) and at the bottom of FIG. 1, when the Object 3 is a mirror. For sensing applications this is the output of the measurement. For OCT applications, several A-scans for different transversal positions over the object 3, using 51, are required to assemble a cross section OCT image.

Swept Source Optical Coherence Tomography (SS-OCT)

In FIG. 2, the Processing unit 6 employs a Photo-detector, 63 and a Swept source (tuneable laser) 12 is used as optical source 1, operating according to a method referred to as swept source (SS)-OCT.

The illustration in FIG. 3 equally applies to SS-OCT, where $\Delta\lambda$ and $\delta\lambda$ are respectively the tuning bandwidth and linewidth of the swept source 12. The signal 60 is in this case the temporal signal output of 6 when tuning the frequency of the swept source 12. In FIG. 2, the laser line, $\delta\lambda$, of the narrow band swept source 12, as shown in FIG. 3$b$, needs to be much narrower than the spectral distance between adjacent peaks in the channelled spectrum, as shown in FIG. 3$a$. FIG. 3$c$ illustrates the signal output of the Photo-detector block 63 in FIG. 2, when tuning the SS 12. If in the ideal case, the laser line is approximated with a Dirac delta function (infinitesimally small line-width OX), then the photo-detected signal, 60, takes the exact shape of the channelled spectrum. A fast Fourier transform (FFT) of the signal 60 produced by 62 translates the periodicity of the channelled spectrum into peaks of different frequency, related to the OPD. In this way, an A-scan is obtained, as shown in FIG. 3($d$) and at the bottom of FIG. 2, when the Object 3 is a mirror. The time required to tune the wavelength determines the time to produce an A-scan.

Flying Spot Versus Full Field Imaging

Each OCT method can admit different versions of scanning and detection. Any OCT system is equipped with two or three scanning mechanisms. Flying spot implementations use galvo-scanners, resonant scanners, piezo-elements and acousto-optic modulators as Scanning devices 511 and 512 in FIGS. 1 and 2 to deflect the beam over the Object, 3, point by point. Full field implementations use a 2D array, a CCD or CMOS camera, to capture several points in the scene at once. In FIG. 1, when operating in full field, the scanning device 51 between the splitter 2 and the object 3 is reduced to one scanner only, cylindrical optics is used in the Interface Optics 5 to illuminate the object 3 with a line and the camera in the spectrometer 61 is a 2D camera, as explained in "Line-field spectral domain optical coherence tomography using a 2D camera", by J. Wang, C. Dainty, A. Gh. Podoleanu, published in Proc. SPIE 7372, 737221 (2009). A B-scan image is generated with no mechanical scanning, with lateral direction along one direction of the 2D camera in 61 (let us say along the rows) where for each pixel within the line projected on the object 3, the channelled spectrum is projected along the rectangular direction over the 2D camera (columns respectively). For each position of the lateral scanner 511, the 2D array delivers a cross section image (a B-scan), in the plane formed by the line projected on the object 3 and by the depth axis. Then the scanner 511 is moved to a new position to collect the next B-scan.

In FIG. 2, when operating in full field, the lateral scanning device 51 is removed, and the Pinhole in 52 and Photo-detector 63 are replaced with a 2D camera. In full field SS-OCT, processing is performed on each camera pixel to return an A-scan while tuning the Swept Source 12 in FIG. 2. In this way, the whole volume of the object is acquired with no mechanical scanning, as presented in "Evaluation of the signal noise ratio enhancement of SS-OCT versus TD-OCT using a full field interferometer", published by J. Wang, M. Hathaway, V. Shidlovski, C. Dainty, A. Podoleanu, in Proc. SPIE 7168, 71682K (2009). Full field versions are compact solutions, however with the disadvantage of cross talk between pixels in the camera. Full field also provides an alternative for high speed acquisition in SS-OCT without the need of fast tuning rates for the SS. Access to high speed collection of 3D data can be either via increase in the sweep rate, or by combining a fast camera, such as a CMOS, with a slower SS, in a full field SS-OCT set-up, where the tuning speed is dictated by the frame rate of the camera in 63.

Therefore, the scanning elements in 51 and the optical elements in the interface optics 52 should be interpreted generically as covering al these different possibilities, where when flying spot is used, signal is received on a point photo-detector while in the full field case, repetitive deflection of the object beam is replaced with parallel reading of the interference signal by a 1D or a 2D array of photo-detectors. In such cases, the effect of the pinhole in 52 is now replaced, for each photo-site, by the small size aperture of each such photo-site and scanning device 51 moves in front of 6 (function taken by scanning the charge in photodetector arrays). So in the context of this disclosure, scanning means and detecting means should be interpreted generically as accomplishing the same function irrespective if mechanical scanners are used in the flying spot architecture or scanning the charge in linear array or 2D arrays of photo-detectors in the full field architecture.

Irrespective of the different principles of scanning used in SD-OCT, flying spot or full field, signal 60' is produced in prior art via FFT in 62.

Resampling Problem

A first problem of the prior art, presented by SD interferometry is that the data coming from the spectrometer 61 in FIG. 1 and from the photo-detector block 63 (or camera in SS-full field implementations) in FIG. 2 is not provided linearly in optical frequency. This problem requires linearization of data, which takes time. In SB-OCT, the spectrum is not diffracted linearly in optical frequency over the linear camera, 61, used in the spectrometer. In SS-OCT, the variation of the optical frequency of the source 12 is not linear in time. For instance, many swept sources use a Fabry-Perot tunable filter. To achieve high line rate, these filters are excited with sinusoidal signals that leads to nonlinear variation in the frequency of the optical signal so generated. FFT of any data signal 60, which is not organized in linear optical frequency slots leads to smaller amplitude peaks, broader peaks, and to even multiple peaks in the final A-scan, signal 60'.

Therefore, specific FFT signal processing methods, linearization and calibration procedures have been developed and every prior art SD interferometer used in sensing and SD-OCT system uses extra devices, and extra procedures in a calibrator block, 620, to present the data to the FFT processor 62 in equal frequency slots. All these systems add extra cost and extra procedures take time and require significant computing resources.

SD-OCT has now reached over 1 MHz line scan rate, i.e. an acquisition of a spectrum can proceed that fast. However, the numerous steps of complicated real-time data processing procedures cannot be performed at these speeds. Numerical post-processing involves numerous steps, such as data resampling, numerical spectral shaping and apodization, Fourier transformation, and summation over parts of individual A-scans. These take time.

So far, several techniques have been demonstrated to calibrate the interferometric data for both SB-OCT and SS-OCT implementations.

Thus, in SB-OCT, a hardware optics method consists in placing a customized prism in the spectrometer, illustrated by the calibration block 620 in FIG. 1, which distributes the spectrum over the photo-detector array in the spectrometer linearly in optical frequency [Z. Hu and A. V. Rollins, "*Fourier domain optical coherence tomography with a linear-in-wavenumber spectrometer*," Opt. Lett. 32, 3525-3527 (2007)]. Other methods are software based, such as using parametric iteration [B. Park, M. C. Pierce, B. Cense, Seok-Hyun Yun, M. Mujat, G. Tearney, B. Bouma, and Johannes de Boer, "*Real-time fiber-based multi-functional spectral-domain optical coherence tomography at 1.3 µm*," Opt. Express 13, 3931-3944 (2005)] and phase linearization techniques [R. Leitgeb, W. Drexler, A. Unterhuber, B. Hermann, T. Bajraszewski, T. Le, A. Stingl, and A. Fercher, "*Ultrahigh resolution Fourier domain optical coherence tomography*," Opt. Express 12, 2156-2165 (2004)]. In this case, calibration block 620 signifies all extra operations required, resampling, interpolation, linearization, zero padding, etc, performed over the data from the processing block 6 before being applied to the FFT processor 62.

Similarly, to compensate for the swept non-linearity in SS-OCT, several methods have been reported, such as: hardware approaches consisting in clocking the analog to digital converter with an electronic trigger-signal (k-clock) generated by a second interferometer [R. Huber, V. Wojtkowski, and J. G. Fujimoto, "*Fourier Domain Mode Locking (FDML): A new laser operating regime and applications for optical coherence tomography*," Opt. Express 14, 3225-3237 (2006), M. Gora, K. Karnowski, V. Szkulmowski, B. J. Kaluzny, R. Huber, A. Kowalczyk, and M. Wojtkowski, "*Ultra high-speed swept source OCT imaging of the anterior segment of human eye at 200 kHz with adjustable imaging range*," Opt. Express 17, 14880-14894 (2009), J. Xi, L. Huo, J. Li, and X. Li, "*Generic real-time uniform K-space sampling method for high-speed swept-Source optical coherence tomography*," Opt. Express 18, 9511-9517 (2010)] and hardware and/or software approaches consisting in optimizing the waveform applied to the tunable filter [C. Eigenwillig, B. Biedermann, G. Palte, and R. Huber, Opt. Express 16, 8916 (2008), Christoph V. Eigenwillig, Benjamin R. Biedermann, G. Palte and R. Huber, "*K-space linear Fourier domain mode locked laser and applications for optical coherence tomography*," Opt. Express 16, 8916-8937 (2008), I. Trifanov, A. Bradu, L. Neagu, P. Guerreiro, A. Ribeiro, and A. G. Podoleanu, "*Experimental Method to Find the Optimum Excitation Waveform to Quench Vechanical Resonances of Fabry-Perot Tunable Filters Used in Swept Sources*," Photon. Techn. Lett. 23, 825-827 (2011)]. Software approaches consist in re-sampling the data after the analogue-to-digital (A/D) conversion [S. Vergnole, D. Levesque, and G. Lamouche, "*Experimental validation of an optimized signal processing method to handle non-linearity in swept-source optical coherence tomography*," Opt. Express 18, 10446-10461 (2010), Y. Yasuno, V. Dimitrova Vadjarova, S. Makita, M. Akiba, A. Morosawa, C. Chong, T. Sakai, Kin-Pui Chan, M. Itoh, and T. Yatagai, "*Three-dimensional and high-speed swept-source optical coherence tomography for in vivo investigation of human anterior eye segments*," Opt. Express 13, 10652-10664 (2005), B. Chang Lee, M Yong Jeon, and T. Joong Eom, "*k-domain linearization of wavelength-swept laser for optical coherence tomography*," Proc. SPIE 7894, Optical Fibers, Sensors, and Devices for Biomedical Diagnostics and Treatment XI, 789418, Feb. 16, 2011]. Unfortunately, all the methods mentioned above require either additional expensive equipment and/or are computationally expensive and limit the real time operation of the OCT systems.

All extra hardware devices, such as a clock in the swept source 12 driving a dual input digitiser for the signal from 63, or controller of the filter in the swept source 12 or software linearization techniques are included in an extra calibration block 620 in FIG. 2.

The block 620 either raises the cost of SD-OCT systems or slows down the image production. Even after applying linearization and calibration methods using the methods mentioned above, total compensation of nonlinearities is not achievable, irrespective of method, SB or SS.

Time to Produce an En-Face C-Scan Slice and Time to Collect a Volume in SD-OCT

A second problem of the prior art is that it cannot produce a 2D en-face map (C-scan OCT image) in real time. Therefore, prior art requires first to assemble the A-scans into a volume and second, produce software cuts in order to generate C-scans. SB-OCT and SS-OCT set-ups, irrespective of their versions, flying spot or full field, output A-scans, i.e reflectivity profiles along the axial coordinate, perpendicular to the C-scan plane. C-scans present the more familiar orientation as that provided by a microscope (transversal section to the on axis beam). C-scans provide enhanced visualization and additional information on tissue microstructure. They are also useful in the process of deciding where to sample the next high-resolution cross-section B-scan. C-scan sections can be obtained in SB-OCT and SS-OCT only after a whole volume of the Object 3 is acquired, i.e. via a post-acquisition process only. In prior art, in a first step, a series of B-scan OCT images is taken, at different transverse coordinates, $Y_v$, with $v=1, 2, \ldots V$, to sample the whole volume. This is followed by a second step, where the 3D volume so generated is sliced by software to obtain a C-scan. Therefore, in SD-OCT, the time to produce a C-scan is determined by the time required to collect all volume data, $T_V$, plus the processing time necessary to assemble the A-scans into a volume and perform the software cut of such volume, $T_{cut}$. A 1 MHz line rate for instance allows the data for a B-scan image of 500 lines to be acquired in 500 microseconds. If 500 such frames of 500 pixels in depth in the A-scans are acquired, this means a volume of $500^3$ of pixel data captured in $T_V=0.25$ s. This represents the minimum time interval to acquire the data necessary to produce a C-scan image. Extra time, $T_A$ is required to process the data, assemble the A-scans, generate a spatial volume of the sample and produce the, C-scan software cut in the volume, $T_{cut}$. In the prior art, Fourier transformations are used to generate axial reflectivity profiles (A-scans) from the reading of the output spectrum of the interferometer for every given pixel in transversal coordinate, (h, v), h=1, 2, . . . H, v=1, 2, . . . V. The volume is created from assembling together the A-scans for all H and V pixels along the X and Y coordinate respectively. Then, from such a volume, the corresponding en-face slice is software cut. This takes time.

In order to reduce the time for the en-face cut, a solution was proposed in the article "Real time en-face Fourier-domain optical coherence tomography with direct hardware frequency demodulation" published by B. R. Biedermann, W. Wieser, C. V. Eigenwillig, G. Palte, D. C. Adler, V. J. Srinivasan, J. G. Fujimoto, and R. Huber in Optics Letters, Vol. 33, Ho. 21/1, (2008), pp. 2556-2558. In this article, the amplitude of a single frequency band is extracted from the photo-detected signal while tuning the optical frequency of the optical source, by mixing the photo-detected signal with a signal of a particular chosen frequency delivered by a local oscillator. An en-face image contains points at the same axial position. This means that for the points in the en-face image, the same modulation of the channelled spectrum is produced. Points at the same OPD value produce the same number of peaks in the channelled spectrum and so when the channelled spectrum is read by tuning the optical frequency, a particular frequency is obtained for the pulsation of the photo-detected signal. However, this method also requires linearization and calibration of data. This method presents also the disadvantage that supplementary modulation of the swept source is needed to ensure a Gaussian profile for the final coherence gate. If more en-face images are required from more depths, then more filters or mixers need to be assembled in the digital interface. To produce a new en-face image at a different depth, the volume of data need to be read along the axial coordinate to produce the modulation corresponding to the depth wherefrom an en-face image is to be inferred from. If the calibration is imperfect, then the amplitude of the signal and the brightness in the image are lower.

Problem of Mirror Terms

Another disadvantage of the prior art SDI and SD-OCT methods is that the modulation of the channelled spectrum, as shown by equation (1) is the same for positive and negative values of the OPD. Several methods have been devised to recognise modulation for positive OPD values from modulation for negative OPD values, such as using a phase or a frequency modulator or by inserting a dispersing element in the interferometer. Such methods produce full axial range, i.e. allow utilisation of both signs of the OPD. Iterative numerical methods have been proposed in conjunction with a dispersing element along with methods to linearize the data before FFT, such as WO2010/007025A1 by Drexler W., Hover B., Povazay B., Matz G., "Method for image range extension in optical coherence tomography". This patent application describes numerical procedures, which are taking long time to complete and as another disadvantage, they are capable of delivering a cross section image only. When en-face images are required, the time for processing is large, made from three components, time for full axial range reconstruction, time for resampling, interpolation/linearization/calibration, and time for volume construction and en-face cut.

Therefore, a need exists for processing methods in SDI, which do no require calibration or linearization in order to provide instantaneous signal for any given depth in the object, which translates in a need for systems using other functional blocks than Fourier transformation.

There is also a need for methods and systems to decode the channelled spectra faster in SDI applications and produce C-scan (en-face) images scans from different depths quicker in OCT applications.

A need also exists in terms of performing dispersion compensation faster.

A need exists for speeding up the signal processing in dispersive interferometers to provide quicker full axial range cross section imaging. In this respect, a need also exists to perform full axial range en-face imaging.

A need also exists for signal processing methods and devices more suitable to optical spectrometers that provide the spectrum reading in parallel.

3. SUMMARY OF THE INVENTION

With reference to FIG. 3'(a), in prior art, any SDI and SD-OCT system consist in four parts: (i) interferometer and source, grouped in 1,2,4,5; (ii) means to read the spectrum output of the interferometer, 6; (iii) a linearization device or resampling modality for the spectrum data, 620, before being applied to the last component: (iv) a FFT processor, 62, as detailed in FIGS. 1 and 2.

In a first aspect, the present invention is about a novel SDI and SD-OCT system and method where the (iii) and (iv) are replaced with a comparison block, 64 or 64', of channelled spectrum 60 with a master reference signal, 70 or 70', as shown in FIG. 3'(b).

In a second aspect, the present invention discloses a method and apparatuses to implement SDI, where signal is acquired by a slave measuring interferometer from a point in the object at an optical path difference (OPD) value determined by the OPD in a master interferometer. We call this method as Master/Slave Interferometry (MSI). When interrogating an object made from a succession of layers in depth, the slave measuring interferometer selects that depth from the object determined by the OPD in the master interferometer.

To perform recognition of a signal from a particular depth, as targeted by the slave interferometer, the Master/Slave Interferometry method involves comparing the channelled spectra of the master interferometer with the channelled spectrum of the slave interferometer.

In a third aspect, the invention discloses a method and apparatuses to perform the comparison of channelled spectra and provide an output signal proportional to the degree of similarity of the two channelled spectra. Such a comparison method can be based on signal shape comparisons or on pattern recognition procedures. Other possibilities disclosed for comparing channelled spectra are based on correlation or on multiplication followed by rectification. When based on correlation, the invention discloses a method and apparatuses to perform the correlation: (i) point by point, by calculating an integral (summation) of products of the two signals, one delayed, for a limited number of delays or (ii) by using three Fourier transforms.

In a fourth aspect, the invention discloses a method and apparatuses of SDI, where the signal delivered by the master interferometer is replaced with the signal obtained by reading a mask placed in a storage bank of masks.

In a fifth aspect, the invention discloses a method and apparatuses of SDI where the signal delivered by the master interferometer is replaced with the signal obtained by reading numerous masks, and where the masks stored in a storage are acquired using the same (slave) interferometer only. In this aspect, the method refers to an apparatus of spectral interferometry used twice, once, in a preliminary step, to acquire a set data useful for the generation of masks, prior to measurement, and second, in the step of current measurement process.

In a sixth aspect, the invention discloses a method and apparatuses for OCT to generate an en-face OCT (C-scan) image using the principle of master-slave interferometry where the master interferometer, either in physical format or in the form of a mask, determines the OPD (depth) where the en-face OCT image is collected from the object.

In a seventh aspect, the invention discloses a method and apparatuses for OCT to acquire multiple, P, en-face OCT (C-scans) images in parallel from different depths, $z_p$, p=1, 2, ... P in the object investigated, where each C-scan image is delivered by a separate channel, each operating on principles of master-slave interferometry using a specific mask priori recorded for a specific $OPD_p$ value.

In an eighth aspect, the invention discloses a method and apparatuses for OCT to generate a cross section (B-scan) OCT image, composed from lines (T-scans), where each such line (T-scan) is produced by a channel in the OCT system operating on principles of master-slave interferometry where the master interferometer, either in physical format or in the form of a mask being read by a digitiser, or a stored mask, is tuned on a different OPD value.

In a ninth aspect, the invention discloses a method and apparatuses for OCT to generate a cross section (B-scan) OCT image, composed from A-scan lines, where each such line (A-scan) is produced from P points in parallel, where each point is delivered by a channel in the OCT system operating on principles of master-slave interferometry where the master interferometer, either in physical format or in the form of a mask being read by a digitiser, or as a stored mask, is tuned on a different OPD value.

In a tenth aspect, the invention discloses a method and apparatuses for OCT to acquire multiple, V, cross section OCT images (B-scans) produced sequentially, with a B-scan for each different lateral coordinate, $Y_v$, and where each B-scan image is composed from T-scans, where the T-scans are delivered in parallel by P channels, each channel operating on principles of master-slave interferometry using a specific mask recorded for a specific $OPD_p$ value.

In an eleventh aspect, the invention discloses versatile spectral domain interferometry apparatuses, which can provide either a reflectivity profile in depth (A-scan) or a transversal reflectivity profile (T-scan) from the object investigated.

In a twelfth aspect, the invention discloses versatile SD-OCT apparatuses which can slice the volume of an object investigated, either by B-scans produced from A-scans, or by B-scans made from T-scans, or by C-scans made from the same T-scans. In this respect, multiple depth en-face OCT images (C-scans) are generated simultaneously, in parallel.

In a thirteenth aspect, the invention discloses a method and apparatuses to produce en-face OCT images of the flow inside the vessel structure in tissue.

In a fourteenth aspect, the invention discloses masks mentioned in the previous aspects, and procedures to generate signals delivered by such masks, to act as reference channelled spectra to be compared with a measured channelled spectrum.

In a fifteenth aspect, the invention discloses a method and apparatus to produce full axial range cross section (B-scan) OCT images as well as C-scan (en-face) OCT images from both positive and negative OPD values, free from mirror terms.

4. BRIEF DESCRIPTION OF THE DRAWINGS

The novel features which are believed to be characteristic of the present invention, as to its structure, organization, use and method of operation, together with further objectives and advantages thereof, will be better understood from the following drawings in which preferred embodiments of the invention will be illustrated by ways of example. It is expressly understood, however, that the drawings are for the purpose of illustration and description only and are not intended as a definition of the limits of the invention. Embodiments of this invention will now be described in association with the accompanying drawings in which:

Figure 3:
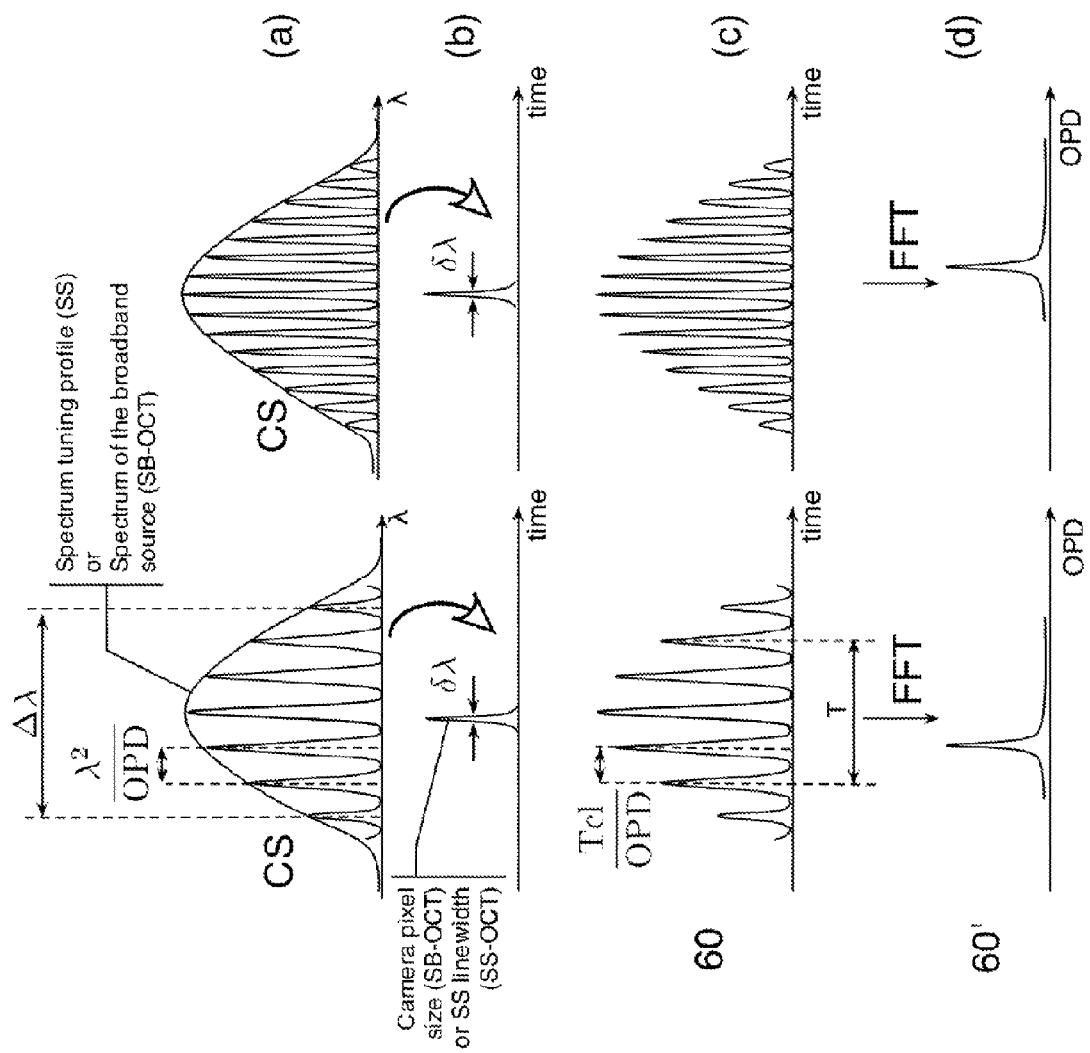
FIG. 3 shows, in diagrammatic form, the spectrum output of the interferometer in any of the embodiments in FIG. 1 or 2 for two OPD values.
Figure 3:
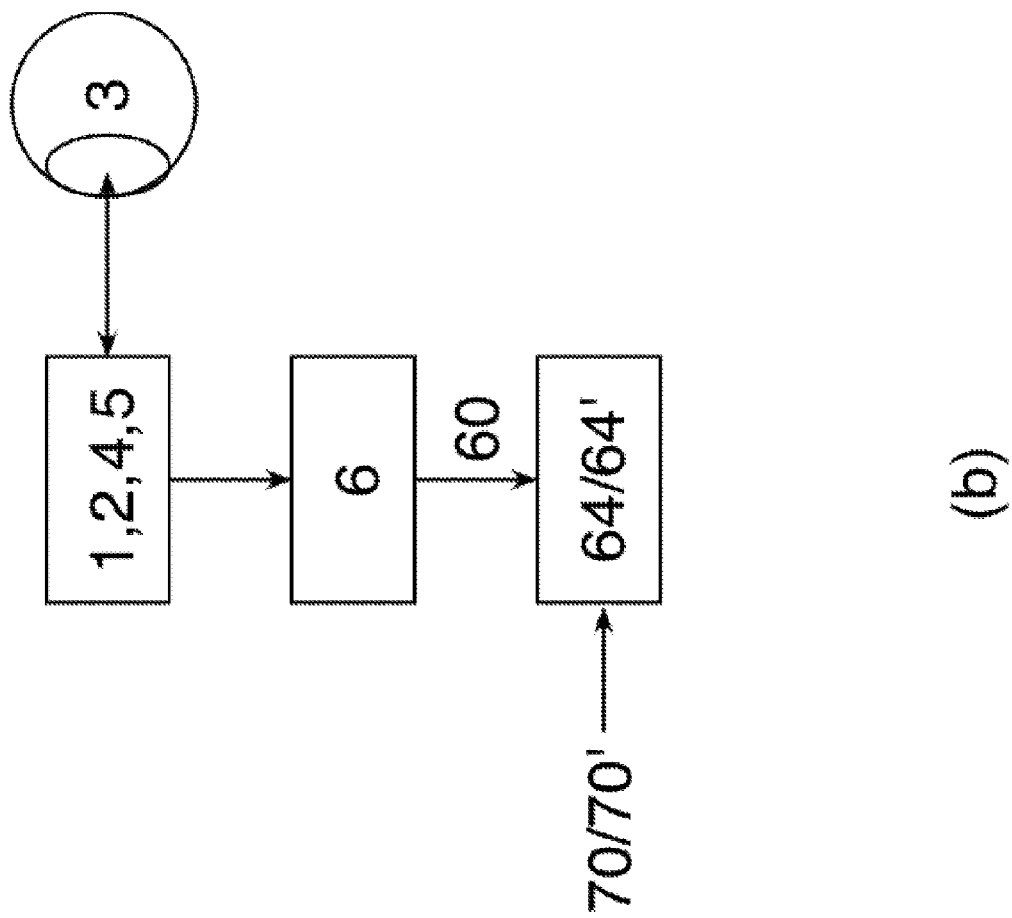
Figure 3:
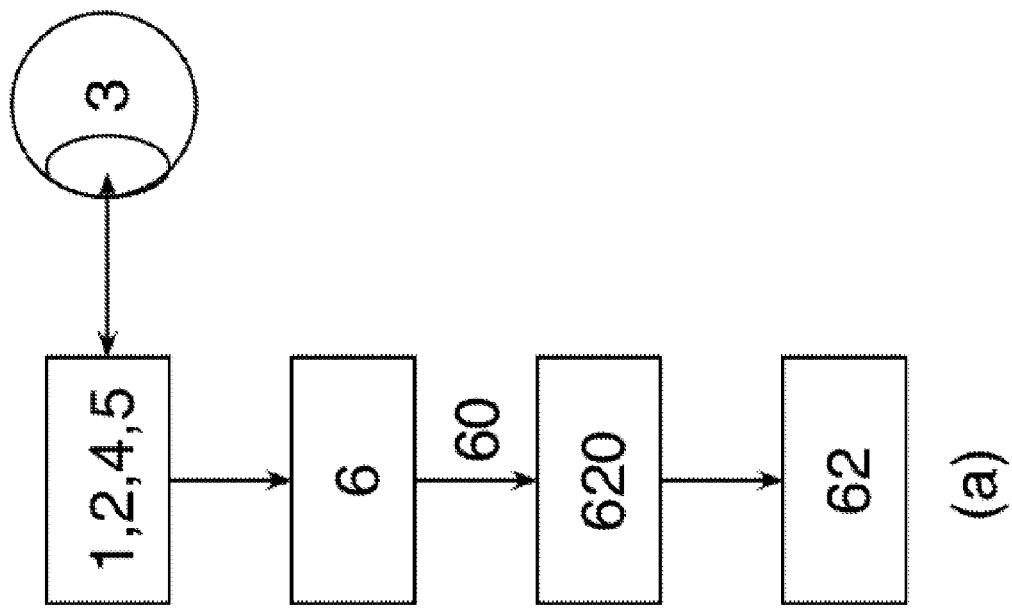

FIG. 3' shows comparatively, simplified diagrams of the prior art in (a) and of the OCT system according to the invention in (b).

FIG. 4a shows in diagrammatic form, an embodiment of the method according to the invention implementing master-slave interferometry.

FIG. 4b shows in diagrammatic form, an embodiment of the method according to the invention implementing parallel master-slave interferometry where the master interferometer is replaced by stored masks.

Figure 4:
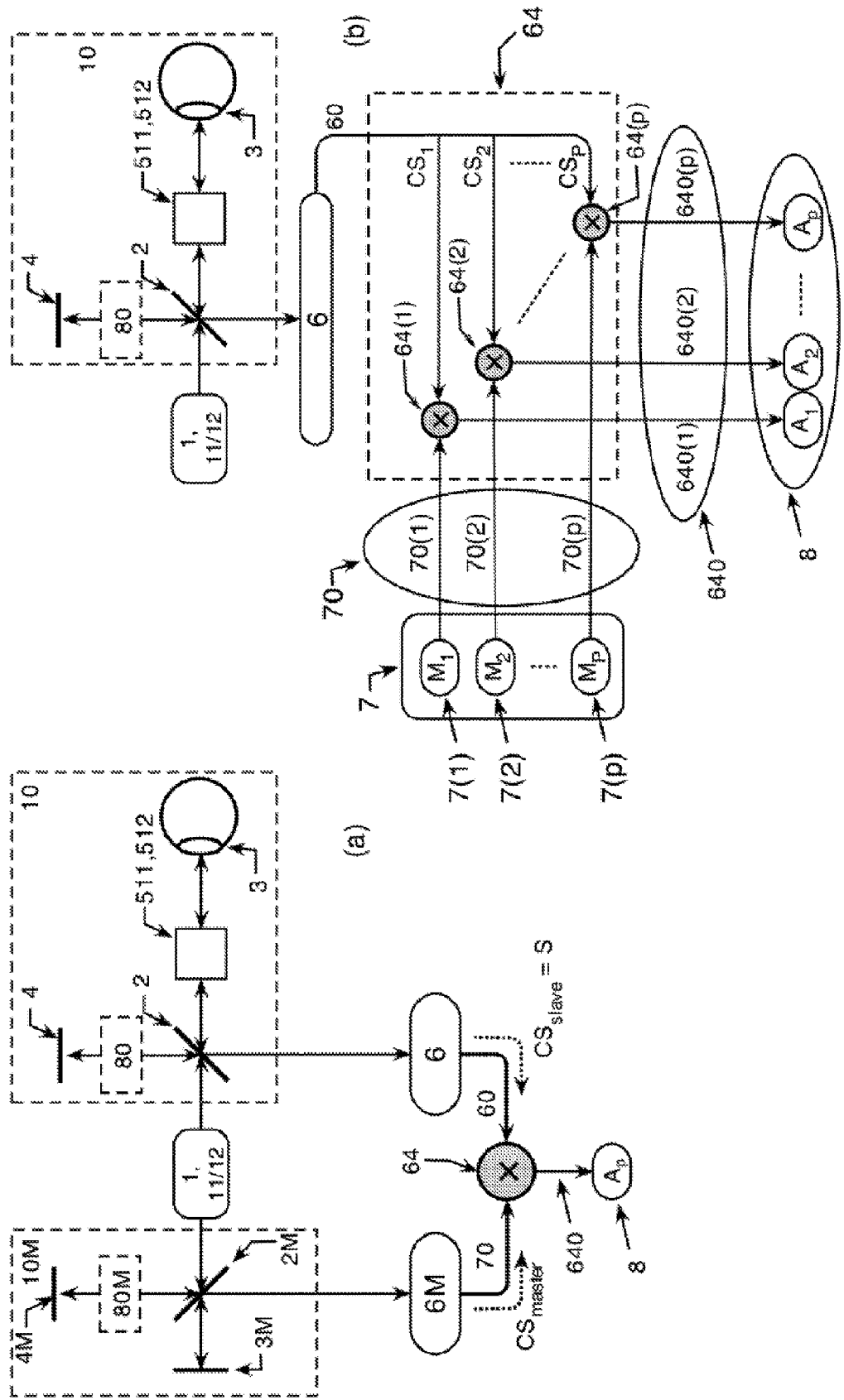
Figure 4:
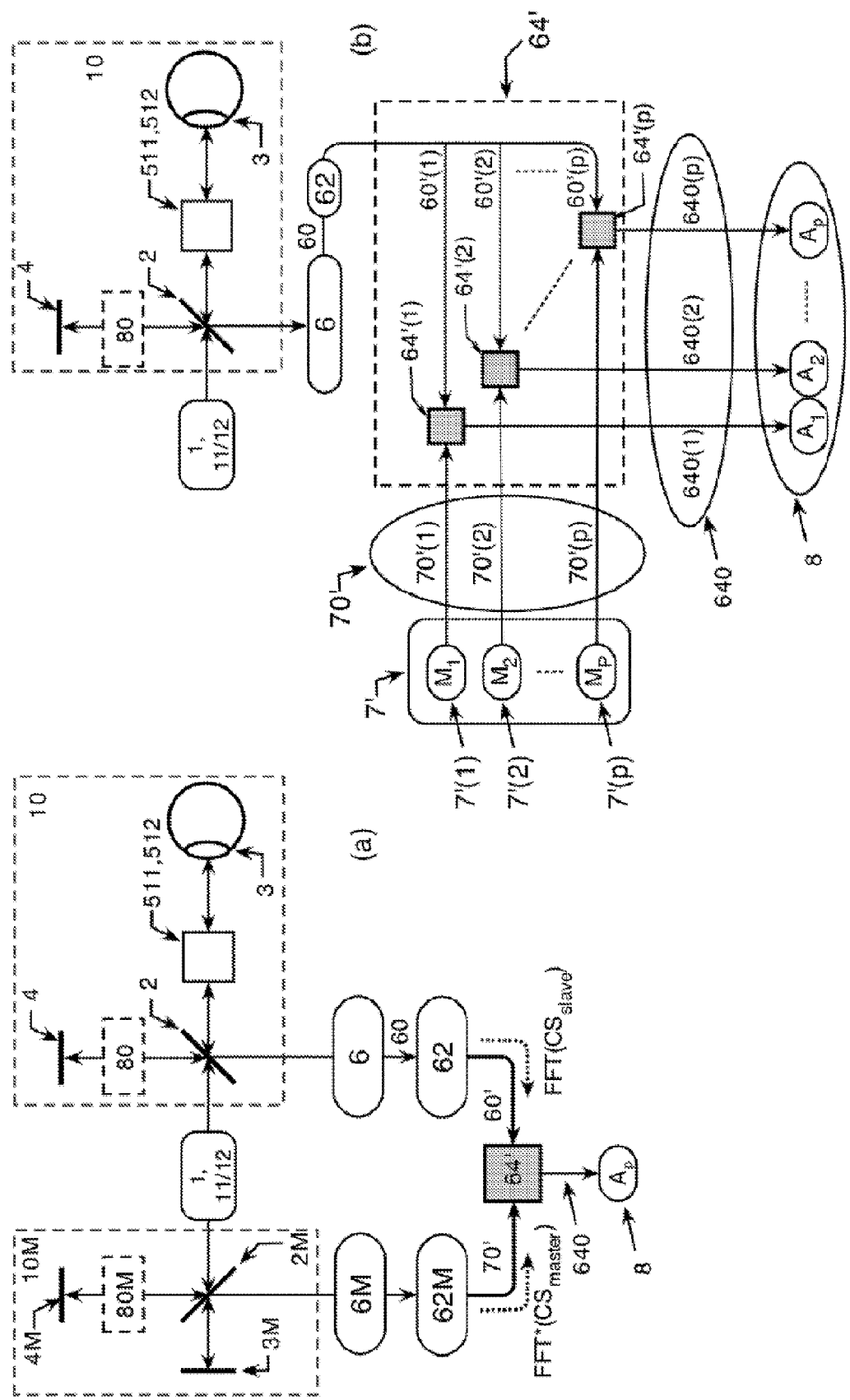

FIG. 4'a shows in diagrammatic form, another embodiment of the method according to the invention implementing master-slave interferometry.

FIG. 4'b shows in diagrammatic form, another embodiment of the method according to the invention implementing parallel master-slave interferometry where the master interferometer is replaced by stored masks.

FIG. 5a shows in diagrammatic form a comparison operation according to the invention applicable to the embodiment in FIG. 4a.

FIG. 5b shows in diagrammatic form a comparison operation applicable to the embodiment in FIG. 4b.

FIG. 5'a shows in diagrammatic form a comparison operation based on correlation calculated via three FFTs, applicable to the embodiment in FIG. 4'a.

FIG. 5'b shows in diagrammatic form a comparison operation based on correlation calculated via three FFTs, applicable to the embodiment in FIG. 4'b.

Figure 6:
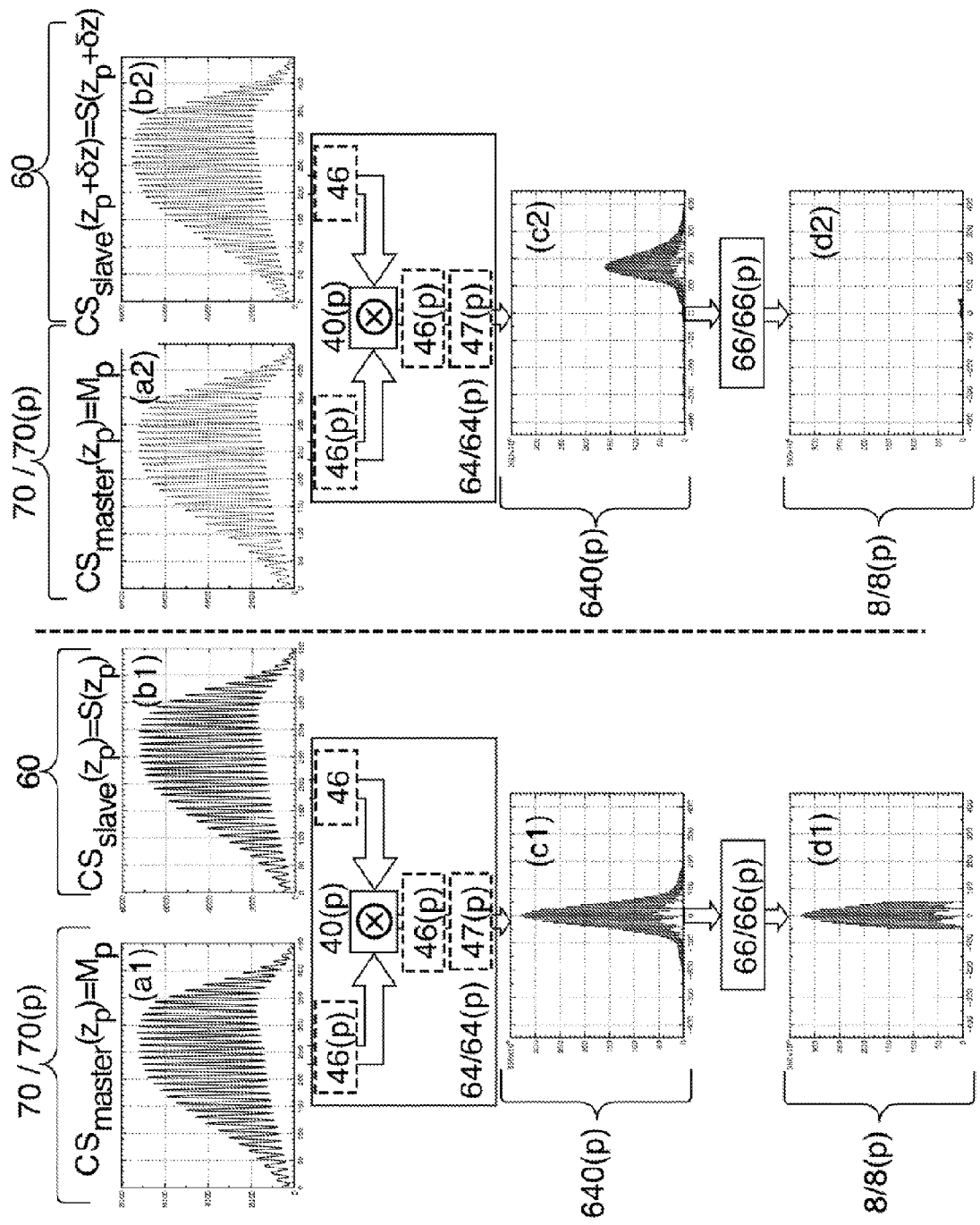
Figure 6:
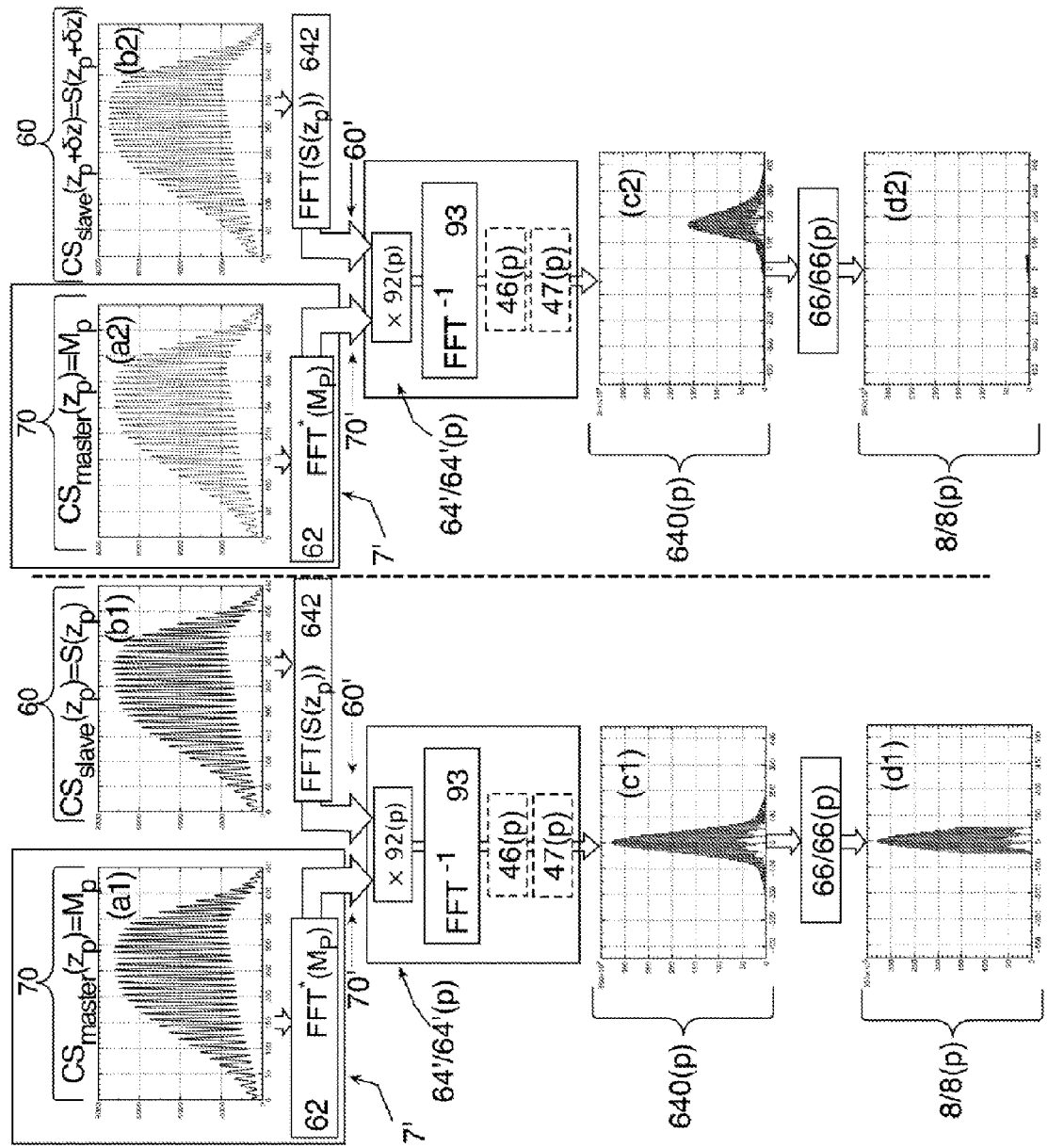

FIG. 6 describes a simulation of the method according to the invention, based on comparison performed via correlation.

FIG. 6' describes a simulation of the method according to the invention where the operation of correlation is replaced with 3 FFT operations.

Figure 7:
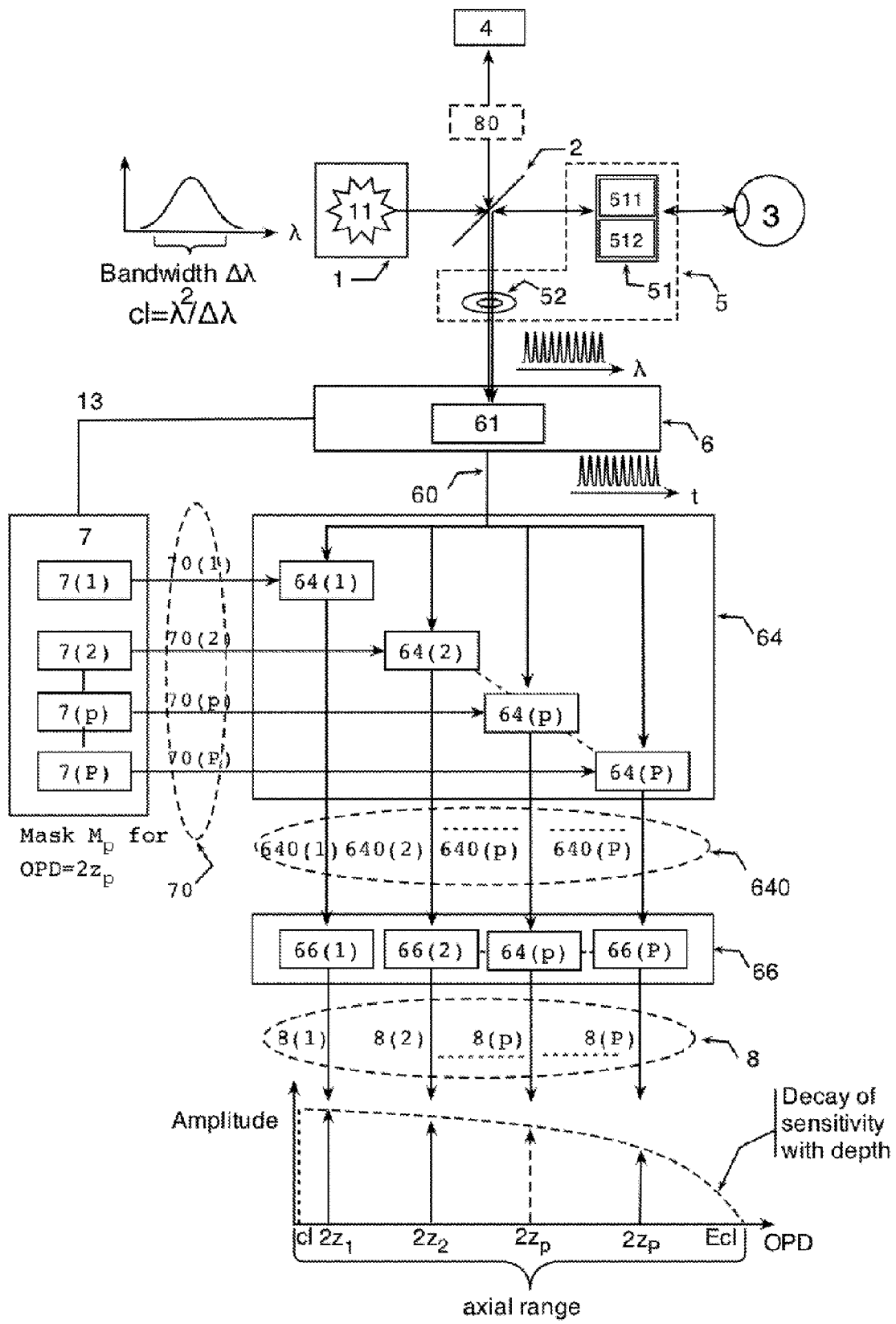
Figure 7:
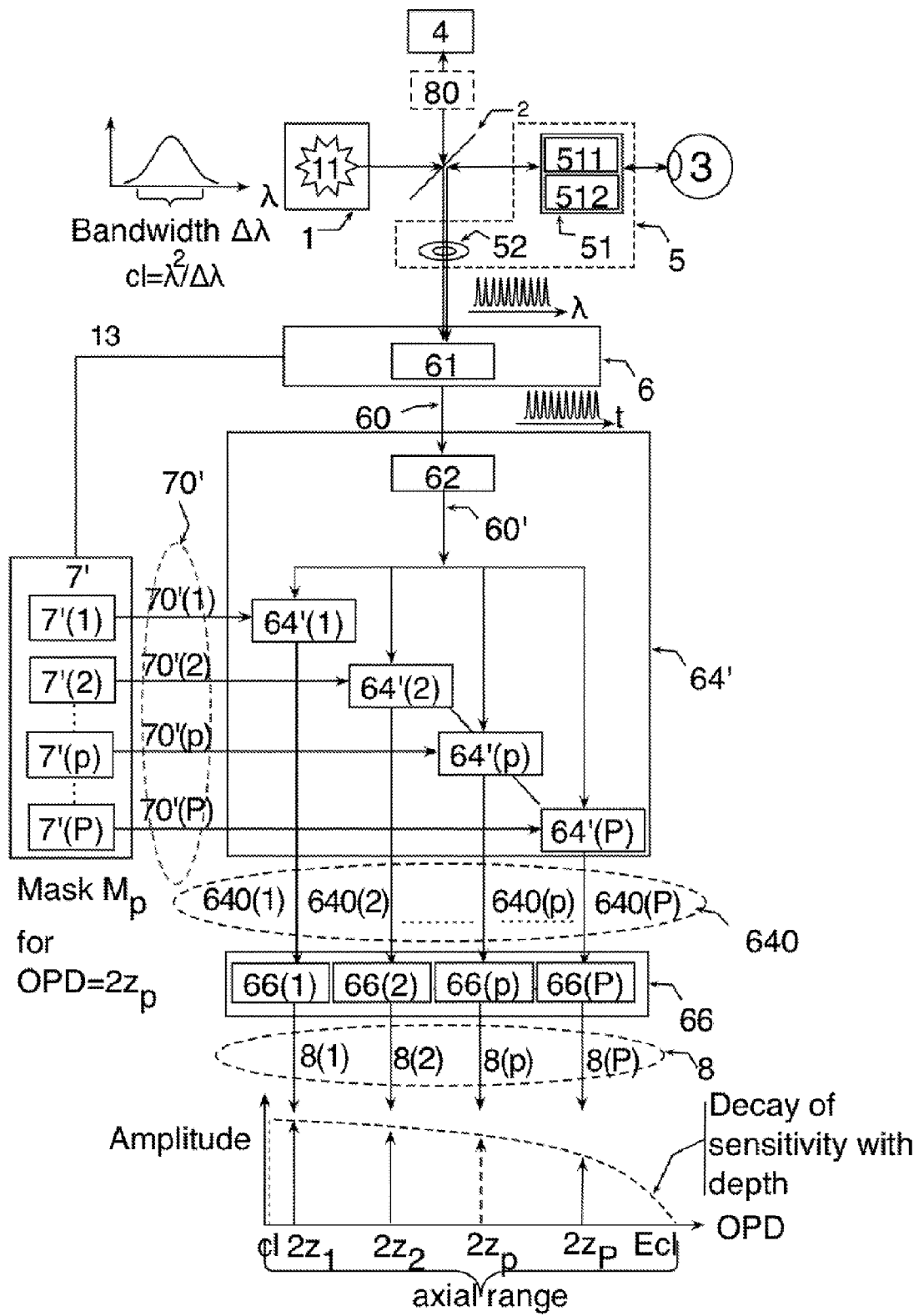

FIG. 7 shows, in diagrammatic form, the main elements of a SB-OCT apparatus according to the invention.

FIG. 7' shows, in diagrammatic form, the main elements of another embodiment of SB-OCT apparatus according to the invention.

Figure 8:
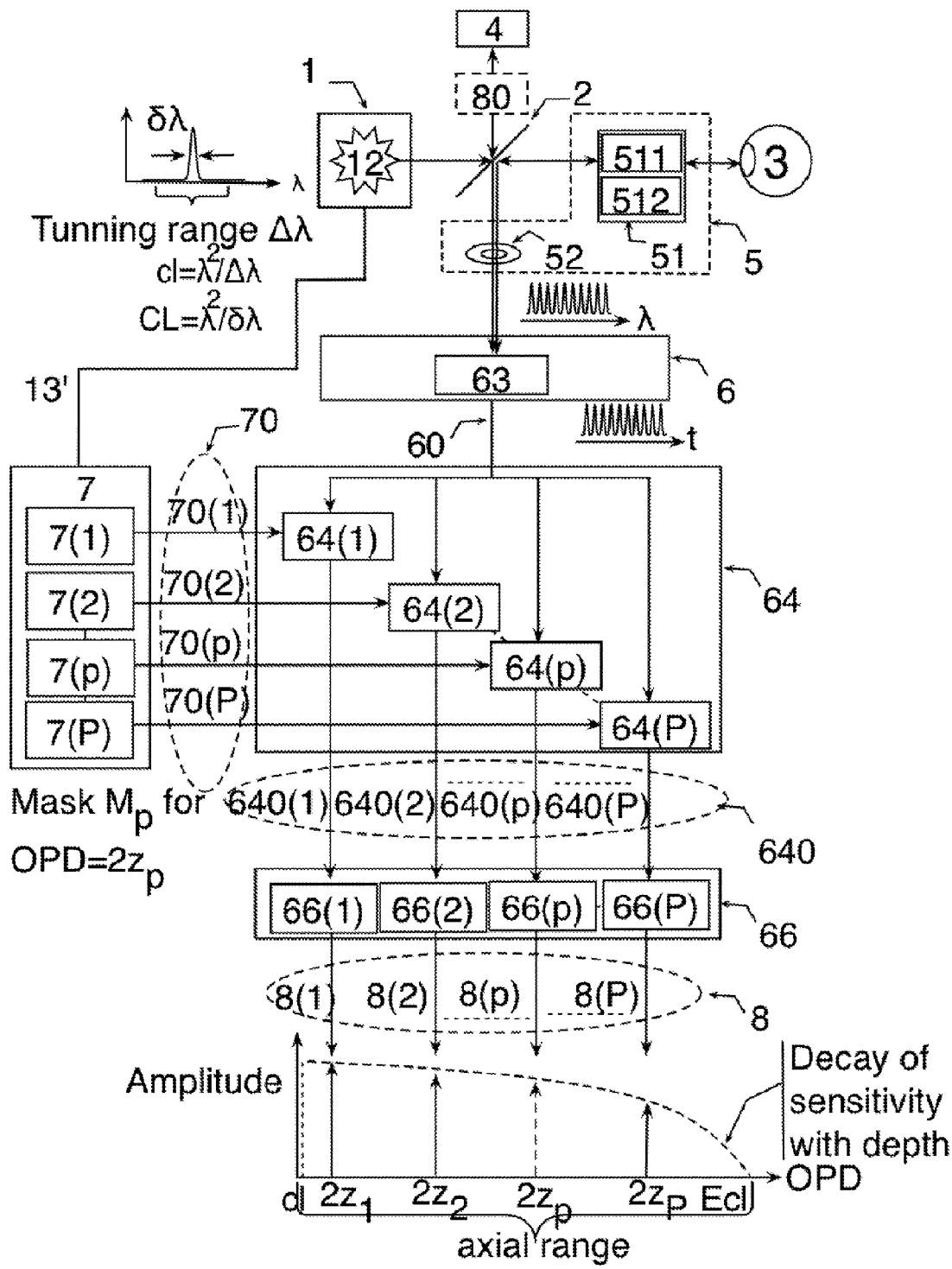
Figure 8:
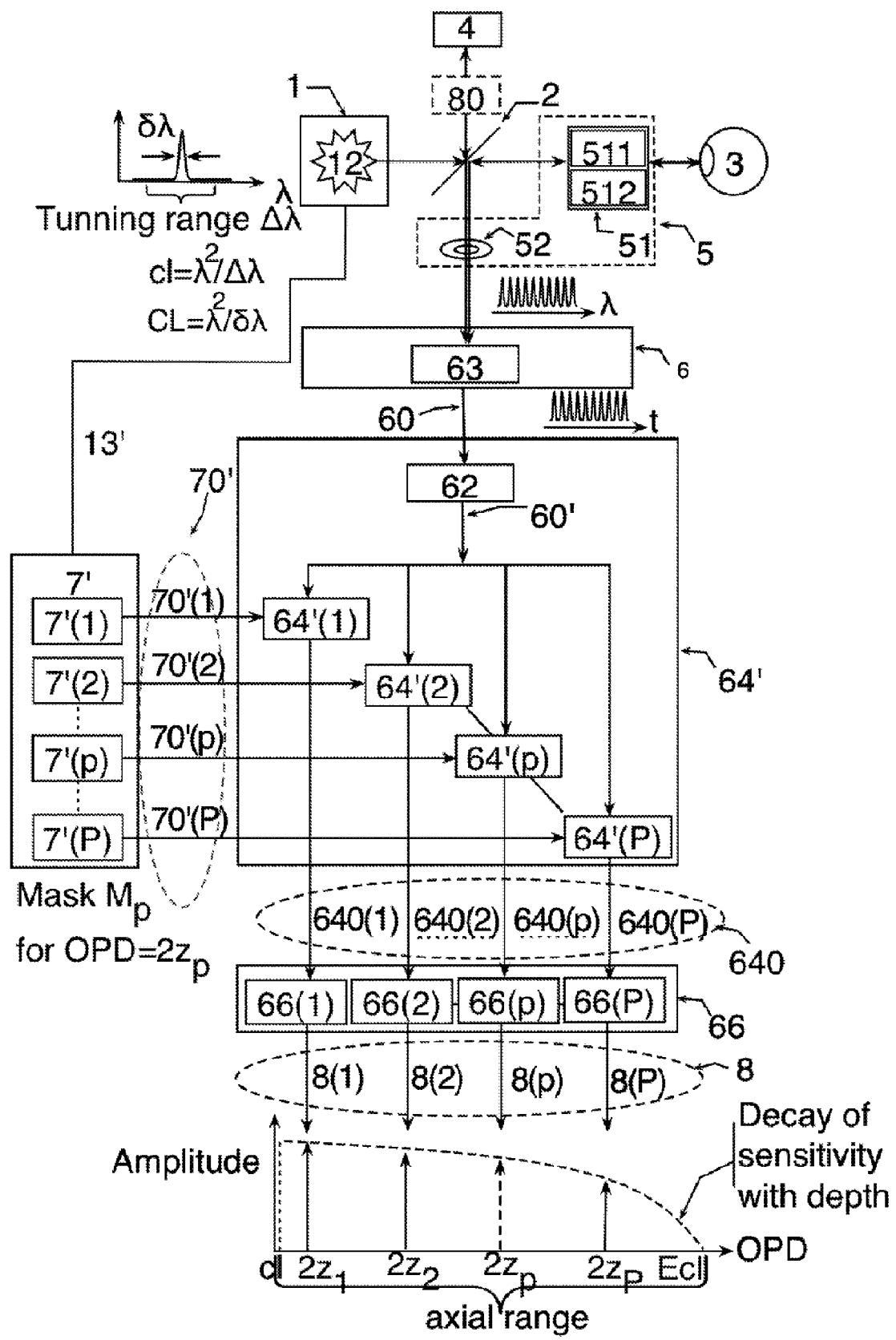

FIG. 8 shows, in diagrammatic form, the main elements of a SS-OCT apparatus according to the invention.

FIG. 8' shows, in diagrammatic form, the main elements of another embodiment of a SS-OCT apparatus according to the invention.

Figure 9:
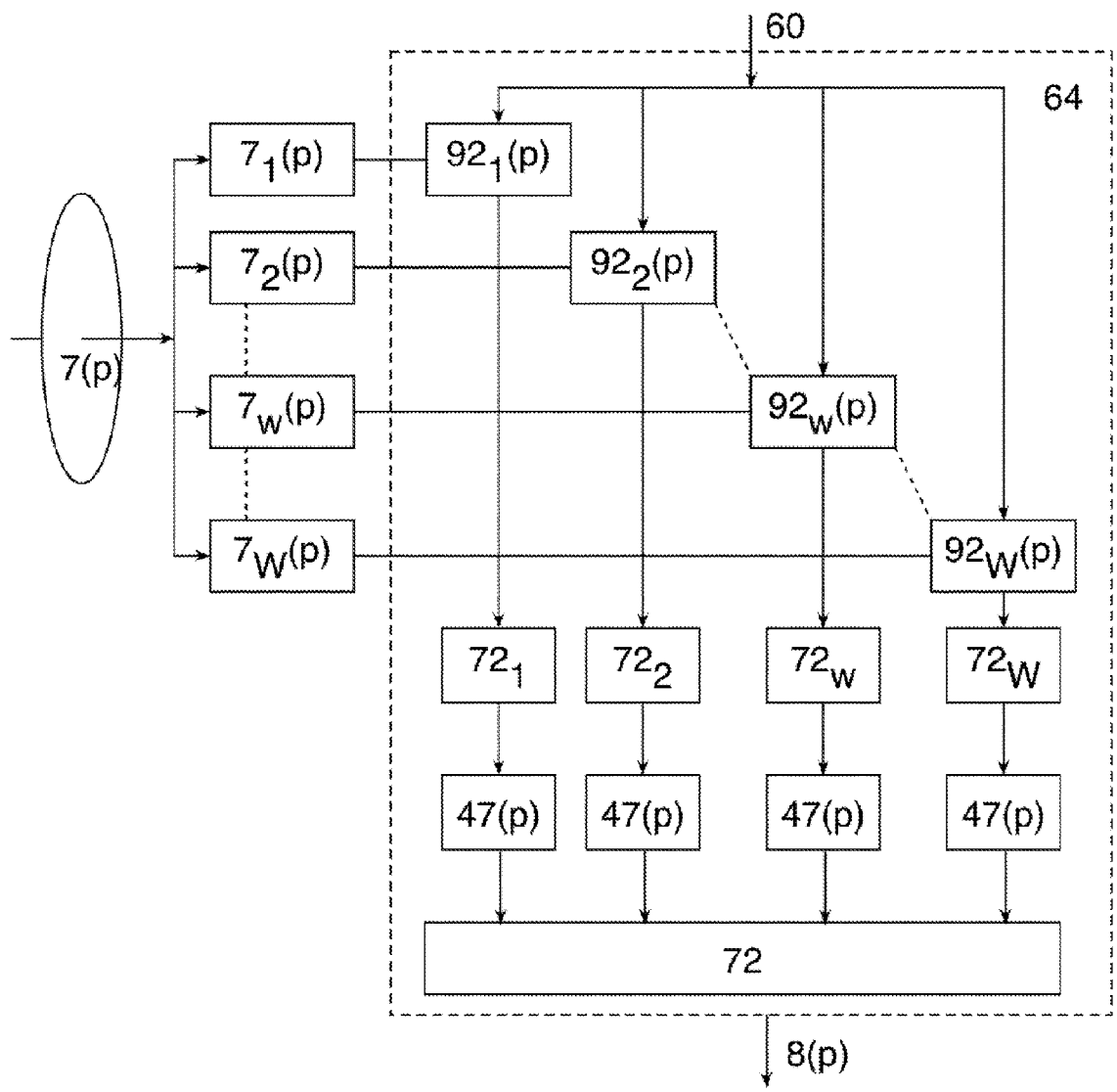

FIG. 9 shows, in diagrammatic form, another procedure for comparison applicable to the embodiments in both FIGS. 7 and 8.

Figure 10:
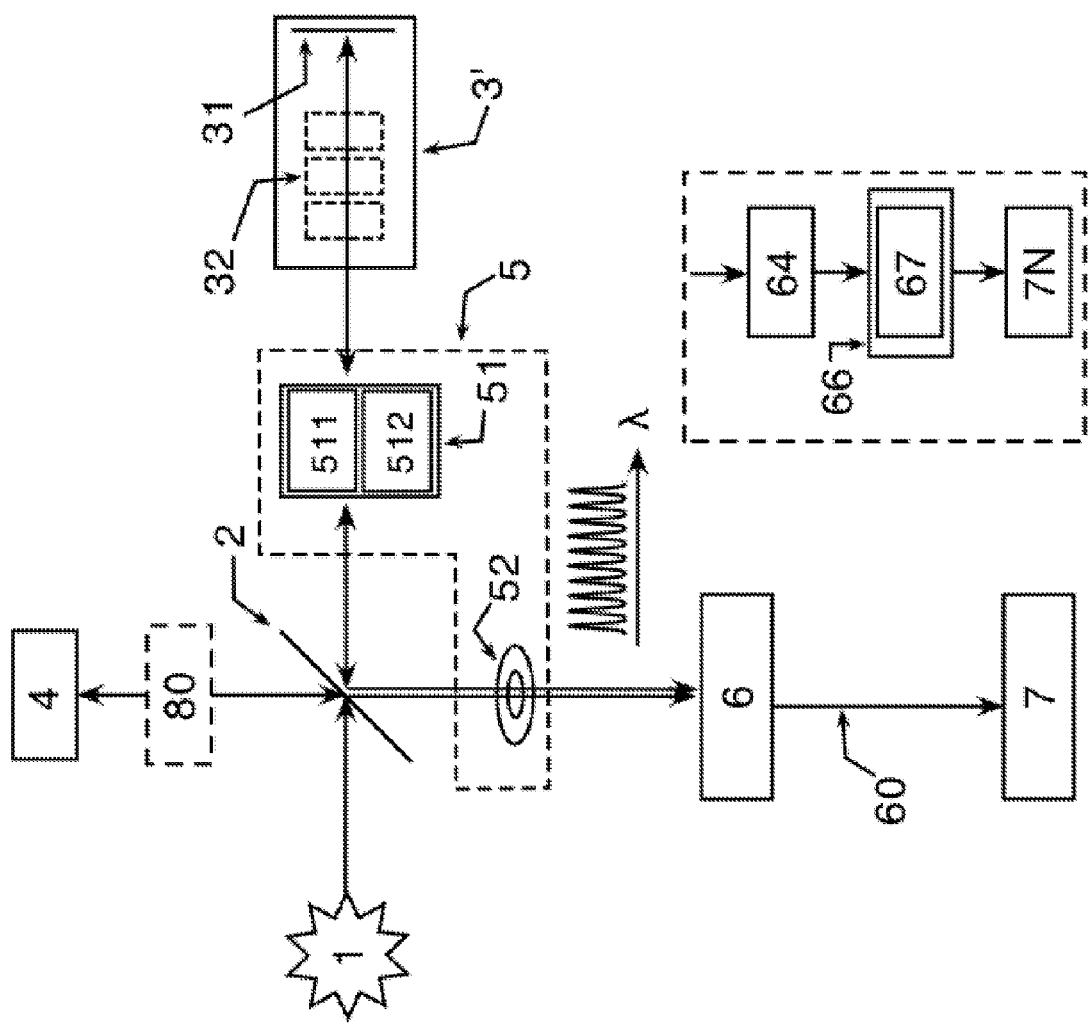
Figure 10:
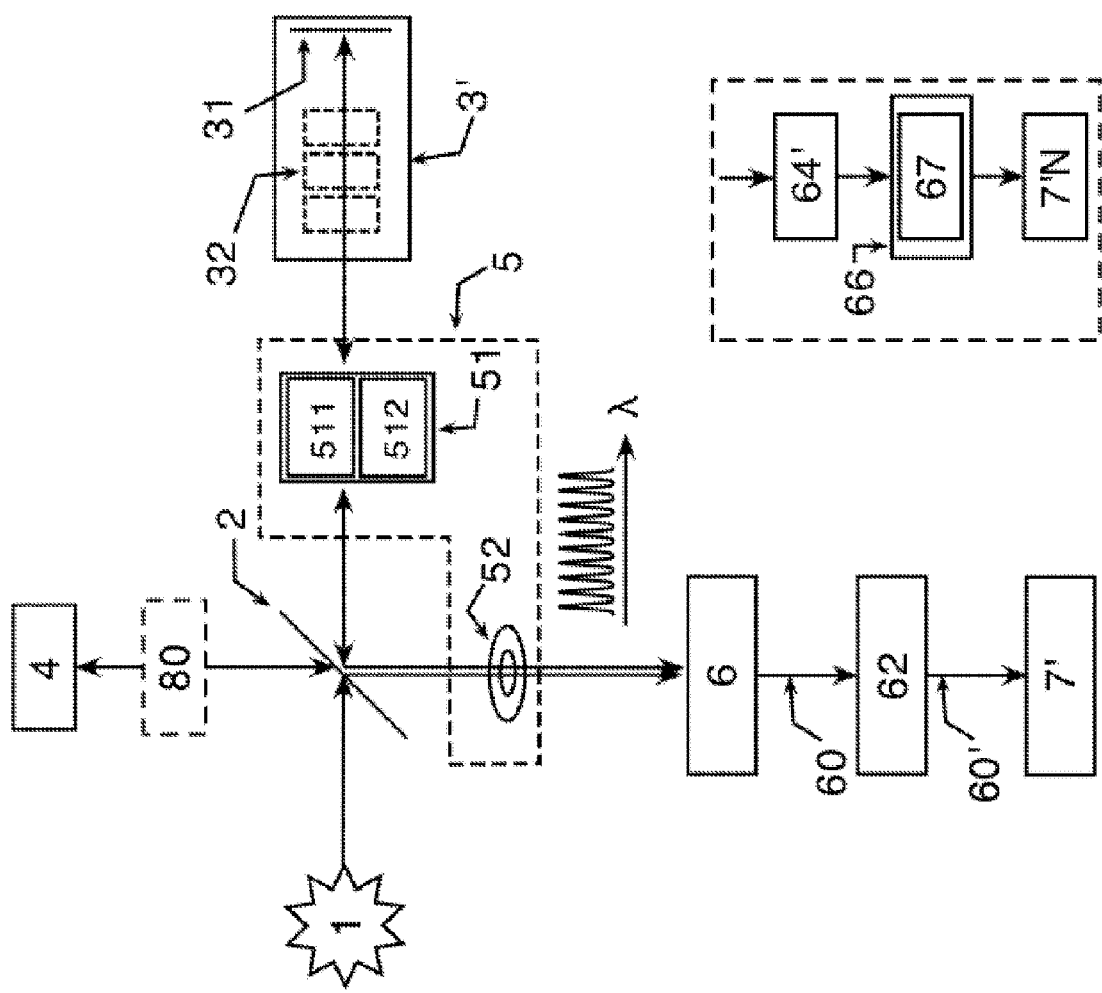

FIG. 10 shows, in diagrammatic form, any of the embodiments in FIG. 7, 8 or 9 operating in the preliminary step, of producing the masks.

FIG. 10' shows, in diagrammatic form, any of the embodiments in FIG. 7' or FIG. 8' operating in the preliminary step, of producing channelled spectra transformations to be stored as masks.

Figure 11:
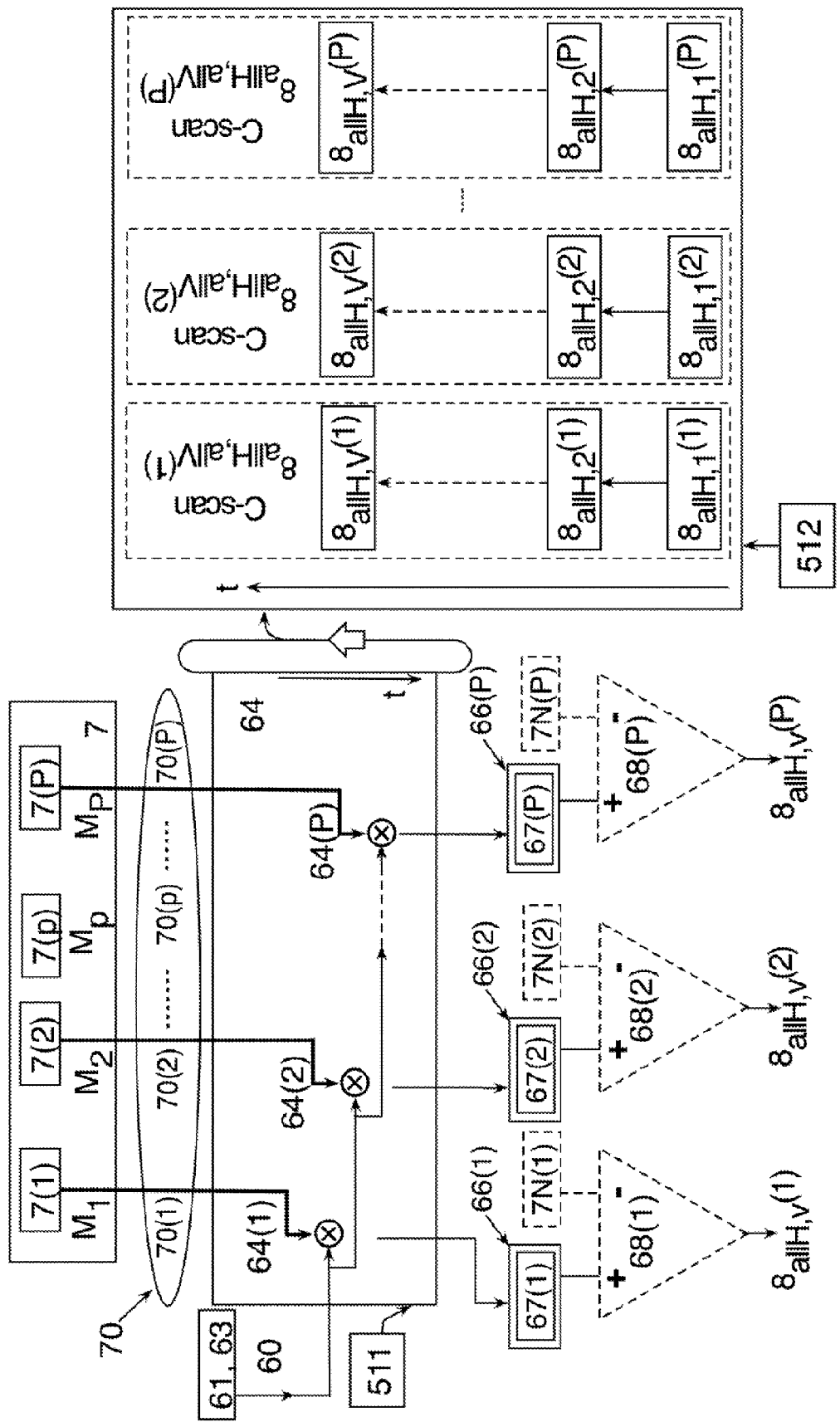
Figure 11:
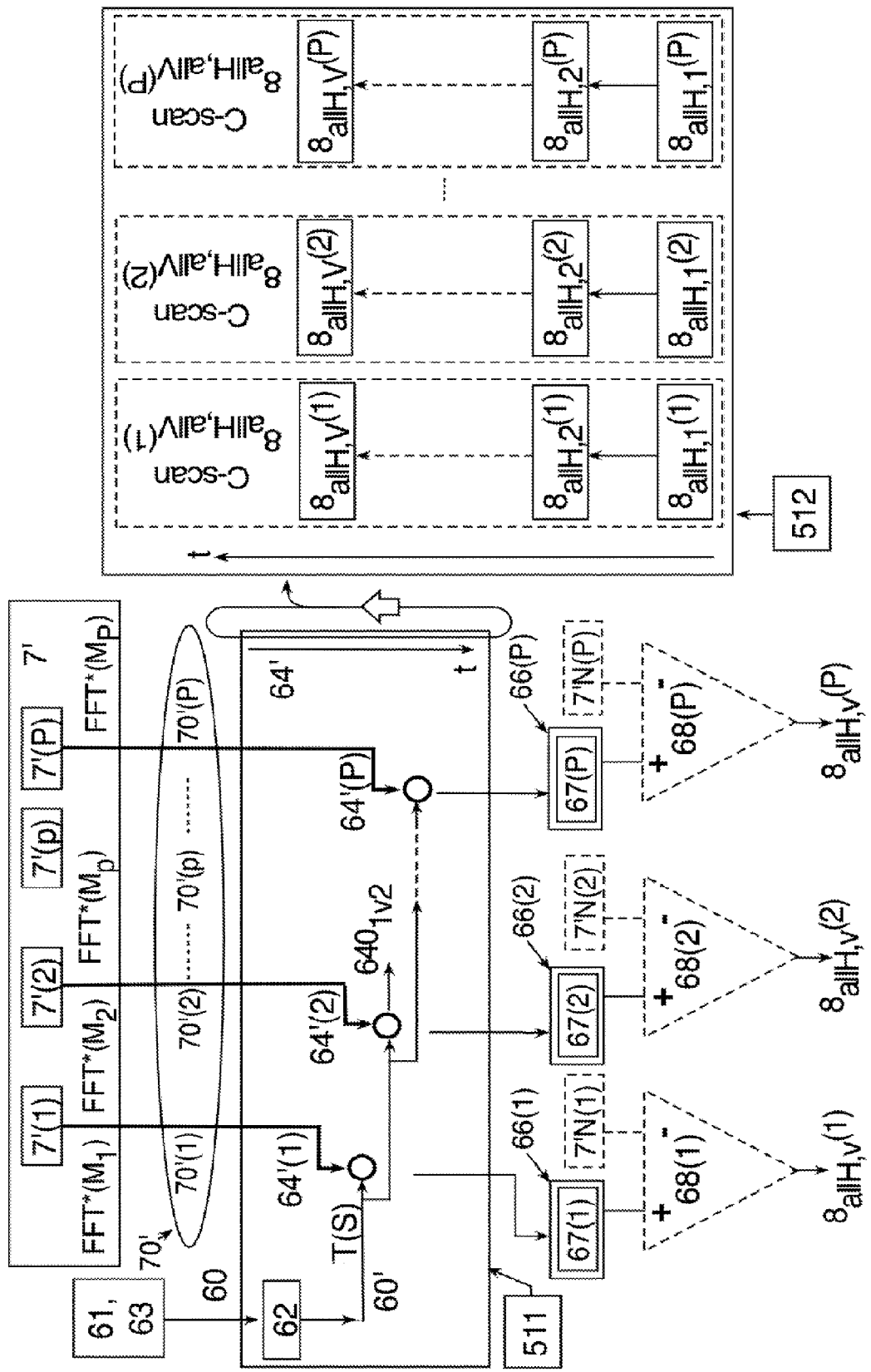

FIG. 11 shows, in diagrammatic form, an embodiment of the invention that produces simultaneously P en-face OCT images using any of the embodiments in FIG. 7, 8 or 9.

FIG. 11' shows, in diagrammatic form, an embodiment of the invention that produces simultaneously P en-face OCT images using any of the embodiments in FIG. 7' or 8'.

Figure 12:
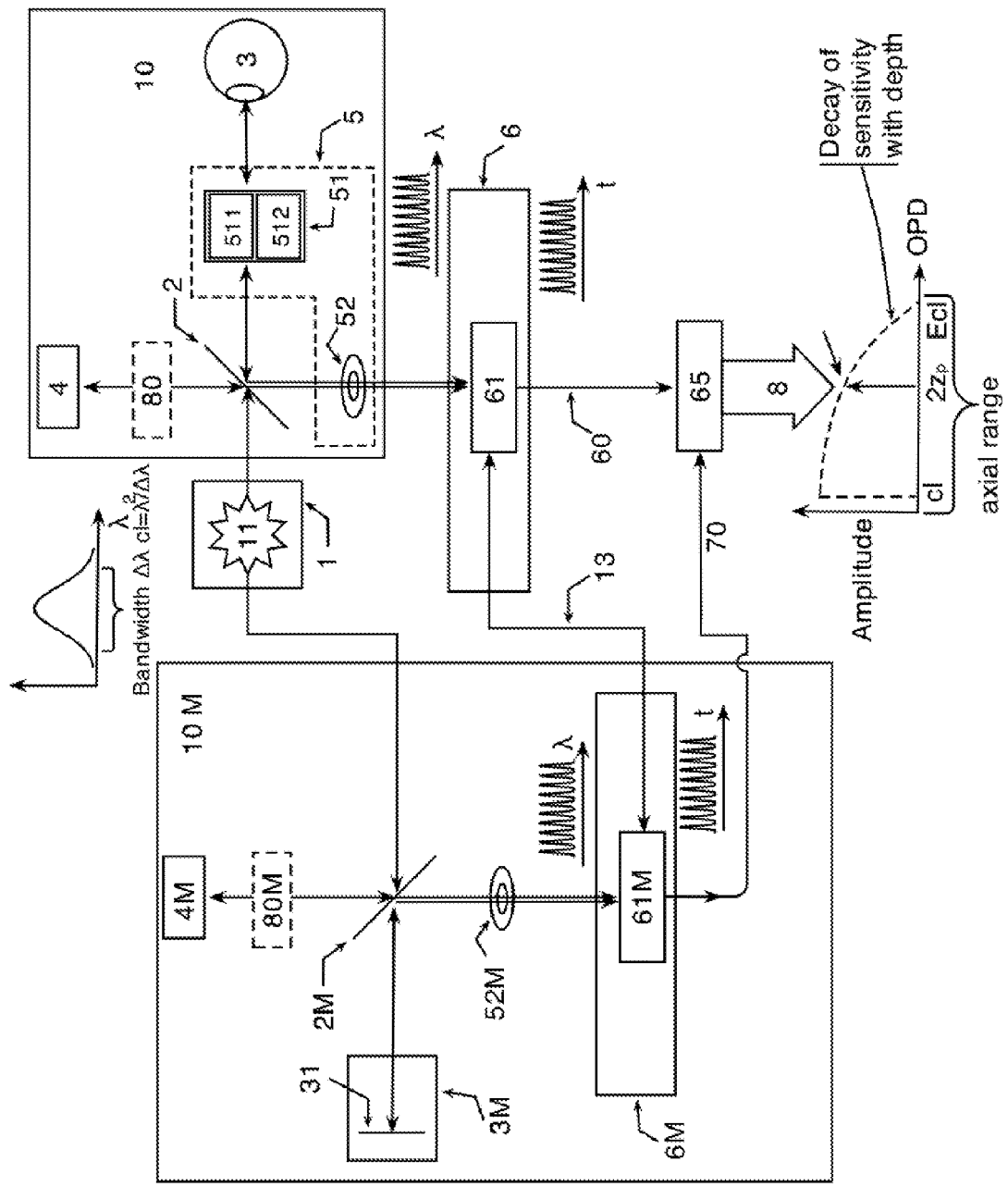

FIG. 12 presents in diagrammatic form, the principle of comparing the channelled spectrum in SB-OCT with a channelled spectrum collected by a master SB-OCT system.

Figure 13:
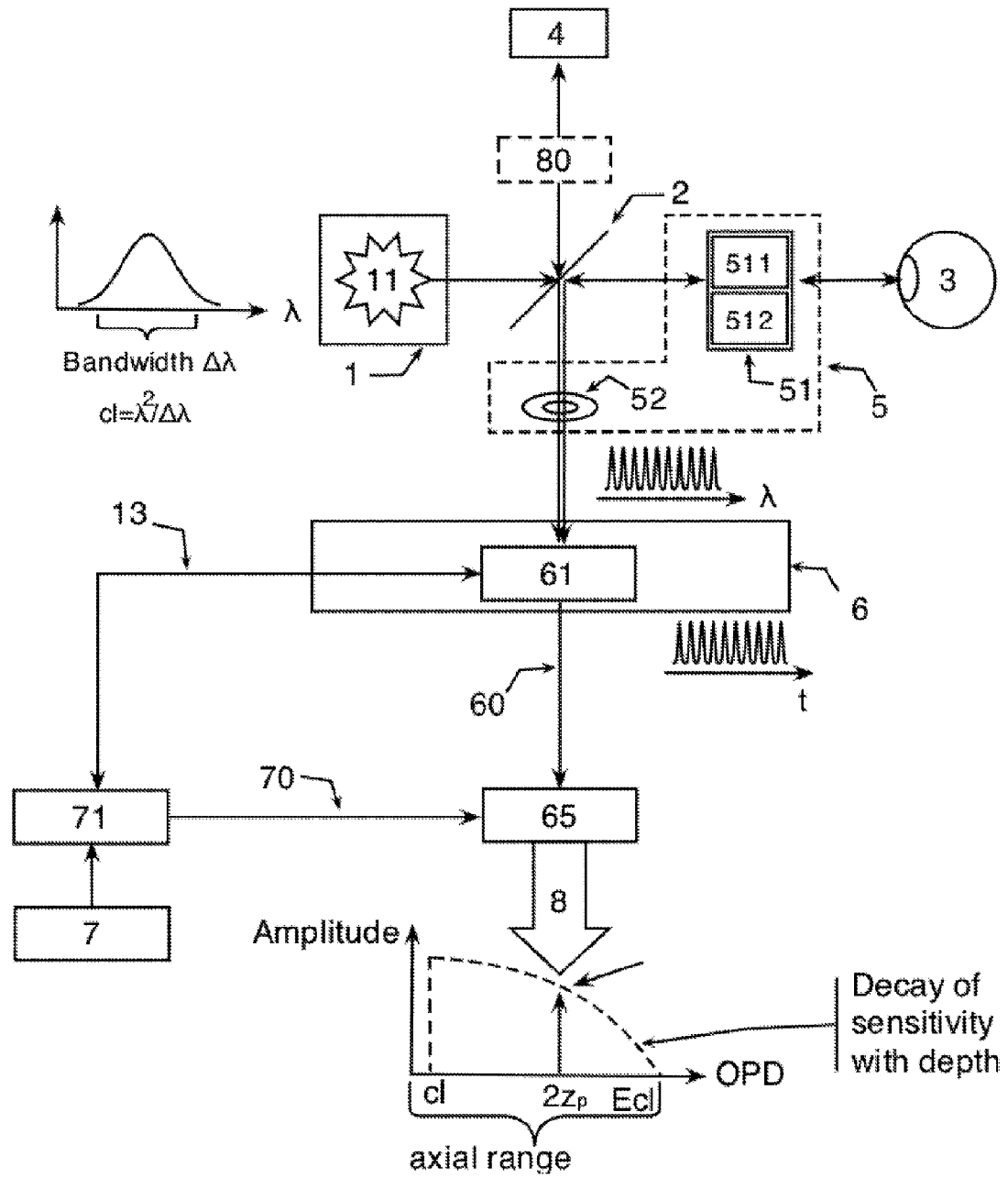

FIG. 13 presents in diagrammatic form, an improved version of the embodiment in FIG. 12, using a digitizer to replace the master SB-OCT system.

Figure 14:
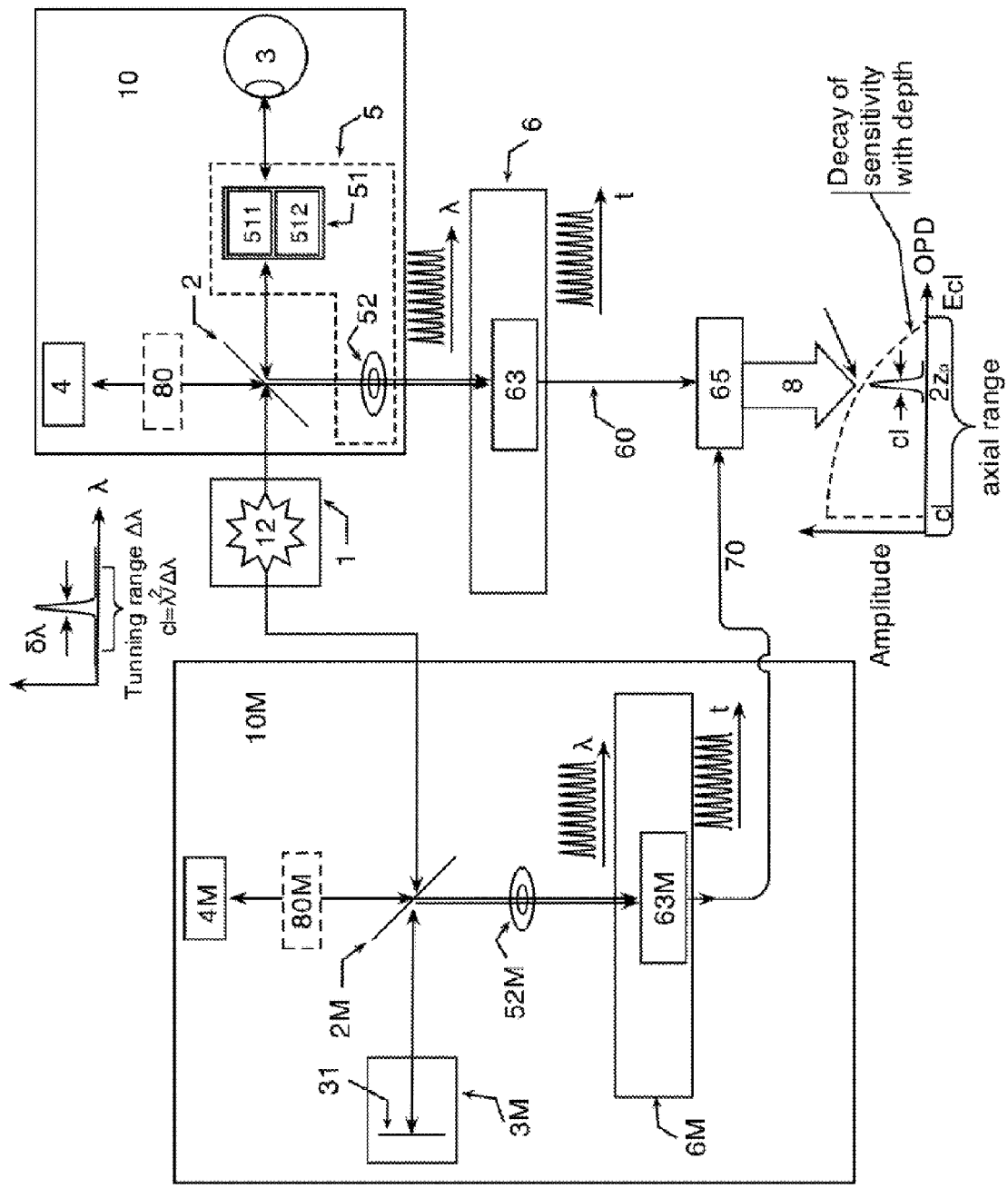

FIG. 14 presents in diagrammatic form, the principle of comparing the channelled spectrum in SS-OCT with the spectrum collected by a master SS-OCT system.

Figure 15:
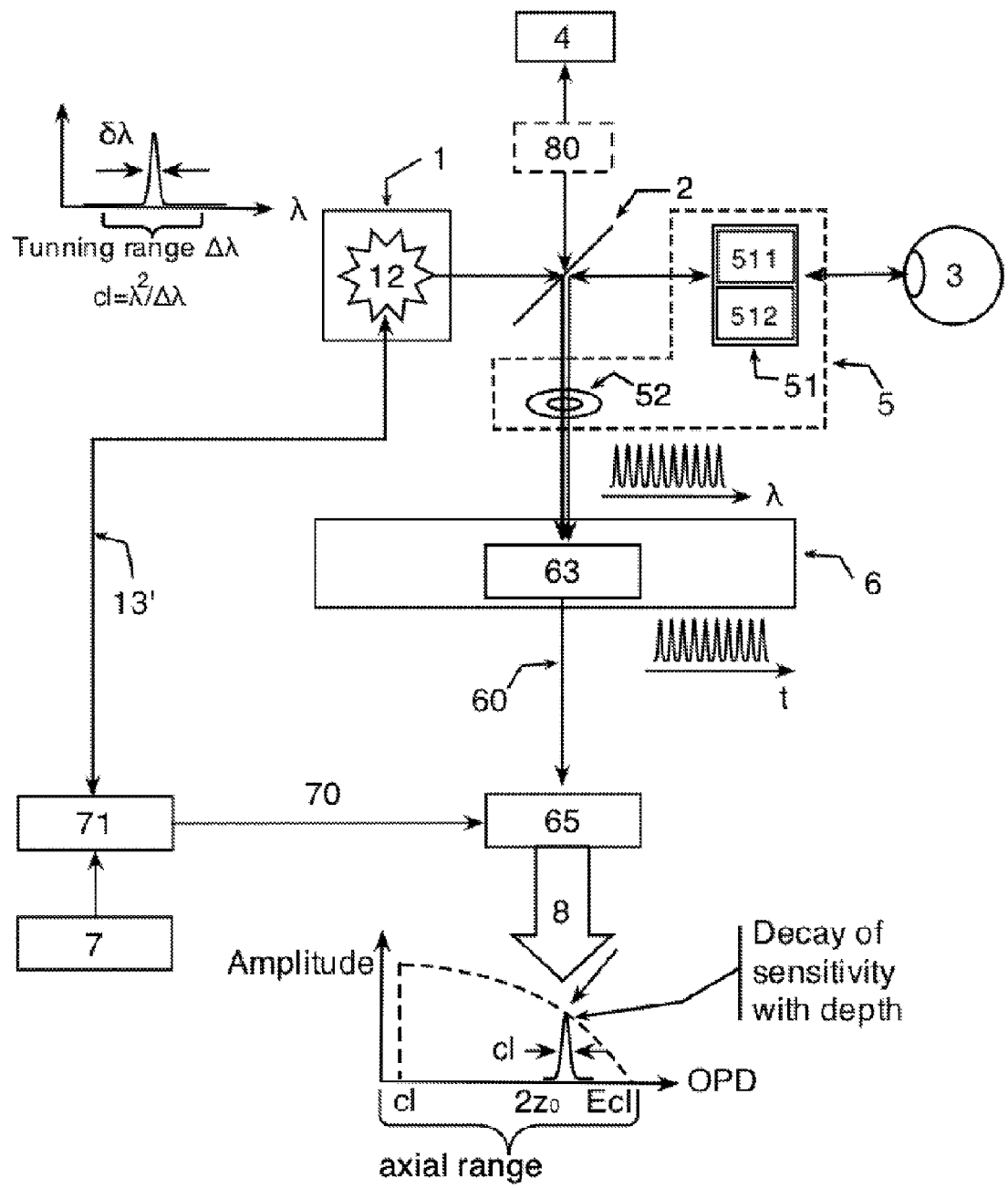

FIG. 15 presents in diagrammatic form, an improved version of the embodiment in FIG. 14, using a digitizer to replace the master SS-OCT system.

Figure 16:
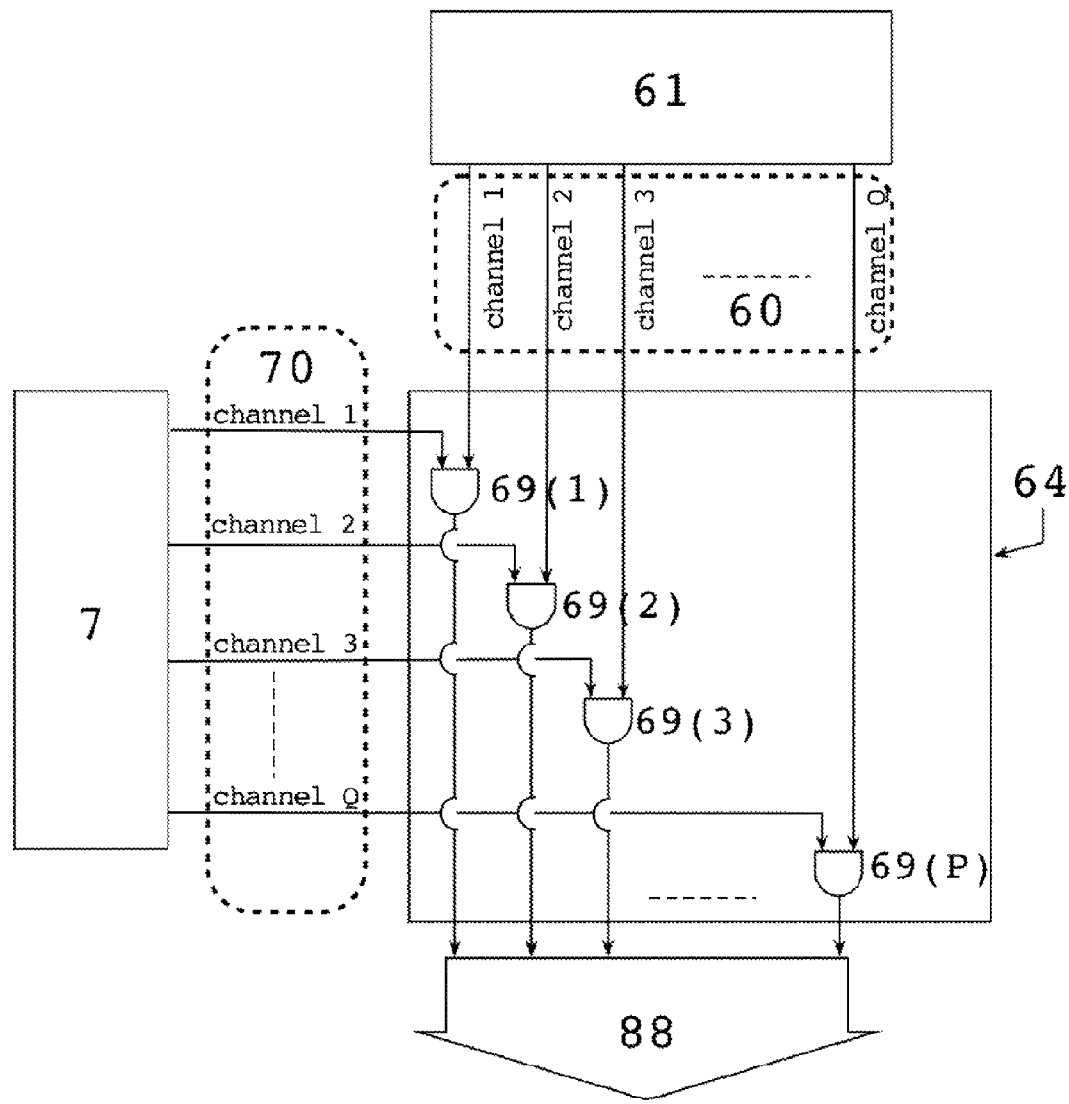

FIG. 16 discloses an embodiment of the invention using a spectrometer that outputs multiple signals corresponding to spectral windows of the spectrum in parallel.

Figure 17:
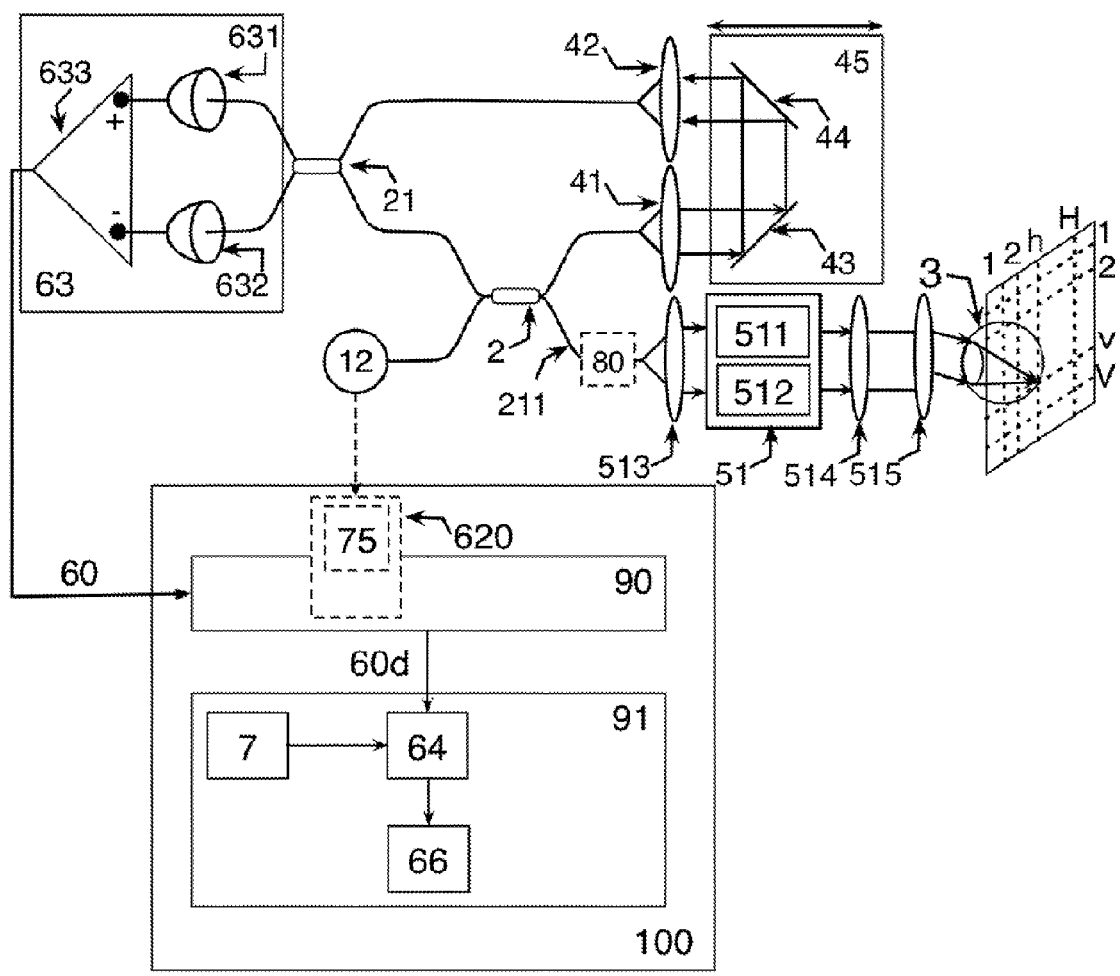

FIG. 17 shows, in diagrammatic form, a more detailed embodiment of a SS-OCT apparatus according to the invention.

Figure 18:
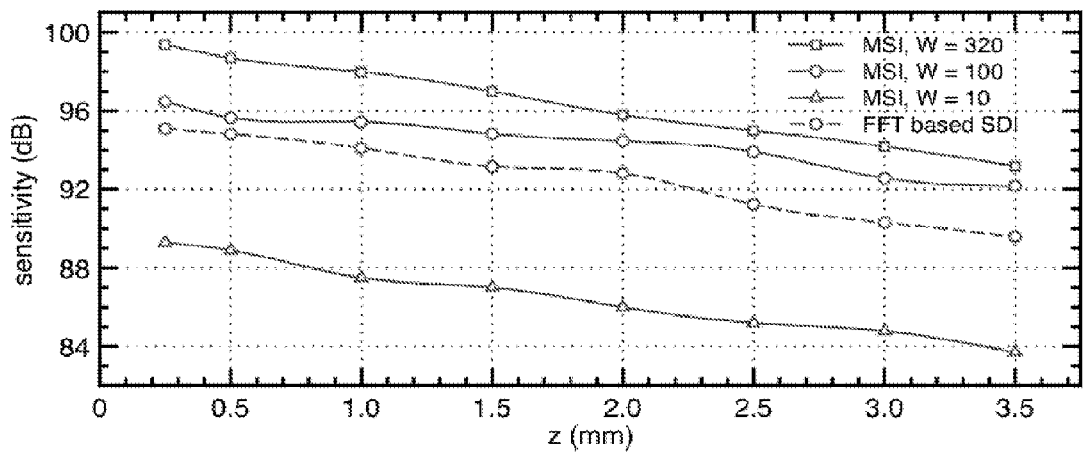

FIG. 18. Experimental comparison of the sensitivity drop-off of an A-scan produced by prior art and by the method according to the invention.

Figure 19:
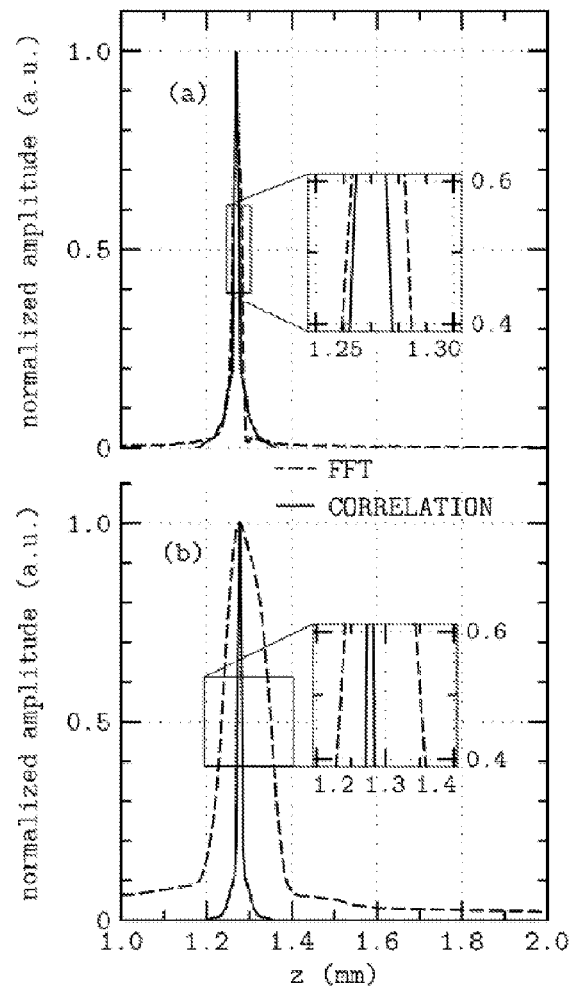

FIG. 19. Experimental proof of tolerance of the method according to invention to non-calibrated data in comparison with the prior art.

Figure 20:
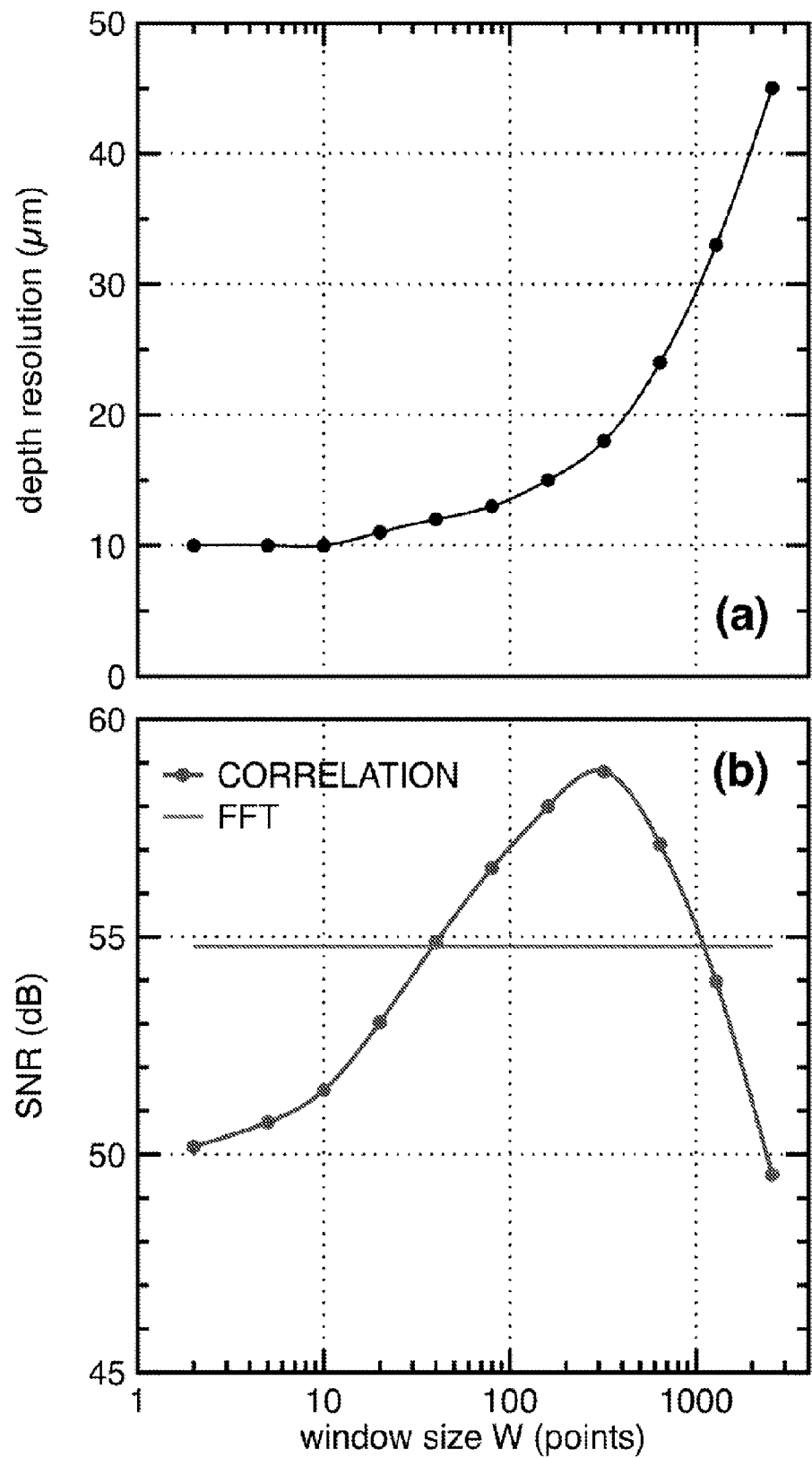

FIG. 20. Experimental proof of improved depth resolution and signal to noise ratio of the method according to the invention, in comparison with the prior art method.

Figure 21:
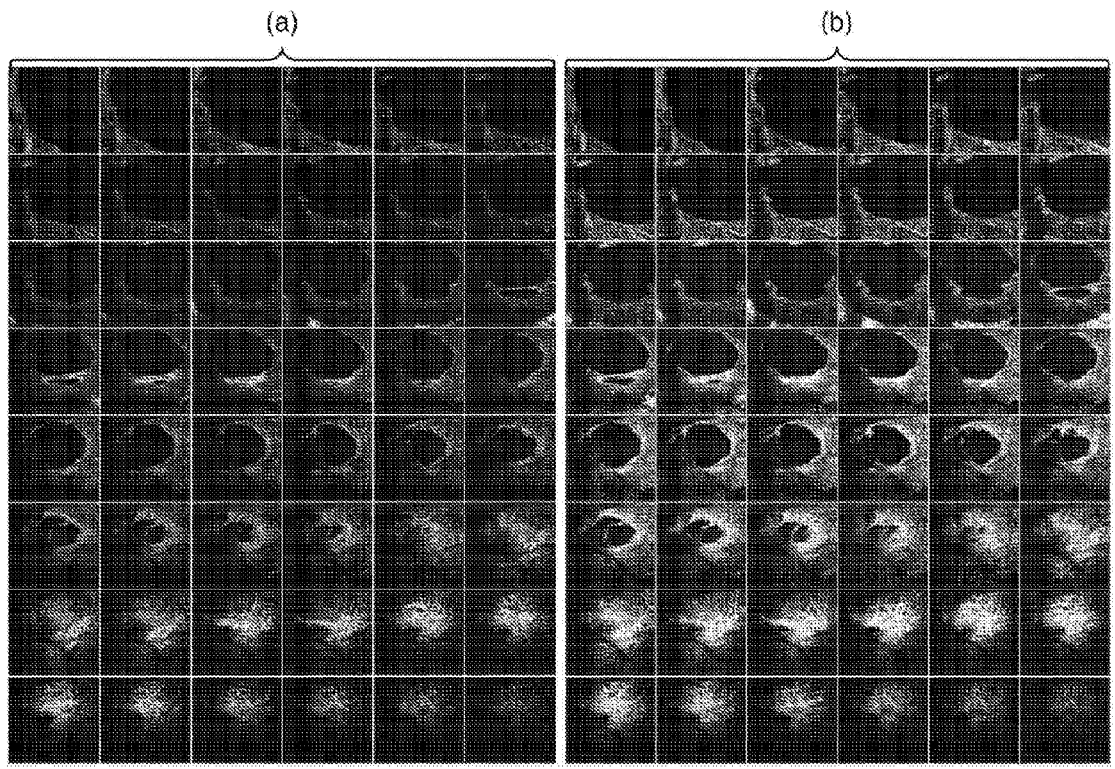
Figure 21:
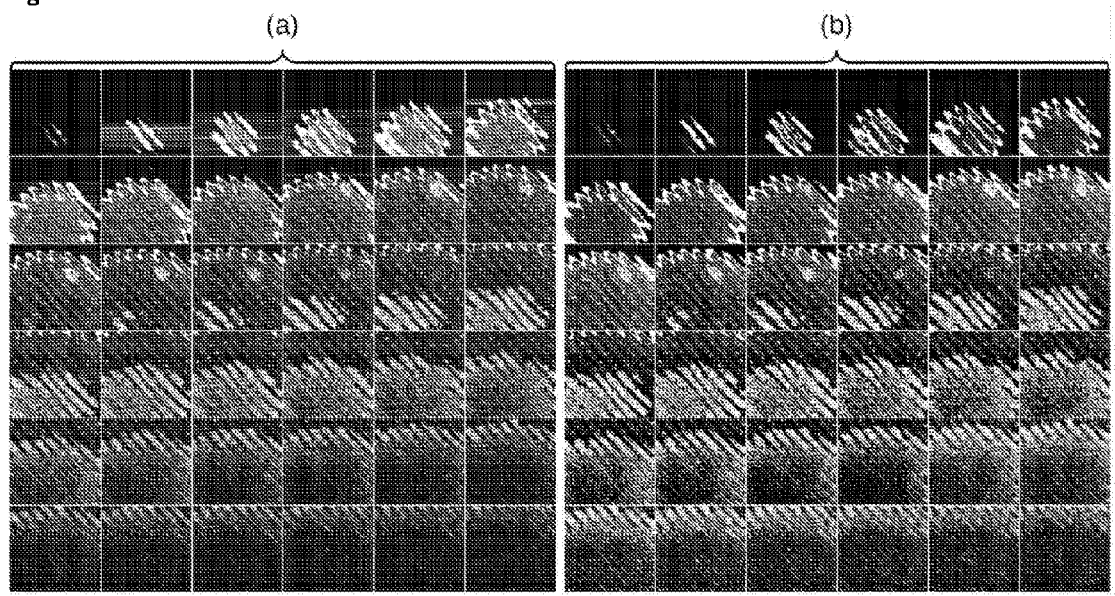

FIG. 21. En-face OCT images collected from the optic nerve in vivo

FIG. 21' En-face OCT images collected from the skin in vivo

Figure 22:
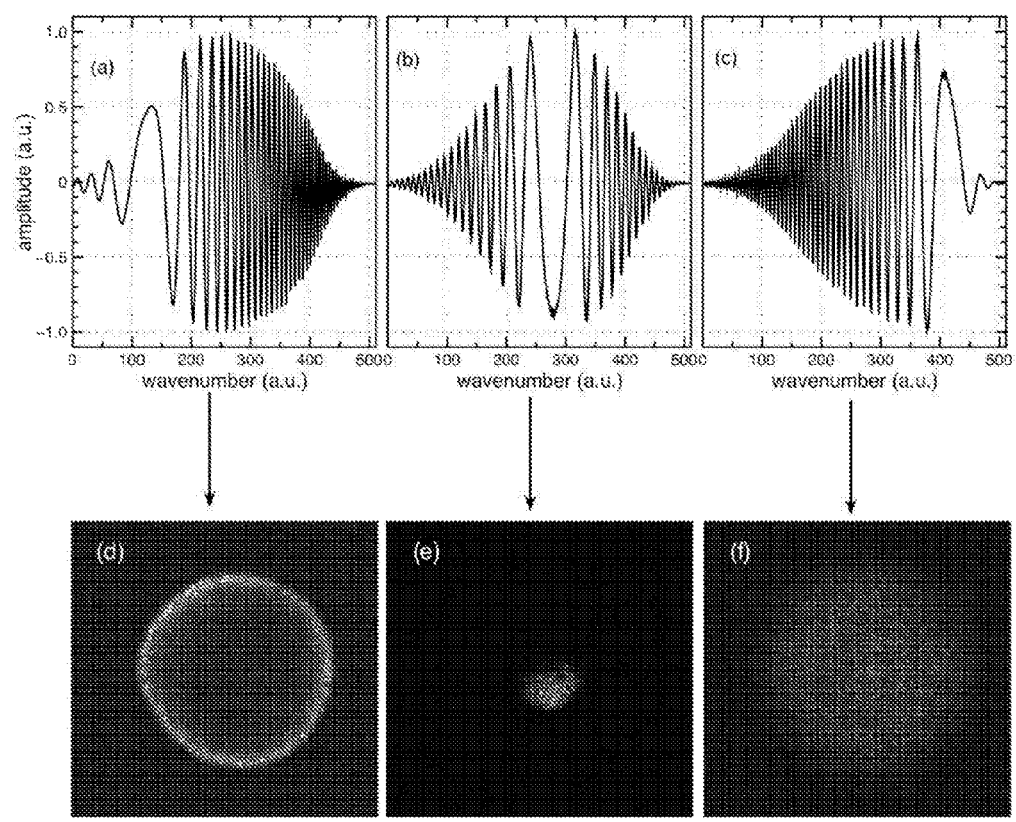

FIG. 22 Experimental proof of the full axial range imaging capability of the MSI method.

Figure 23:
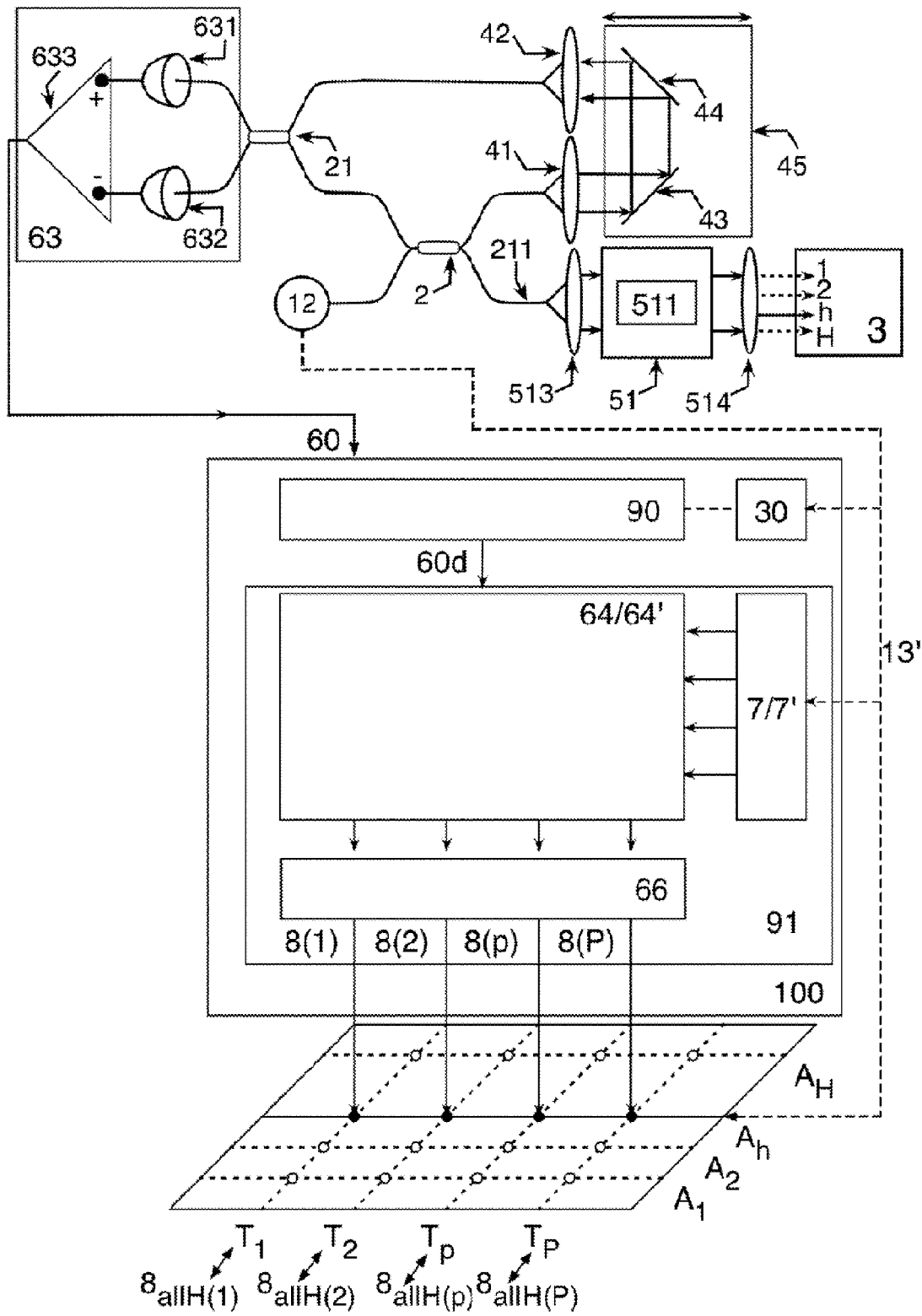
Figure 23:
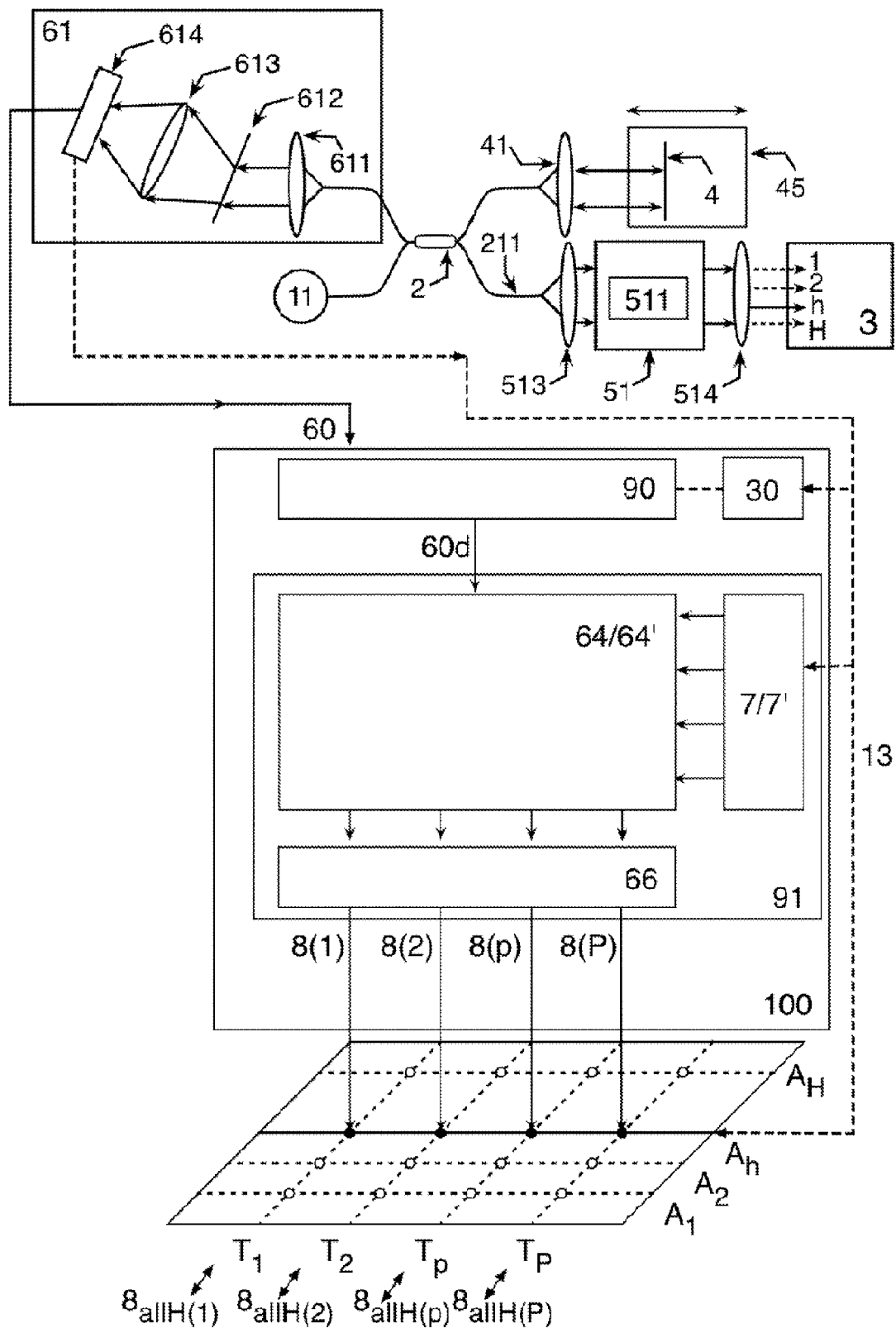

FIG. 23 shows a detailed implementation of an embodiment of an apparatus according to the invention to produce B-scan OCT images using a swept source.

Figure 24:
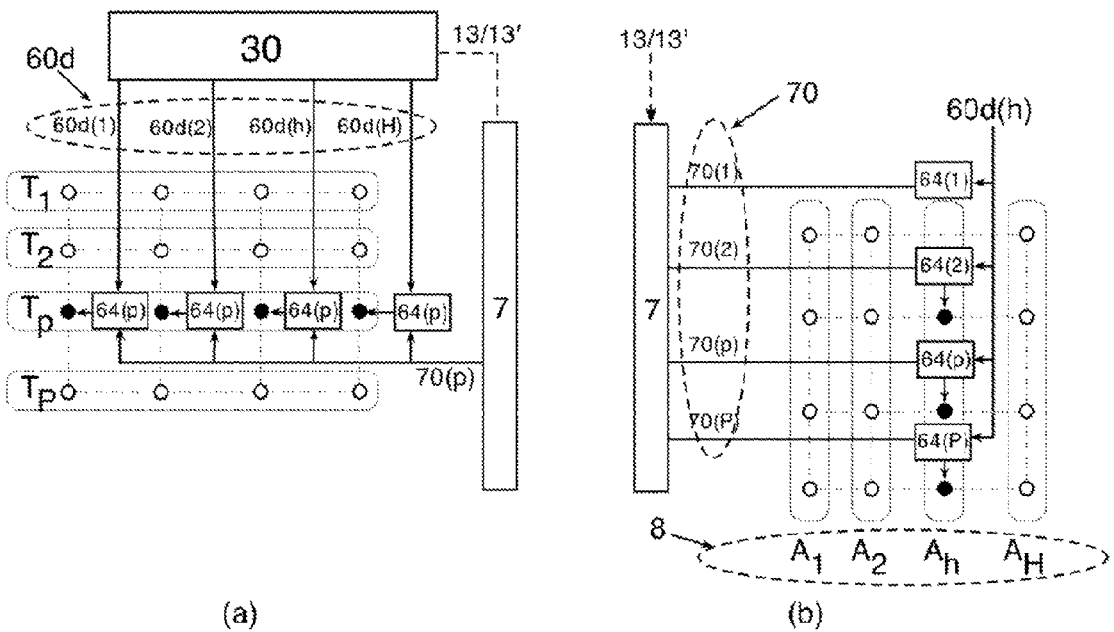
Figure 24:
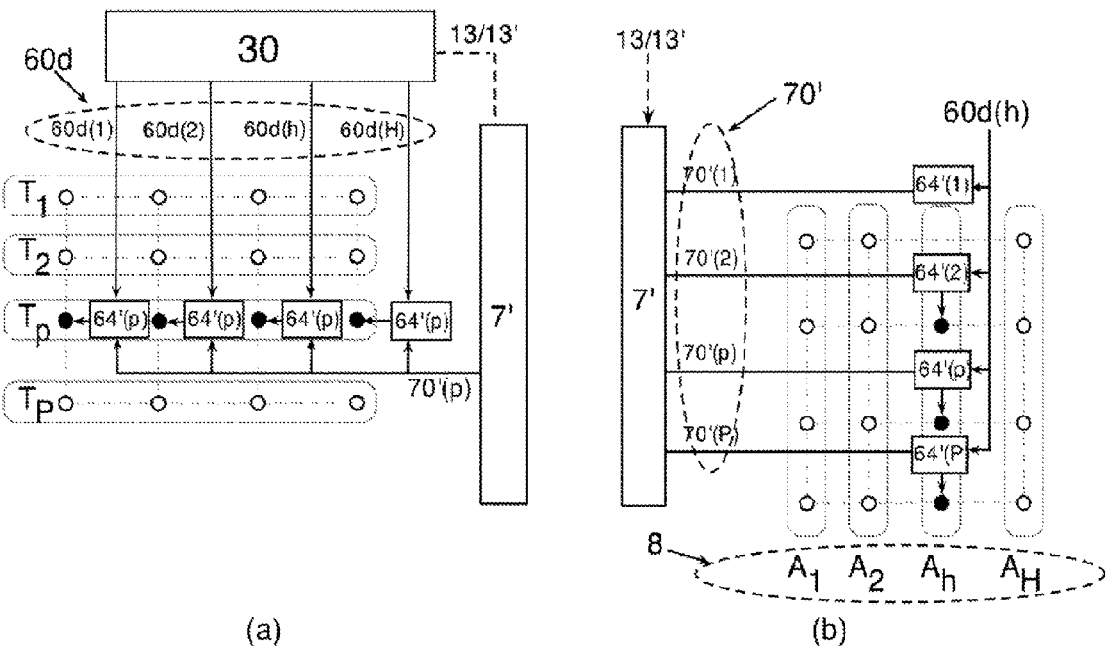

FIG. 23' shows a detailed implementation of an embodiment of an apparatus according to the invention to produce B-scan OCT images using a broadband source FIG. 24 describes procedures according to the invention for producing T-scan and A-scan based B-scan images.

FIG. 24' describes procedures according to the invention for producing T-scan and A-scan based B-scan images via FFT based correlation.

Figure 25:
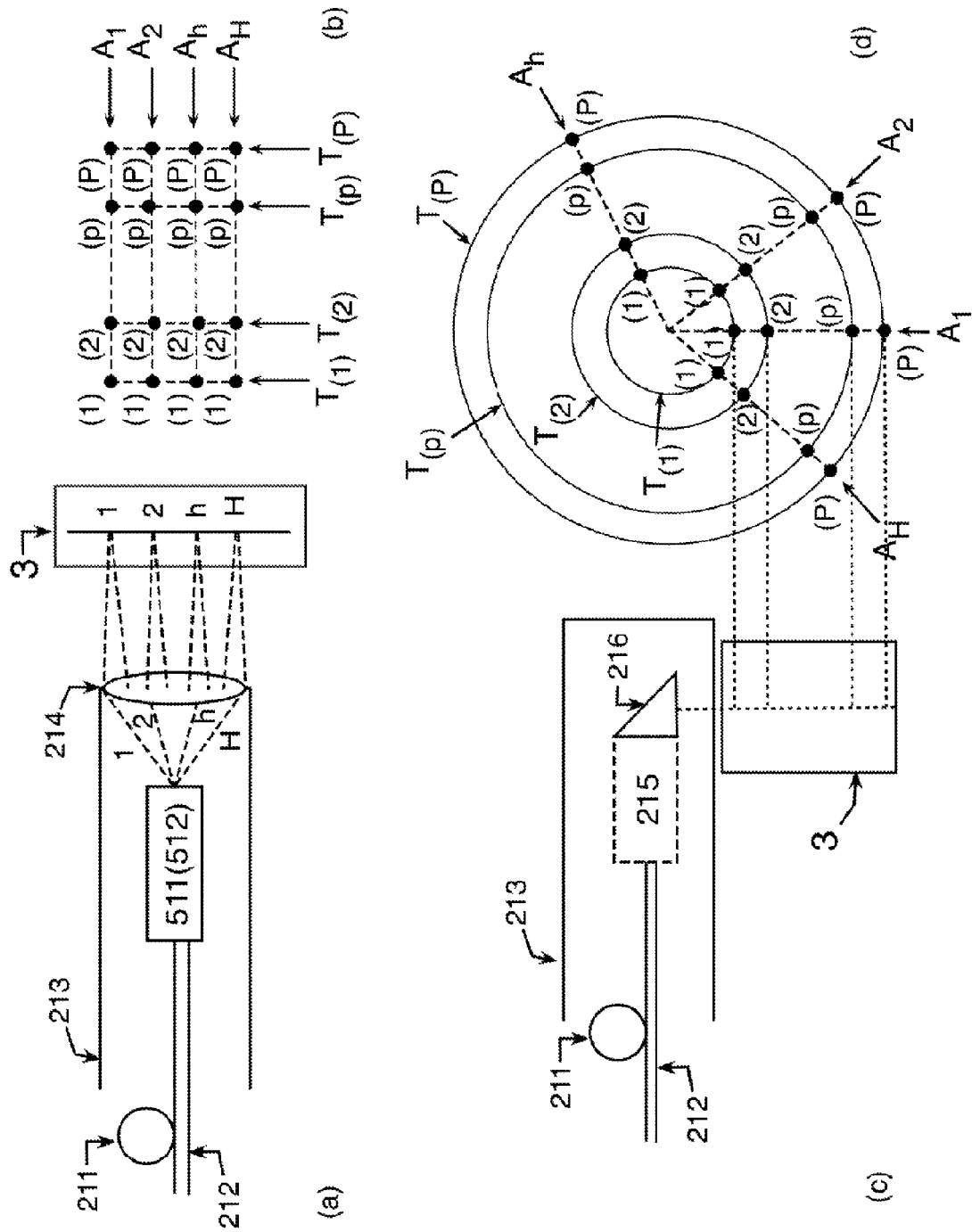

FIG. 25 discloses procedures according to the invention for producing T-scan and A-scan based B-scan images in endoscopy.

Figure 26:
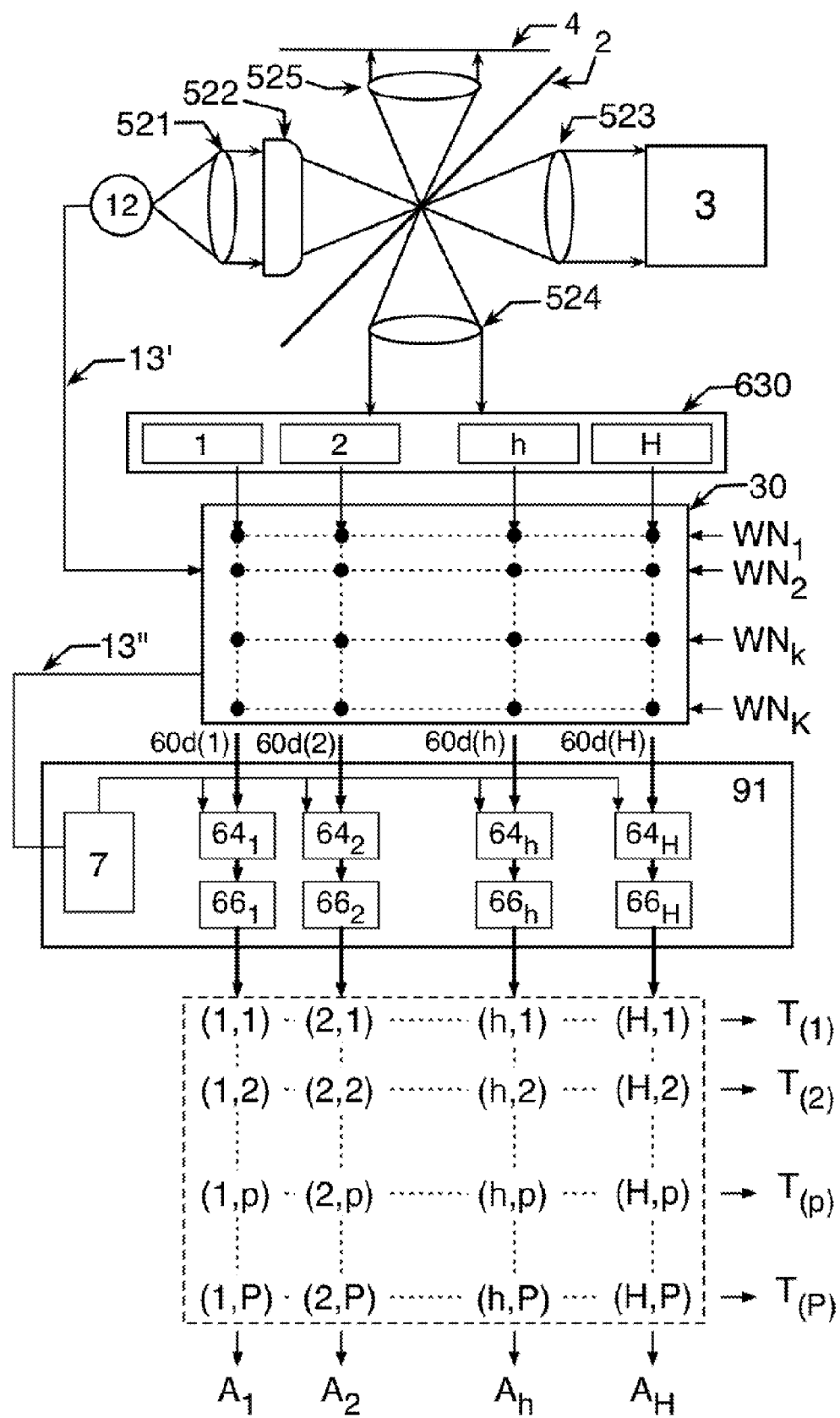

FIG. 26 discloses an embodiment of an apparatus according to the invention to perform 1D full field OCT imaging using a linear camera and a swept source.

Figure 27:
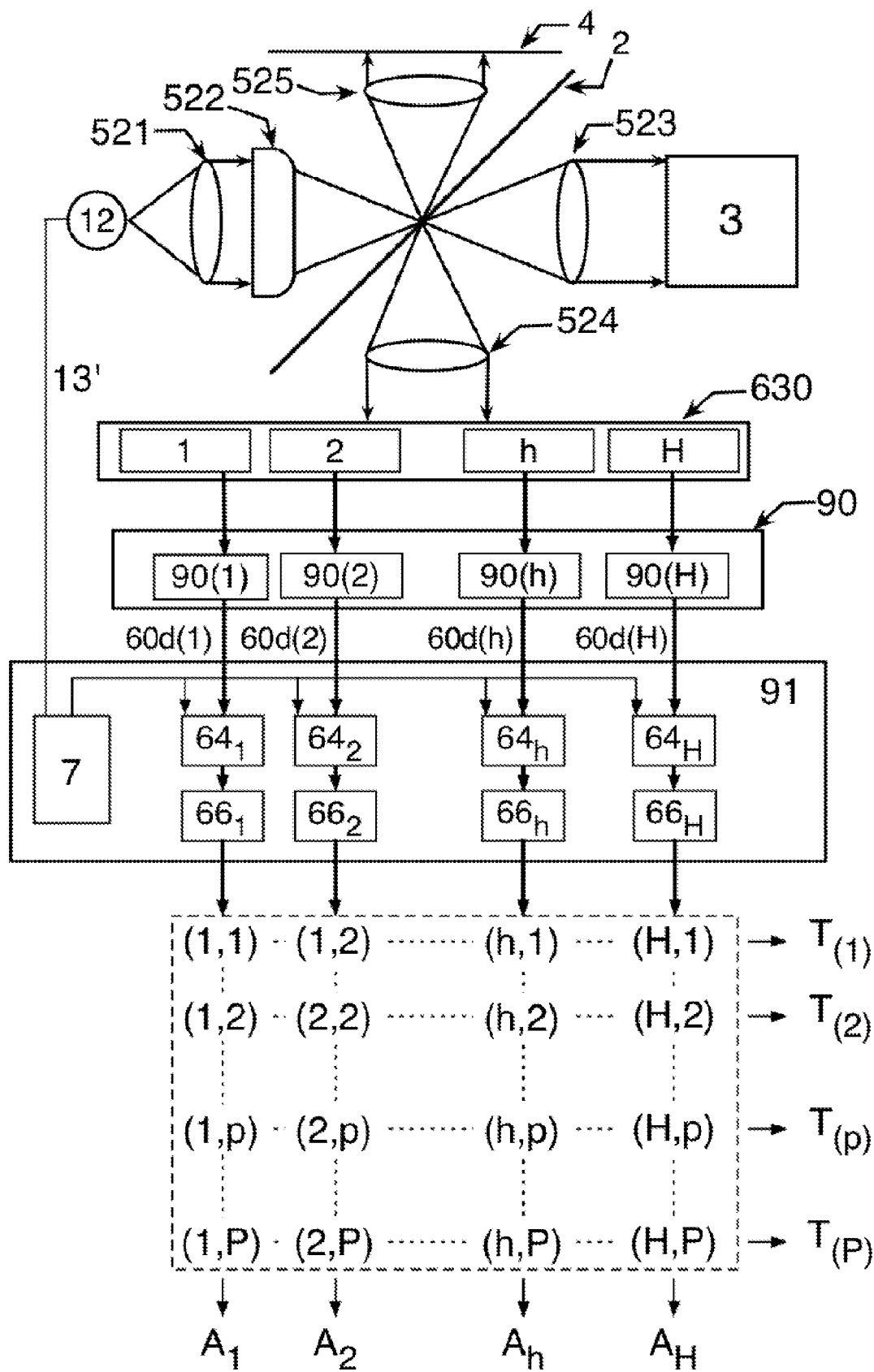

FIG. 27 discloses another embodiment of the apparatus according to the invention to perform 1D full field OCT imaging using parallel reading of a photo-detector array and a swept source.

Figure 28:
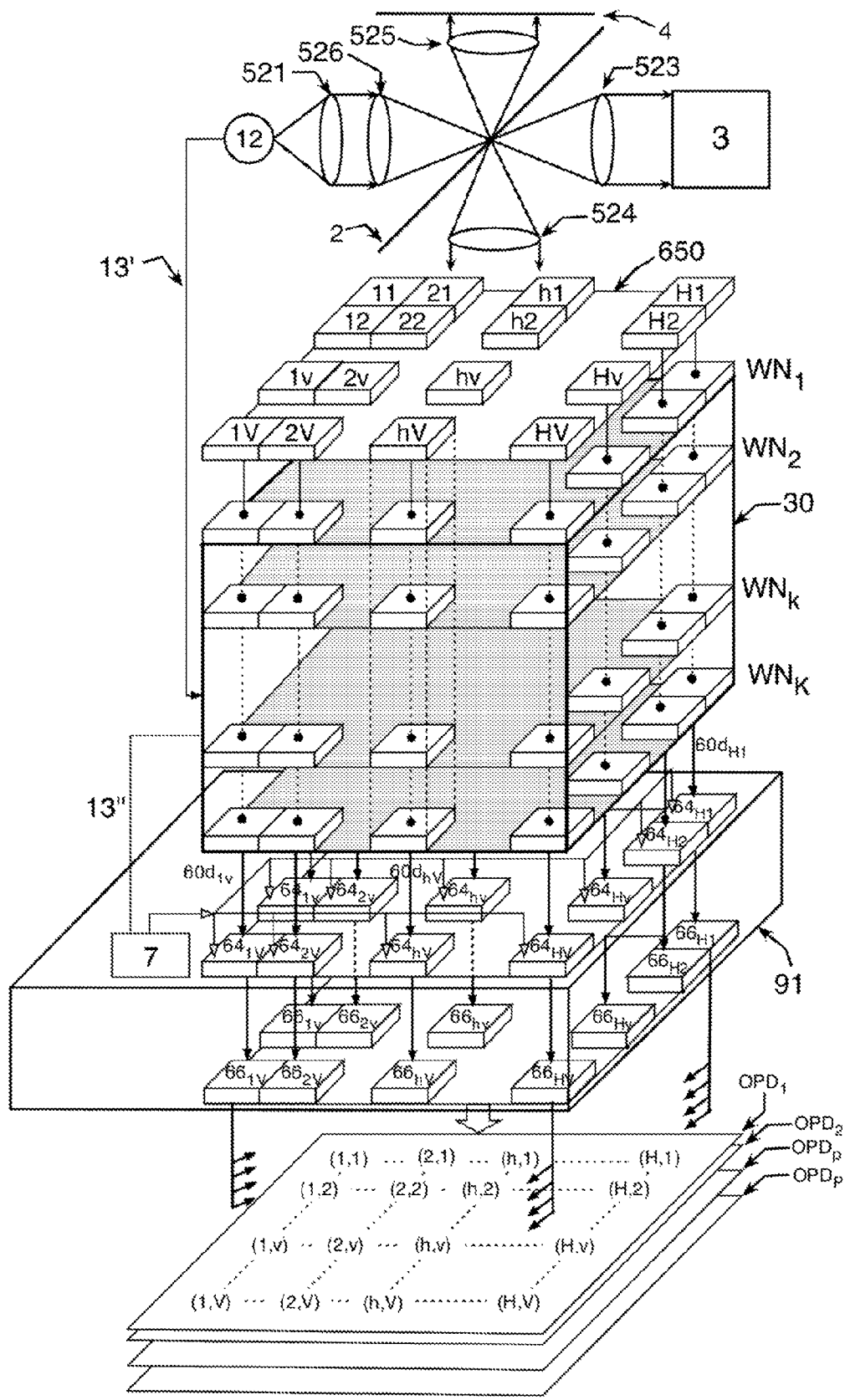

FIG. 28 discloses an embodiment of the apparatus according to the invention to perform 2D full field OCT imaging using a 2D camera and a swept source.

Figure 29:
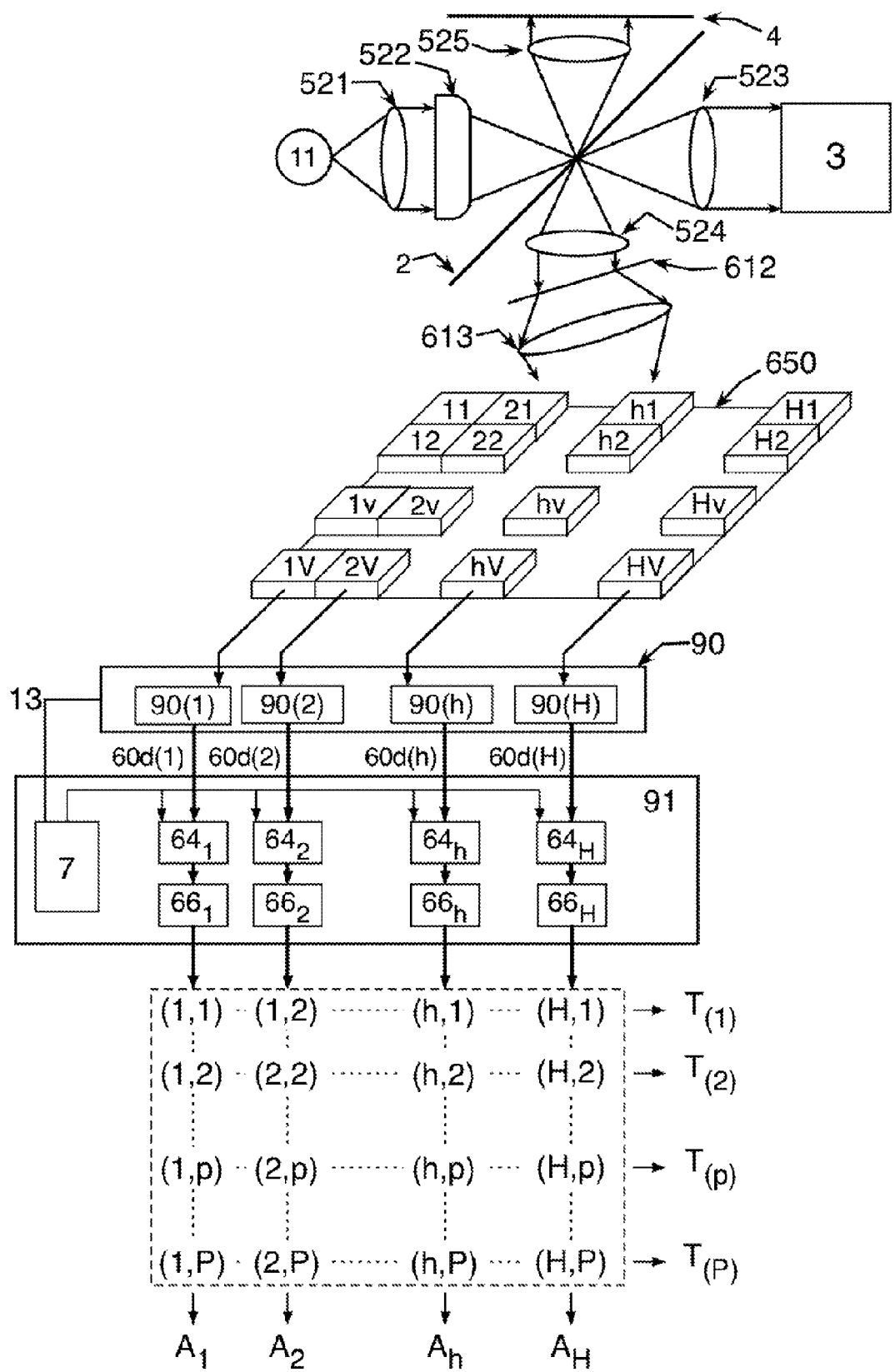

FIG. 29 discloses an embodiment of the apparatus according to the invention to perform 1D full field OCT imaging using a 2D camera and a broadband source.

Figure 30:
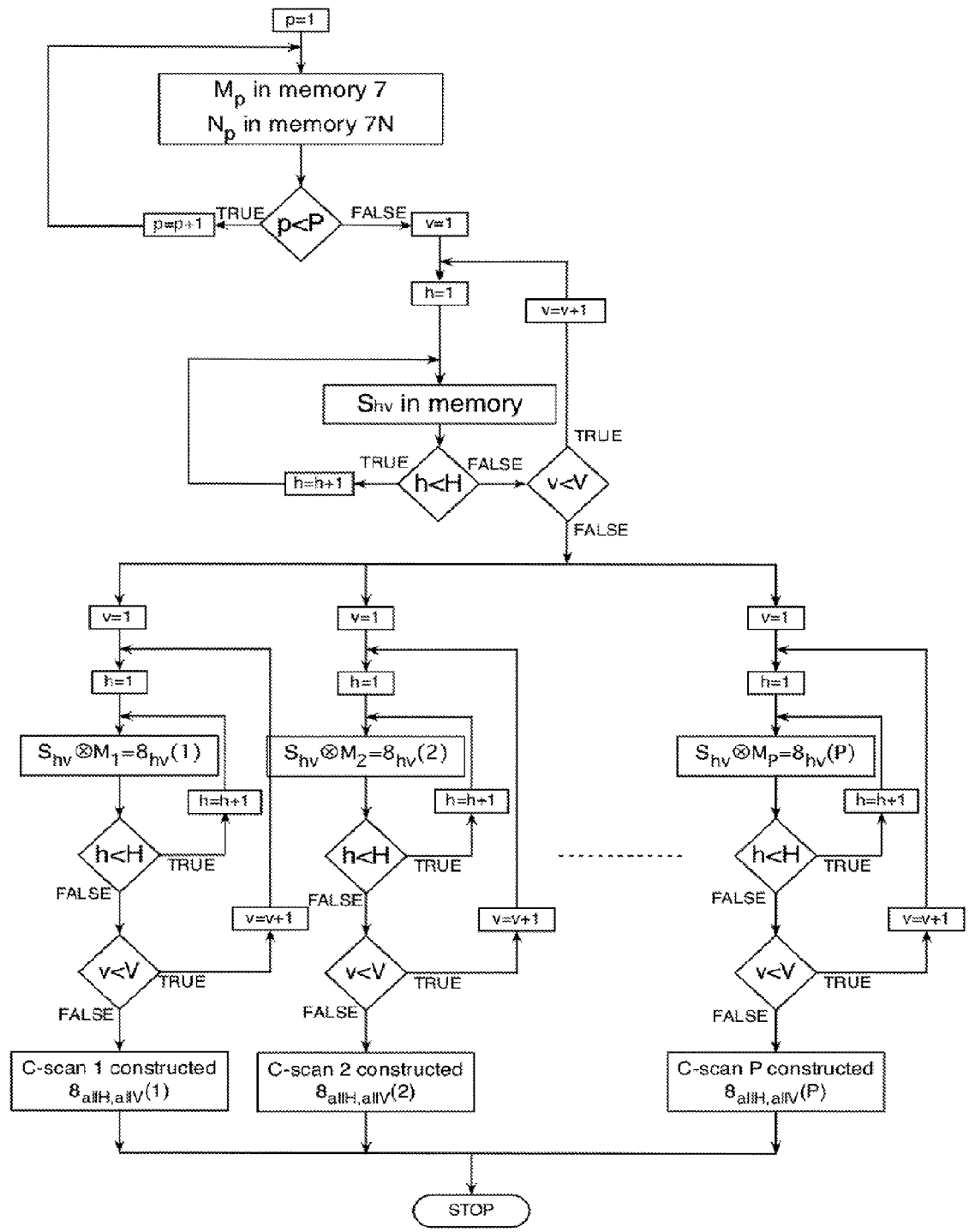
Figure 30:
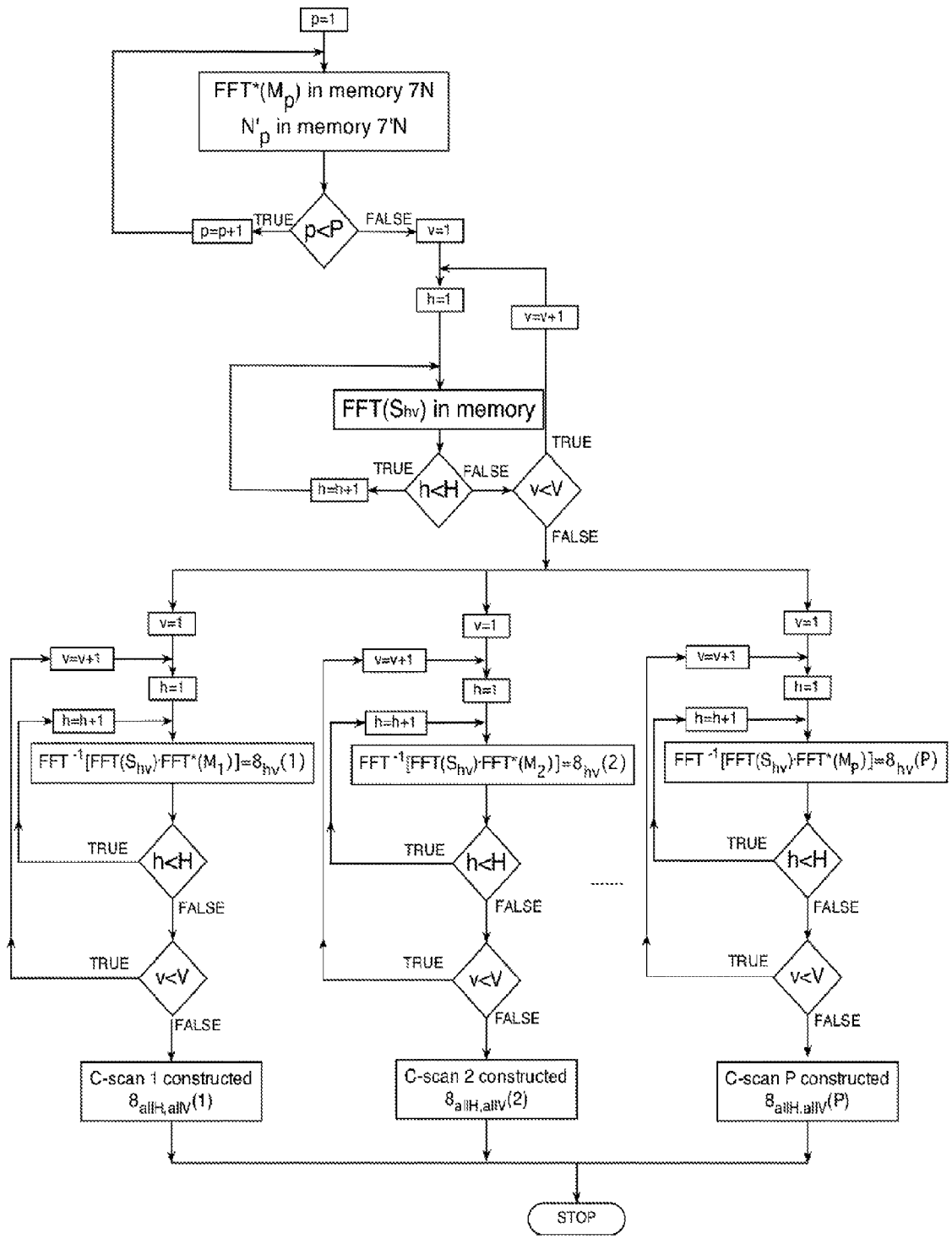

FIG. 30 presents a flow chart of the method according to the invention, applicable to embodiments in FIG. 7, 8, 9 or 28.

FIG. 30' presents another flow chart of the method according to the invention, applicable to embodiments in FIG. 7' or 8'.

5. DETAILED DESCRIPTION OF THE PREFERRED EMBODIMENTS

Various features of the present invention, as well as other objects and advantages attendant thereto, are set forth in the following description and the accompanying drawings in which like reference numerals depict like elements.

Master-Slave Interferometry and Master-Slave OCT

Figure 1:
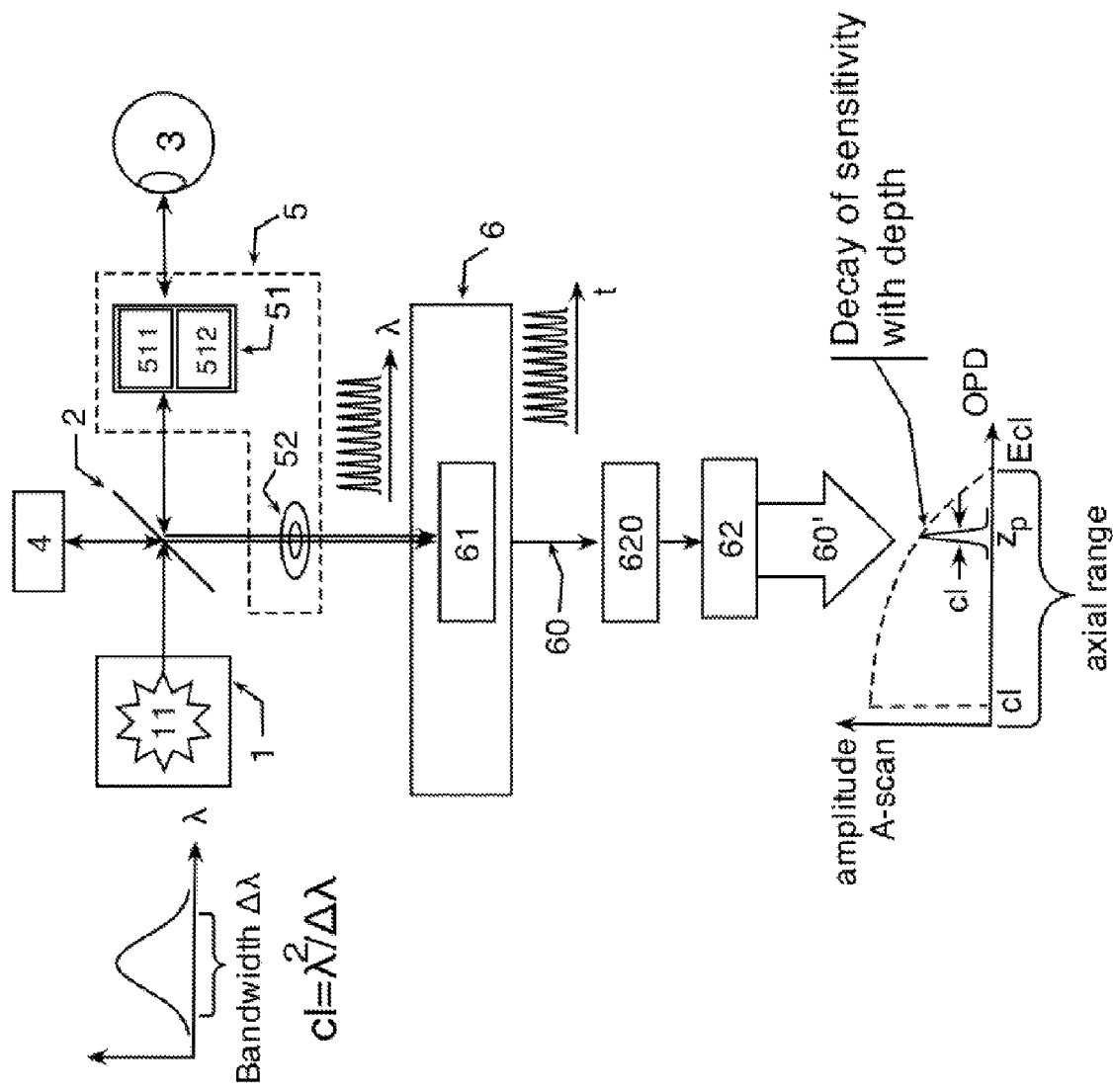
FIG. 1 shows, in diagrammatic form, the main elements of a SB-OCT set-up according to prior art.
Figure 2:
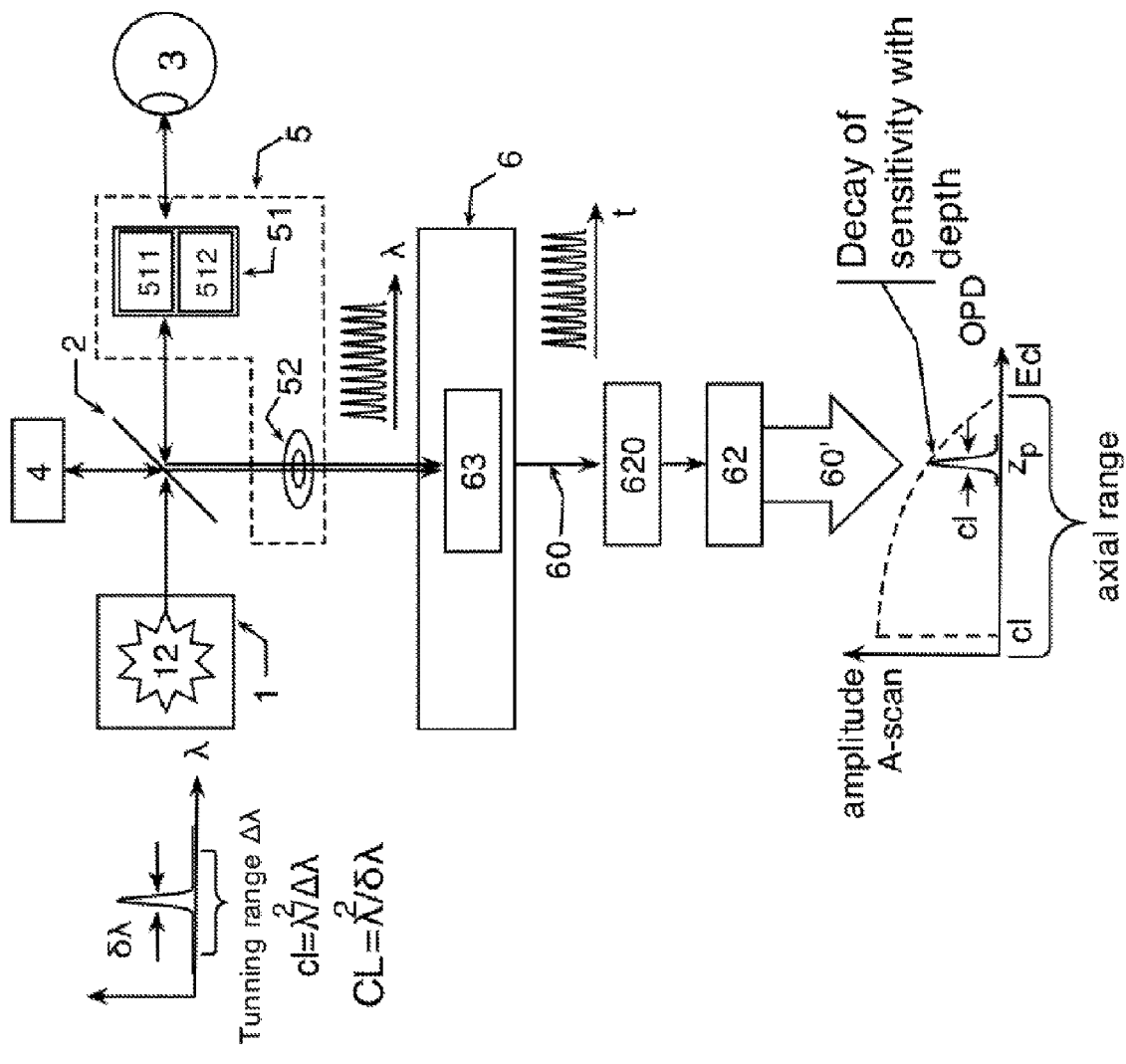
FIG. 2 shows, in diagrammatic form, the main elements of a SS-OCT set-up according to prior art.

FIG. 3'(a) illustrates a compound diagram of the prior art systems in FIGS. 1 and 2, showing the four basic elements of a SD-OCT prior art OCT. (i) Interferometer including an optical source, 1,2,4,5; (ii) A device for reading the spectrum at the interferometer output, a channelled optical spectrum reader, 6; (iii) Means to linearize the signal CS, 60, provided by 6, in block 620, a calibrator; (iv) an FFT processor, 62.

The invention discloses a method and systems, which rely on a comparison method of two channelled spectra. Such an embodiment is presented in FIG. 3'(b), where the last two blocks, 620 and 62 are replaced with a comparator, 64 or 64', which compares the channelled spectrum CS, signal 60, with a master reference signal, 70 or 70' respectively, as explained below.

A new class of spectral interferometry set-ups is disclosed, where signal 60 is acquired by a Slave interferometer in FIG. 4(a) (a Slave OCT system), on the right, 10, for an OPD value determined by a Master interferometer, 10M, on the left, which provides the master reference signal 70. In the Slave interferometer 10, the OPD is determined by the difference between the reference path length, measured from the slave beam-splitter 2 to the slave reference mirror 4 and the object path length, measured from 2 to different scattering points in the object, 3. In the master interferometer 10M, the OPD is determined by the difference between the optical path lengths measured from the master beam-splitter 2M to the two mirrors, master reference mirror 4M and master object mirror 3M.

The method is applicable to both methods of SDI as explained in FIGS. 1 and 2. Irrespective of the SDI principle employed, the output signals of the two spectral interferometers are made of electrical signals varying in time according to reading the channelled spectrum in each interferometer. In case of a SB-SDI method, using as optical source, 1, a broadband source 11, the signal is delivered by reading line cameras in the spectrometers in the slave channelled spectrum reader 6 and in the master channelled spectrum reader 6M. In case of a SS-SDI method, the optical source is tunable, 12 and the channelled spectrum readers 6 and 6M use photo-detectors (in case of flying spot) or cameras (in case of full field). By tuning the SS 12, a photo-detector in 6 and 6M outputs a signal proportional with the channelled spectrum.

At the core of the method disclosed here is the comparison block, 64. This compares the channelled spectra outputs of the two interferometers, master 10M and slave 10, $CS_{master}$ ($OPD_p$), signal 70, and $CS_{slave}$=S, signal 60 respectively. When the two patterns are similar, the comparison block 64 delivers a maximum signal. The more different the two patterns are, less is the amplitude of the output signal delivered by the comparison block 64. Possible comparing methods can be based on pattern recognition or other methods known in the art. A possible comparing method to be used here by way of example, involves correlation. Similar to an adaptive filter, a maximum signal is obtained at the output of 64, when the two signals applied to its two inputs are similar, i.e. when the number of peaks and troughs in the channelled spectrum delivered by the two interferometers, 10 and 10M, is the same. This means that the $OPD_p$ value in the master interferometer 10M determines from what OPD value in the slave interferometer 10, signal is collected from. Out of the multiple channelled spectra present at the output of the slave interferometer 10, due to multiple scattering points in depth in the object 3, maximum signal will be delivered by 64 for the component of the CS, 60, selected by the master interferometer 10M, i.e. for the $OPD_{slave}$=$OPD_{master}$. By modifying the $OPD_p$ (by moving 4M), signals from different depths inside the object 3 can be selected.

Without loss of generality, possible implementations for the comparison block 64 are shown in FIG. 5a and FIG. 5b.

The new principle of operation described above is different from that currently used in conventional SDI and presents some unique properties, which are detailed below. In conventional SDI, the processing of channelled spectrum is based on Fourier transformations in 62 in FIG. 1 and FIG. 2, or on other equivalent transformations of the signal delivered by the line cameras in a SB-SDI implementation or of the signal delivered by photo-detectors (or camera) in a SS-SDI implementation. In case an object 3, with multiple OPD values is inserted into the object path of the slave interferometer 10, by applying FFT to the signal produced, a conventional SDI based set-up would deliver peaks for all OPD values created by the multiple scattering points in 3, in the single signal so delivered. This is in fact one of the main advantage of SDI when compared with its time domain counterpart, that all OPD values are interrogated at once.

An OCT set-up is practically obtained by adding lateral scanning to a SDI set-up. In FIG. 4(a), 511 and 512 represent scanners in a two dimensional lateral scanning head, made from two galvo-scanners or from a resonant scanner grouped with a galvo-scanner to displace the object beam in the slave interferometer 10 over different pixels in transversal section of the object, 3. In the context of this disclosure however, transversal scanning means can also be replaced with linear or bidimensional cameras, and cover in this way both flying spot and full field implementations. At each new transversal position as determined by transversal scanners 511 and 512 (or pixels in a linear or bidimensional camera), a point of the A-scan is obtained, as determined by the $OPD_p$, selected in 10M.

If another OPD value is to be interrogated in FIG. 4(a), then the $OPD_p$ in the master interferometer 10M has to be readjusted. At a glance, the embodiment in FIG. 4a seems to be inferior to the prior art using FFT. Prior art SDI delivers the reflectivity from all points in the A-scan profile at once. However, as all components of the channelled spectra are present at the output of the slave interferometer 10, parallel processing can be incorporated into an improved set-up. This improved set-up may be equipped with as many P master interferometers as P points in the A-scan equivalently delivered by the conventional SDI method and with P comparison blocks (correlators), 64, in the slave interferometer 10. In this way, a MSI set-up can deliver p=1, 2, . . . P signals in parallel, a signal for each $OPD_p$ determined by the signal 70(p) delivered by each master interferometer.

Elimination of the Master Interferometer

Instead of replicating the master interferometer by P in FIG. 4(a), in order to provide P versions of the master reference signal 70, as suggested immediately above, a simpler set-up is shown in FIG. 4(b). Essential for the operation of P comparators (correlators) is the set of signals 70 delivered by P master interferometers. These signals represent the channelled spectra corresponding to P different $OPD_p$ values in the master interferometers. The channelled spectra, $M_p$, for multiple $OPD_p$ values can be sequentially measured using a single master interferometer and stored in a storage of masks, 7 which can be subsequently read during the measurement process to provide signal 70, consisting in P stored versions 70(p). This leads to an alternative arrangement to that in FIG. 4(a), where P master interferometers are replaced with a storage bank of P masks, and where the storage, 7, delivers a similar master reference signal, 70(p), to that previously delivered by the $p^{th}$-master interferometer, this time by simply reading a mask, 7(p).

Even more, the master interferometer can be totally eliminated and replaced by the slave interferometer itself, used in two steps, in a $1^{st}$ step to generate the masks, $M_1, M_2, \ldots M_p$, $\ldots M_P$ and in a second step, for the measurement of signals from unknown OPD values. In this case, the procedure starts with a model object, made from a mirror, replacing the object 3, and placed in the slave (and single) interferometer, 10. At this stage, the interferometer performs the function of the master interferometer, 10M, in FIG. 4(a). P OPD values, $OPD_1, OPD_2, \ldots OPD_p, \ldots OPD_P$ are created by placing mirror 4 in P positions and P channelled spectra, $M_1, M_2, \ldots M_P$ are recorded into the storage 7. After their storage, the interferometer 10 is used in the $2^{nd}$ stage, measurement, where the object under test, 3, replaces the model object in the object arm. In this $2^{nd}$ stage, parallel processing is performed, where each comparison block 64(p) compares (correlates) the current channelled spectrum, CS=S delivered by the channelled spectrum reader 6 with the $p^{th}$ stored version of the priory acquired and stored channelled spectrum in the mask $M_p$. In this way, parallel reading of P OPD values is reinstated, achieving the same characteristic specific to conventional SDI (all P OPD vales are read at once). Comparison blocks 64(1), 64(2), . . . 64(p), . . . 64(P) perform the operation of comparing the current channelled spectrum delivered by the interferometer 10, with the P masks: $M_1, M_2, \ldots M_j, \ldots M_P$. Each comparison block 64(p) delivers signal proportional to the similarity of the channelled spectrum signal due to the corresponding OPD in the interferometer 10, with the signal delivered by reading the mask $M_p$. As these masks were recorded for P OPD values in the $1^{st}$ stage, $OPD_p$, with p=1, 2 .... P, the embodiment in FIG. 4(b) delivers signals from depths $z_1, z_2, \ldots z_p, \ldots z_P$, where $z_p=OPD_p/2n$ in the object 3 of index of refraction n. The output of comparison operations, signals 640(1), 640(2), ... 640(p), ... 640(P) provided in parallel are parts of a signal 8 whose amplitudes are: $A_1$, $A_2, \ldots A_p, \ldots A_P$. These amplitudes define the profile of an A-scan acquired from the object 3. The prior art delivered such an A-scan along a single signal line using FFT. The method disclosed delivers similar information, however here the P points of the A-scan, from different depths, $z_p$, are delivered in parallel, along several lines. This confers an important advantage of the disclosed method in comparison to prior art, as signals corresponding to different depths are separated in hardware along physically separated lines, which can be conveniently used to construct numerous C-scans from numerous depths in parallel, with no need for software cut of the volume of data. The disclosed method could still deliver a cross section B-scan, where the points of each A-scan, sampled by the procedure, obtained for each transversal position scanned are connected to form T-scans at P depths and together form the B-scan OCT image, with the advantage that no linearization/calibration is required. More specifically, points from the same depth p on all A-scans are connected to form a T-scan for the depth p.

Essentially, various embodiments of the invention generically covered by that in FIG. 4(b) replace the FFT processor 62 and adjacent calibration block 620 with a comparator 64 and a provider of a master reference signal, 70.

Comparison by Correlation

A particular implementation according to the invention is where the comparison method implemented in 64 is based on correlation. In this case, the block 64 in FIG. 4(a) performs correlation and $Comp_{out}$, 640, is the modulus of the mutual correlation of the channelled spectrum delivered by the slave interferometer, $S=CS_{slave}$, in the form of signal 60 delivered by 6, with the channelled spectrum $CS(OPD_p)$, signal 70, delivered by the master interferometer 10M in FIG. 4(a).

$$Comp_{out}=Absolute\{CS_{slave} \otimes CS_{master}(OPD_p)\} \quad (2)$$

A single signal, 8, of amplitude $A_p$ is delivered.

The master interferometer 10M is replaced with the storage of masks 7 in the embodiment in FIG. 4(b). In this case, each block 64(p) in FIG. 4(b) performs the mutual correlation operation between the channelled spectrum delivered by the slave interferometer, $S=CS_{slave}$, signal 60, and the channelled spectrum delivered by the mask $CS(OPD_p)=M_p$, signal 70:

$$Comp_{out}(p)=Absolute[CS_{slave} \otimes M_p] \quad (3)$$

Each comparison block 64(p) delivers the output signal $Comp_{out}(p)$, 640(p). Multiple signals 8(p) can now be delivered by working out the amplitude $A_p$ of the output of multiple comparison blocks 64(p).

Embodiments in FIGS. 4(a) and 4(b) are equivalent, signal 640 is the modulus of the mutual correlation of the channelled spectrum S, in the form of signal 60 delivered by 6, with signal 70, which is either delivered by the master interferometer 10M in FIG. 4(a) or by a mask in the storage of masks, 7, in FIG. 4(b).

In FIG. 4(b), the block 64 contains P comparison blocks, 64(p), p=1, 2, ... P. They are used to compare the instantaneous signal, 60, proportional to the channelled spectrum CS=S, delivered by the spectrometer 61 in FIG. 1 or by the photo-detector block 63 in FIG. 2, part of 6, with the multiple signals 70, provided by the Storage mask block, 7, a signal line for each mask $M_p$. The mask $M_p$ is a stored version of the channelled spectrum obtained for a particular OPD value, $OPD_p$: $M_p CS(OPD_p)$. By comparing signals 60 with 70(p) in each channel p, the amplitude of the scattering wave from a scattering centre at an $OPD_p$ value is determined by each comparison block 64(p), delivering a spike in the signal 640(p). In other words, the recognition block 64(p) gives a maximum in its signal for the output signal $Comp_{out}(p)$, 640, only when the OPD in the interferometer matches the $OPD_p$ value to which $M_p$ corresponds to P such $OPD_p$ values are recognised simultaneously, in a single step consisting of downloading the signal 60 from 6 and signal 70 from 7.

Performing Correlation Via Three FFTs

The embodiments in FIGS. 4(a) and (b), implementing correlation in the comparison block 64 and in the multiple blocks 64(p) respectively, can be replicated as shown in FIG. 4'(a) and FIG. 4'(b), where correlation is performed via 3 FFTs. In FIG. 4'(a), the slave interferometer 10 selects signal from a depth in the object 3 dictated by the OPD in the master interferometer, 10M. Here, the channelled spectrum due to the object 3, CS(OPD)=S, 60, is subject to a Fourier transformation in 62 which delivers signal 60', representing the FFT [CS(OPD)] to the input of a block 64', replacing 64 in FIG. 4a. The channelled spectrum of the master interferometer 10M, is subject to FFT in 62M, to produce a conjugated version, $FFT^*[M_p(OPD)]$, which delivers signal 70' to the other input of 64'. The block 64' performs multiplication of signals at its input followed by an inverse FFT, to give the correlation of channelled spectra, 60 and 70:

$$Comp_{out}(p)=Absolute\{FFT^{-1}\{FFT[CS]\cdot FFT^*[CS(OPD_p)]\}\} \quad (4)$$

i.e. the same signal 640 as in FIG. 4a.

More detailed schematics of block 64' are shown in FIG. 5'a and FIG. 5'b.

Elimination of the Master Interferometer and Performing Correlation Via Three FFTs With reference to FIG. 4'(b), the master interferometer 10M in FIG. 4'(a) is replaced with a storage of masks 7'. The storage of masks, 7', differs from storage 7 in FIG. 4(b), as in this case the masks are the conjugate Fourier transformation of the channelled spectra $M_p$, i.e. $FFT^*(M_p)$. When acted to download or read, the storage 7' delivers signal 70'. This procedure saves time, as having stored the FFT of the channelled spectra, reduces the overall time for calculating the correlation to the time taken by two FFTs instead of calculating each time three FFT operations according to eq. (4). The blocks 64'(p) perform multiplication of signals at their inputs and an inverse FFT, to give the correlation of channelled spectra, 60 and 70.

$$Comp_{out}(p)=Absolute\{FFT^{-1}\{FFT[CS(OPD)]\cdot FFT^*(M_p)\}\} \quad (5)$$

i.e. the same signal 640 as in FIG. 4b.

Essentially, various embodiments of the invention generically covered by that in FIG. 4(b) replace the FFT processor 62 and adjacent calibration block 620 with a comparator 64' and a provider of a master reference signal, 70'.

Full Axial Range Spectral Domain Interferometry and Spectral Domain Optical Coherence Tomography All the above embodiments are compatible with methods of full axial range spectral domain interferometry. A full axial range method eliminates the mirror terms and doubles the axial range of SDI. Full axial SD interferometers and SD-OCT systems can operate at OPD=0. We refer here to all methods known of full axial range spectral domain OCT, reference to a particular method should not reduce the generality of the method disclosed.

Full Axial Range by Using a Modulator

A particular implementation is that of a frequency shifter, 80, placed in the interferometer. Such a solution works for both SB-SDI and SS-SDI and OCT embodiments. All functionality described so far operates without 80 in place, this is why the modulator 80 is shown in dashed line in FIGS. 4 and 4'. However care has to be taken for the mirror terms by placing the object 3 away from zero OPD value in all embodiments above without a modulator 80. The modulators 80 and 80M in FIGS. 4a and 4a' and modulator 80 in FIGS. 4b and 4b' act as a frequency shifter, this can be either a free space or an in-fibre modulator using an acousto-optic crystal. By frequency shifting the spectrum of the interference signal by more than the extension of the ac modulation of the channelled spectrum, the negative part of the spectrum is moved into the positive range of the frequency axis. In this way, positive and negative OPD values create different channel spectrum modulation, i.e. mirror terms are eliminated and the axial range is doubled. If 80 is placed in the system, then all functionality described above is conserved with the added bonus of doubled axial range. The Master/Slave Interferometry method implemented using the embodiment in FIGS. 4a and 4a' requires that the Master interferometer is also equipped with a modulator 80M, in order to compare like with like. This ensures that the process of generating the masks (for the 1$^{st}$ step) is performed using the same frequency shifter (or a similar device) to that in the slave interferometer. In FIG. 4b, the addition of the frequency shifter 80 has the effect of being used in the 1$^{st}$ process, of acquiring the masks as well as in the subsequent process of measurement/imaging. When 80M and 80 are in place, comparison block 64 in FIG. 4a and block 64' in FIG. 4a' respectively compare now channelled spectra generated in full axial range spectral domain interferometers, Master 10M and slave 10. When 80 is in place in FIG. 4b and in FIG. 4b', comparison blocks 64(p) and blocks 64'(p) respectively compare channelled spectra generated in full axial range spectral domain interferometers.

Alternatively, frequency shifting can be obtained by displacing the beam in the object path along 511, away from the pivot of the scanner, as disclosed in "Coherence Imaging by Use of a Newton Rings Sampling Function", Opt. Lett., Vol. 21, pp. 1789-1791, (1996), by A. Gh. Podoleanu, G. M. Dobre, D. J. Webb, D. A. Jackson. This has the effect of shifting the frequency of the interference signal. Block 80 generically represents this case as well, of frequency shifting due to the transversal scanner in the object arm. This is justified by the fact that placing the frequency shifting in the reference arm has the same effect as placing it in the object arm.

Full Axial Range by Using a Dispersing Element

Another solution is that where the blocks 80 and 80M are dispersing elements. Dispersion can be introduced by mismatching the length of glass and air in the two interferometer arms. Dispersion makes the channelled spectrum modulation for positive OPD different from the channelled spectrum for the same modulus of OPD, but negative. A possible solution for inserting dispersion is that of using coils of optical fibre and compensating for the wave path length in fibre with a longer air path in the other interferometer arm. Optical fibre with different sign of dispersion can be used in the object and reference path to enhance the dispersion. Another possibility is to use a spectral scanning delay line, made from a prism or a grating, a lens and a tilted mirror as explained in the U.S. Pat. No. 7,417,741, Transmissive scanning delay line for optical coherence tomography, by A. Gh. Podoleanu and J. A. Rogers. Other means known for people skilled in the art can be used to insert dispersion. No other alteration of the systems and methods so far are needed, apart from collecting the masks from both and negative OPD values. If without block 80, all masks were collected from one sign of the OPD range only, to avoid mirror terms, now they must be collected from both signs of OPD range. For instance, out of P=2i+1 masks, 1, 2, . . . i could be from the negative OPD, mask i+1 from OPD=0 and masks i+2 to 2i+1 from positive OPD. Dispersion modulates the channelled spectrum for OPD=0 and such a signal can be stored and used as a mask too. Using these masks, either C-scans or B-scans can be produced, free from mirror terms from positive as well as negative OPD values. The mask for OPD=0 retrieves information with maximum sensitivity and from the middle of the new axial range of the MS-OCT system.

In order to keep the losses low, ideally the dispersive medium should be inserted into the reference arm. Therefore, a longer object path in air needs to be created to compensate for the delay in the dispersive medium in the reference arm.

As another possibility for dispersion is the utilisation of an optical amplifier, either in fibre, or semiconductor. In this case, the dispersion introduced may suffice, i.e, the optical amplifier may accomplish two functions, amplification and dispersion.

From Morphological Structure to Dynamic Measurements

The comparison method disclosed here, of comparing two spectra at the output of two interferometers, as presented above, delivers structure information. Scattering points at matched OPD positions within the object 3 are identified based on the OPD in the master interferometer, as in FIG. 4a, or based on comparison with the masks in FIG. 4b.

The Master/Slave Interferometry method disclosed, can also be used to track, monitor and measure evolution of structures in motion. Flow can be equally measured.

The frequency of the photo-detected signal 60M read by 6M and of the frequency of the photo-detected signal 60 read by 6 is respectively:

$$f_M = U_M OPD_M \text{ and } f_S = U_S OPD_S \quad (6a,b)$$

where $U_M$ and $U_S$ are conversion coefficients specific for the master and slave interferometers. Let us say that the comparison block 64 is a mixer. The frequency of the signal delivered by the mixer is:

$$\Delta f = U_S OPD_S - U_M OPD_M \quad (7)$$

Let us say that the object 3 in FIG. 4a is a mirror moving at slave speed $v_S$ and that the mirror 4M moves at speed $v_M$. In this case, the difference of frequency varies as:

$$\frac{d(\Delta f)}{dt} = U_S \frac{dOPD_S}{dt} - U_M \frac{dOPD_M}{dt} = U_S v_S - U_M v_M \quad (8)$$

Then a band-pass filter on $\Delta f$ can detect similar speeds, $$v_S = v_M \text{ if } U_S = U_M \quad (9a,b)$$

in other words, if the two interferometers are similar, then the only speed in the slave interferometer detected is that determined by the master interferometer. The frequency $\Delta f$ can also be brought to zero if the $OPD_S = OPD_M$.

This procedure can have applications in the field of OCT angiography with no dye. In the prior art OCT technology, this is achieved by comparing the phases of successive channelled spectra acquired. FFT of CS determines the place in depth where flow is measured while the phase difference from a measured CS to the next CS collection determines the flow speed. Again, for resolution and sensitivity reasons, linearization and calibration of data is practiced in the conventional SDI and SD-OCT. These operation are not required for the method disclosed in this invention.

In the same spirit of employing the embodiments in FIG. 4 for structural information, velocities of scattering points can be assessed as well. This can be achieved either by using a master interferometer 10M with stationary or moving elements to create variable OPD values, as in FIG. 4a and FIG. 4a', or by creating masks, as for the embodiments in FIGS. 4b and 4b'. In this second case, different solutions can be implemented. A first solution can use similar masks as before, but where the comparison block 64 employs mixers. Beating of signals generated by the masks and by the current measured channelled spectrum creates a chirped signal of frequency zero when the scattering point traverses the $OPD_p$ value of the mask. The variation of the pulse created gives the speed of the scattering point. This method is similar to the conventional approach, where difference of successive channelled spectra are created, if the difference is zero, the scattering point is stationary, if it moved, a difference quantity is created which represents how much the displacement is in time T from one reading to the next. If in the conventional technique, channelled spectra are deducted from themselves, here differences are created between the current channelled spectrum, 60 and the masks, $M_p$ and producing a variable signal for the point in depth corresponding to the $p_{th}$ mask. Alternatively, differences of C-scans can be produced. For no movement in the image, the difference will be zero in all points. For those pixels subject to movement, differences will be different from zero. Using such differences, a map versus pixels (h, v) can be created in the plane (X, Y), leading to an en-face image of the flow directly. Such a procedure presents the advantage that eliminates the need for software cut required by the prior art, where the 3D volumes of the flow need to be cut to produce an en-face image of flow.

Another version employs dynamically created masks, such as movies of masks. In this case, for each position of the mirror 4, masks $M_{p,r}$ are recorded for different speeds of its movement, r, for a duration larger than the scanning, T determined by reading the camera 61 or tuning the SS 12. In the second stage, of measurement, the comparison block will detect both the axial position of the scattering point, p, and its speed, r.

Windowing the Output of the Correlator 64

The block diagram in FIG. 5a shows a first embodiment of the comparison block 64. This performs correlation, correlator block 40 of signal, 60, the channelled spectrum $CS_{slave}$=5, delivered by the channelled spectrum reader 6 in the slave interferometer 10, with the signal 70, $CS_{master}$ delivered by the master interferometer 10M in FIG. 4(a). Here, a single correlation block 64 is needed.

Another possibility, is for the correlator block, 40, to be replaced by a multiplier block, 92.

The block diagram in FIG. 5b shows another embodiment of the comparison block 64 for the embodiment in FIG. 4(b). This contains as many comparison blocks, 64(1), 64(2), . . . 64(P), as the number P of masks, M(1), M(2), . . . M(P) in 7. Each comparison block 64(p) performs correlation in 40(p) of signal, 60, the channelled spectrum CS=S, delivered by the channelled spectrum reader 6 in the interferometer 10, with many signals 70(p), delivered by the masks 7(p) in FIG. 4(b).

Another possibility, is for the correlator blocks, 40(p), to be replaced by a multiplier block, 92.

In order to sensitize the recognition of similar channelled spectrum shape, the constant term, the bias or dc, needs to be eliminated from the channelled spectra delivered by 6 and 7, respectively by 6 and all 7(p). This is performed with high pass filters 46. They could be introduced either before the correlation operation executed in the operator block 40, or after it, this is why they are shown in dashed line. It is known from the theory of adaptive filtering that the maximum of the mutual correlation is when the two signals exhibit similar shape, in this case when the channelled spectrum shape, described by 60, matches the shape of the $CS_{master}(OPD_p)$ 70 in FIG. 4(a) or the mask $M_p$ in FIG. 4(b), 70(p). If the result is limited to the amplitude collected in k=0, it would be too small. The mutual correlation will be unstable, depending on the phase difference between the mask and the CS. Therefore, to obtain a meaningful signal, with a maximum corresponding to a restricted interval in OPD around $OPD_p$, but of larger strength, the output $Comp_{out}$, 640, is sent to a windowing filter, 66 in FIG. 5(a) or each correlation results, 640(p) is sent to a windowing filter, 66(p) in FIG. 5(b). This determines the resolution in locating the $2z_p=OPD_p$ value, by applying a window around k=0 value, while also controlling the strength of the correlation. This can be conveniently used to define the depth resolution of the method. An adjustment, $\Delta k_p$, 67 in FIG. 5a or 6'7(p) in FIG. 5b, allows adjusting the window width, the smaller the value, the narrower the profile of output signal, 8 or 8(p) versus OPD and the better the axial resolution achieved:

$$A_p = \int_0^{\Delta k_p} Comp_{out}(p, k) \, dk \tag{10}$$

The interest is to measure the ac signal, the modulation of the output correlation function, therefore a block producing the modulus or a rectifier, 47, may be used after the correlation operation in 40. The window width should be at least a period of the correlation function. Let us consider that the spectrum is read in 2E pixels (number of wavelength steps in SS-OCT or number of camera pixels in SB-OCT), which can sample ac modulation terms in the channelled spectrum with up to E cycles. For each, s=1, 2 . . . E, a specific period results for the correlation function. For 2E pixels read, the correlation extends over 4E values. The channelled spectrum for depth p includes a modulation with p cycles. The correlation of two ac terms pulsating at the same frequency p gives a correlation pulsating at the same frequency. Therefore, for a current index s of a pixel, a period is $2W_p=2E/p$ and numerically the amplitude in (10) is estimated as:

$$A_p = A(OPD_p) = \sum_{w=W_p}^{W_p} Comp_{out,w}(p) \tag{10'}$$

The window $2W_p$ can in practice be the same for all masks, $W_p$=W at a value selected experimentally.

If 40 or 40 (p) are replaced with multipliers, 92 or respectively 92(p), then the windowing filter 66 acts as a low pass filter where the window width 67 is the low pass frequency cut-off.

Windowing the Output Signal Obtained after 3 FFTs

An equivalent processing to that in FIGS. 5(a) and 5(b) is performed by the embodiments in FIG. 5'. This continues to implement the comparison operation. However here, correlation is performed via three Fourier transformations. Instead of using the channelled spectrum of the master interferometer 10M in FIG. 4(a), its FFT* version (complex conjugate) is produced in 62M, as shown in FIG. 4'(a). Similarly, instead of storing the channelled spectrum of the mask, Mp, as in FIG.

4(*b*), the complex conjugate FFT of the mask is stored in the storage block, 7', as shown in FIG. 4'(*b*). The second FFT is that of the current channelled spectrum, 60, delivered by the slave interferometer, 10, in FIG. 4'(*a*), or by the interferometer in FIG. 4'(*b*). The signal 60 delivered by the channelled spectrum reader 6, is subject to FFT in 62, delivering signal 60'. The result is then multiplied with either the FFT* of the master interferometer in FIG. 4'(*a*) or with the stored signal of the FFT* of the mask, $M_p$ in FIG. 4'(*b*). By performing equation (4) in 64', similarity between the two channelled spectra, $CS_{slave}$, from the slave interferometer and $CS_{master}(OPD_p)$ from the master interferometer is assessed in FIG. 4'(*a*).

In the same way, by performing equation (5) in 64'(*p*), similarity between the two channelled spectra, $CS_{slave}$, from the interferometer in FIG. 4'(*b*) and that stored in the storage block 7' in its FFT* format is established.

Although the method in FIG. 5(*a*)' implemented in FIG. 4'(*a*) and method in FIG. 5'(*b*) implemented in 4'(*b*) starts from FFT of the channelled spectrum, produced by 62 of the block 6, it should be noted that the advantage of the method disclosed in FIG. 5' in comparison with the prior art spectral domain interferometry is that there is no need for linearization and calibration of data collected in signal 60' prior to FFT in 62. A distorted FFT, 60', due to chirping of signal 60 is compared with the FFT of the same distorted channelled spectrum, FFT*[CS(OPD$_p$)] or with FFT*(M$_p$). The block 64' in FIG. 5*a*' contains two parts, a multiplier, 92 followed by an inverse Fourier transformation block, 93, which delivers FFT$^{-1}$ of the signal resulting from the multiplication of 60' and 70'. For each mask p, in FIG. 5*b*', the block 64'(*p*) contains two parts, a multiplier, 92(*p*) followed by an inverse Fourier transformation block, 93(*p*), which delivers FFT$^{-1}$ of the signal resulting from the multiplication of 60' and 70' (*p*).

The embodiment in FIG. 4'(*b*) replaces the master interferometer 10M with the storage of P masks, 7'(*p*), to provide the master reference signal, 70'(*p*). The masks stored, 7', represent the FFT*(M$_p$) for each p. In this way, more points are delivered by the embodiment in FIG. 4'(*b*), from the A-scan in comparison with the embodiment in FIG. 4'(*a*) which provided a single point, at $z_p = OPD_p/(2n)$ only.

Channelled Spectrum Considered as a Superposition of Elementary Shapes Forming a Basis The channelled spectrum signal read by 6 and delivered as signal 60 in time, can be written as:

$$CS(k) = \sum_{p=0}^{P} d_p CS_{OPD_p}(k) \tag{11}$$

where $CS_{OPD}(k)$ is practically the spectrum of the source (OPD=0), a Gaussian with the spectrum bandwidth of the source 11 or the tuning bandwidth of source 12, $\Delta\lambda$, and no modulation, and where all other terms represent ac terms. i.e. modulation of the spectrum for different $OPD_p$ values. CS(k) represents a Gaussian on which several modulations are superposed, due to multiple signals coming from the object, 3, from different depths positions p=1, 2, ... P, corresponding to different P OPD values of scattering centres of reflectivity $d_p$.

If 6 provides a channelled spectrum linearly in k, then:

$$CS_{OPD_p}(k) \approx \sin(p \cdot k \cdot l_c) \tag{11'}$$

Due to the k nonlinearity, created by nonlinear sweep of the source 12 or by spectrometer 61, the time is not proportional to k and FFT cannot be applied until the data is resampled and reorganized linearly in k, in the current SD-OCT technology.

The mask (memory p) is practically the channelled spectrum stored for OPD=OPD$_p$ which is:

$$M_p(k) = CS_{OPD_0}(k) + CS_{OPD_p}(k) \tag{12}$$

Let us correlate the signal 60 with the memory $M_p$ and assume that:

$$CS_{OPD_p} \otimes CS_{OPD_p} = d_p \text{ and } CS_{OPD_p} \otimes CS_{OPD_r} = 0 \text{ for } r \neq p \tag{13a,b}$$

Equations (13a) and (13b) can be understood when the basis of functions $CS_{OPD_p}(k)$ is made of simple trigonometric functions such as in (11'). If they are chirped, as in reality, it could still be demonstrated that equations (13) stand. Then, $$CS(k) \otimes M_p(k) = d_0 + d_p \tag{14}$$

where $$d_0 = CS_{OPD_0}(k) \otimes CS_{OPD_0} \tag{15}$$

$d_0$ can be eliminated at the end, by using a high pass filter, 46, after the correlation operation in 40. The dc term can also be eliminated early in the process, by reading the channelled spectra 60 and memory 70 through high pass filters 46, as shown in FIG. 5*a* and FIG. 5*b*, giving after rectification, proportionality between $A_p$ and $d_p$.

Equation (11) considers the channelled spectrum as a superposition of a basis of functions $CS_{OPD_p}$ which are orthogonal on each other via correlation and the comparison method aims to identify the weight, $d_p$, of each such basis function in the overall shape of the CS in (11) at the output of the interferometer.

In conventional current spectral domain OCT, an FFT is performed of the CS(k):

$$FTT[CS(k)] = FFT\left[\sum_{p=1}^{P} d_p CS_{OPD_p}(k)\right] = \sum_{p=1}^{P} d_p FFT[CS_{OPD_p}(k)] = \sum_{p=1}^{P} d_p g_p(OPD - OPD_p) \tag{16}$$

The last term represents the A-scan, made from amplitudes $d_p$ at each OPD point $d_p$, where g(OPD) is the correlation function of the optical field and determines the axial depth resolution of the low coherence reflectometer or of the OCT system. In case the data is non linear in k, for larger p values, the function $g_p$ becomes wider than the theoretical correlation function and acquires shoulders. Therefore, the A-scan decay described by the last term in (16) decays quicker than it should and looks distorted.

While FFT calculation of equation (16) requires data organised linearly in k, the correlation with $CS_{OPD_p}$ applied to (11) to extract the weight $d_p$ does not. This confers the MSI the advantage of tolerance to chirped channelled spectra data versus k.

Extraction of weights $d_p$ in eq. (11) can be practiced by other means than correlation. For instance, multiplication of CS(k) in eq. (11) with one of the basis function, $CS_{OPD_p}(k)$, followed by integration over a period or several periods, leads to elimination of all other functions, $CS_{OPD_r}(k)$, for r different from p. Let us suppose that the spectrum is read along 2E pixels (number of wavelength steps in SS-OCT or number of camera pixels in SB-OCT). Simple multiplications leads to:

$$\sum_{s=1}^{2E} CS(k_s) \cdot M_r(k_s) = \qquad (17)$$

$$\sum_{s=1}^{2E} \left\{ \sum_{p=0}^{P} d_p CS_{OPD_p}(k_s) \cdot [CS_{OPD_0}(k_s) + CS_{OPD_r}(k_m)] \right\} =$$

$$d_0 + d_r + res$$

In (17) above, the orthonormality of trigonometric functions such as in (11) was assumed. Average of a product of $sinksl_c$ (channelled spectrum) with $sinkrl_c$ (mask) gives zero if r different from s. The approximate result to $d_0+d_r$ is due to the fact that the summation is over a limited number of pixels 2E, and so there are some residual terms, res. If ideally the average was extended to plus and minus infinity, then the residual term, res, would be close to zero. Products are performed much quicker than correlations and therefore recognition of shapes via multiplications of masks $M_r$ with the CS can be delivered much quicker, however with the disadvantage of some residual terms.

A configuration which performs multiplication instead of correlation looks similar to that shown in FIGS. 5a and 5b, where the correlator operator 40 is replaced by multiplication operator, 92, and the windowing filter 66 is now a low pass filter and its cut off is adjusted by 67. A high pass filter 46 needs to be used to eliminate $d_0$ followed by rectification in 47 to collect plus and minus oscillations of the signals resulting from multiplication 40 and then followed by low pass filter 66. The dc term can also be eliminated early in the process, by reading the channelled spectra 60 and memory 70 through high pass filters 46, as shown in FIG. 5a and FIG. 5b, giving after rectification $A_r \approx d_r$. For each mask p, the cut off frequency of the low pas filter 66 needs to be proportionally higher. Let us say that 2E=1024, in this case, p=1, 2, ... 512, for E possible cycles over the array of pixels 2E. A mask p selects the oscillation from the CS pulsating with a frequency p, ie with a number of p cycles over the array 2E. Therefore, the low pass filter has a cut off larger than p to cut the oscillation at double the frequency, 2p/2E.

Simulation

FIG. 6 describes a simulation of the correlation result according to the invention. Comparisons of signal 60 with master reference signal 70, determined by a master interferometer tuned on $OPD_p$ in FIG. 4a, or by a selected mask, $M_p$ in FIG. 4b, master reference signal 70(p), are shown for two situations. On the left, column 1: the OPD value in the slave interferometer in FIG. 4a or in the measuring interferometer in FIG. 4b is that selected by the Master interferometer in FIG. 4a or respectively that used to produce the mask, $M_p$ in FIG. 4b. The signal 60 delivered by 61 or 63 is shown in (b1), $CS_{slave}(z_p)$. On the right, column 2, the signal 60 is shown in (b2) for a different OPD, $z_p+\delta z$, in the interferometer 10, different from $z_p$, in the master, 10M in FIG. 4a, or different from that used to produce the mask in FIG. 4b. On the top line, (a1) and (a2) show the same signal, delivered by either the Master interferometer 10M, signal 70, $CS_{master}(z_p)$, or signal 70(p) from the Mask storage 7 for a given mask, $CS_{master}(z_p)= M_p$, respectively. The signal 60 is proportional to the channelled spectrum shown. The second line shows the comparison results: (c1) is the result of comparing (a1) with (b1) and (c2) is the result of comparing (a2) with (b2). In one aspect of the invention, the comparison block 64 in FIG. 4a or comparison blocks 64(p) in FIG. 4b operate as a correlator or respectively as correlators, in which case (c1) and (c2) show the output signal 640 or respectively 640(p). The comparison result delivers a larger signal in (c1) than in (c2), as result of recognition process, where $CS_{slave}(z_p)$ matches $CS_{master}(z_p)$ in FIG. 4a or $M_p$ in FIG. 4b, while $CS_{slave}(z_p+\delta z)$ does not. The comparison works on comparing master reference signal 70 delivered by the Master interferometer or master reference signals 70(p) delivered by masks, $M_p$ with 60 (current channelled spectrum, $CS_{slave}(z)$). The autocorrelation maximum is achieved in zero. Some residual wings from the correlation extend over the zero location, as shown in FIG. 6(c2). Bottom raw shows the signals 8 (FIG. 4a) or 8(p) (FIG. 4b) after rectification in 47 and after a windowing filter 66 (FIG. 4a) or 66(p) (FIG. 4b), within a controllable window width, $\Delta k$, 67 or 6'7(p) in FIG. 5. The smaller the window, the better distinction between the two cases, (d1) and (d2).

To improve the contrast of the comparison method, elimination of the dc components is performed. Simulation has shown that similar results are obtained if the dc is either eliminated from the two signals to be compared (correlated) or the dc of the final correlation result is passed through a high pass filter, 46. They are shown in dashed line, as high pass filters 46 could be placed either before or after the correlation, or in all three places as well. Such filters introduce phase delays, which need to be compensated for and their utilization is known by those skilled in the art of signal processing.

Similar results are obtained in FIG. 6 and FIG. 6' for the bottom screen, illustrating the result 8/8(p) if the operation of correlation, performed by 40 is replaced by multiplication, 92. In this case, according to equation (17), maximum is obtained when there is an oscillation in the channelled spectrum similar to the oscillation imprinted in the mask.

FIG. 6' describes the principle of the method according to the invention where the operation of correlation is performed using three FFTs, according to the details presented in FIGS. 5'a, and 5'b. The comparison block 64 in FIGS. 4a and 5a is replaced with 64' in FIG. 5a', which contains two blocks, a multiplier, 92 for the signals 60' and 70' and an inverse FFT block, 93, to implement equation (4). The comparison blocks 64(p) in FIGS. 4b and 5b are replaced with 64'(p) in FIG. 5'b, where each contains two blocks, a multiplier, 92(p) for the signals 60' and 70' and an inverse FFT block, 93(p), to implement equation (5). These operations are shown in FIG. 6' for two situations, similar to the two situations in FIG. 6. On the left, column 1: the OPD value in the slave interferometer in FIG. 4a' or in the interferometer in FIG. 4b' is that selected by the Master interferometer in FIG. 4a' or respectively that used to produce the mask, FFT*($M_p$) in FIG. 4b'. The channelled spectrum, signal 60, delivered by 61 or 63 is shown in (b1), $CS(z_p)$. On the right, column 2, the signal 60 is shown in (b2) for a different OPD, $z_p+\delta z$, in the interferometer 10, different from $z_p$, in the master, 10M in FIG. 4a', or different from that used to produce the mask in FIG. 4b'. FFT of signal 60 is signal 60'. On the top line, (a1) and (a2) show the same signal, delivered by either the Master interferometer 10M, master reference signal 70', FFT*[$CS_{master}(z_p)$] in FIG. 4a' or by the Mask storage 7'(p), FFT*($M_p$), master reference signals 70' (p) in FIG. 4b'. The rest are like in FIG. 6. The comparison works on comparing signal 70' delivered by the Master interferometer or signals 70'(p) delivered by masks, $M_p$ with 60' (FFT of the current channelled spectrum, S(z)). The signals 640 or 640(p) and signals 8 or 8(p) are like in FIG. 6, results of correlation of CS(z) with $CS_{master}(z_p)$ in FIG. 4a and FIG. 5a or with $M_p$ in FIG. 4b and FIG. 5b.

Spectrometer Based Interferometer and Spectrometer Based OCT

FIG. 7 describes in more detail a SB embodiment of the apparatus according to the invention. The optical source, 1, contains a broadband emitter, 11. Here, a comparison block, 64, compares the signal from the spectrometer 61 with the channelled spectrum stored in the masks M(p), 7(p), in the Mask storage 7. 64 consists in P comparison blocks, 64(p), with a block for each point in depth, 1, 2, . . . P. In one possible implementation, 64 could be a correlator or several correlators, This, or each comparison block, 64(p), compares the signal 60 proportional to the current spectrum delivered by spectrometer 61 with the signal 70(p) provided by the mask $M_p$, delivered by 7(p). The block 7 delivers a reference channelled spectrum signal, 70(p) for each $OPD_p$ value. In this case, for each mask p, only one signal, 8(p), is delivered, of amplitude $A_p$ shown at the bottom of FIG. 6, according to the procedure detailed in FIG. 5b. This amplitude corresponds to the amplitude of signal in the decay of sensitivity with depth shown in FIG. 1, for the same depth $z_p$. The prior art delivered signals reflected from all depths within the A-scan, at once. This embodiment according to the invention delivers signal for a selected depth, $z_p$ only, for each of the comparison blocks 64(p), and each windowing block, 66(p) for p=1, 2 . . . P. Signal 60 is applied in parallel to all entries of blocks 64(1), 64(2), . . . 64(P). For any given depth, $z_p$, block 7 contains a specific mask, $M_p$, and the comparison blocks 64 (p) via windowing filters 66(p) deliver the amplitudes of the reflectivities, $A_p$, of the scattering points at $z_p$. Because the signal 60 contains, once delivered, all channelled spectra, for all depths, parallel decoding can be performed using P comparison blocks 64(p), which opens the possibility of the solution disclosed here, which allows lower cost and faster processing with no need for calibration and linearization.

FIG. 7' shows, in diagrammatic form, the main elements of a SB-OCT apparatus according to the invention, where correlation of channelled spectra, current and stored, are performed via Fourier transformations. To this effect, blocks 64'(p) with the internal structure shown in FIG. 5'b are used. Each block 64'(p) with p=1, . . . P delivers signal corresponding to the reflectivity of a scattering point in depth situated at respectively $z_1, z_2, \ldots z_p$. Here, a block 62 providing the Fourier transformation of the spectrometer 61 data, becomes part of the multiple comparison block 64'. Each block 64'(p) (p=1, 2, . . . P) multiplies the FFT of the instantaneous channelled spectrum provided by 62 with the masks 7'(p) in 92, where each mask delivers the conjugate FFT of the channelled spectrum stored for $OPD_p$. Then, an inverse FFT is worked out inside 64'(p) in blocks 93. For each mask 7'(p), a signal, 8(p) is delivered, of amplitude $A_p$ shown at the bottom of FIG. 7'. This amplitude corresponds to the amplitude of signal in the decay of sensitivity with depth shown for the same depth $z_p$. The prior art delivered all signals in depth within the A-scan, signal 60'. This embodiment according to the invention delivers signal for a selected depth, $z_p$ only, for each of the blocks 64(p)' and each windowing filter, 66'(p), with p=1 to P. Signal 60' is applied in parallel to all entries of blocks 64'(1), 64'(2), . . . 64'(P). For any given depth, block 7' contains a mask 7'(p) and each filter 66(p) delivers a point from the A-scan. Because the signal 60 contains, once delivered, all channelled spectra, for all depths, parallel decoding is performed using P blocks 64'(p), which opens the possibility of the solution disclosed here, which allows lower cost and faster processing with no need for calibration and linearization.

The embodiments in FIGS. 7 and 7' can perform versatile operation. As described above, a reflectivity profile in depth (A-scan) can be constructed in two different ways. This can be obtained by:

(1) synthesizing the A-scan from P points provided in parallel by the P blocks 64(p) or 64'(p) respectively or, (2) by FFT of the channelled spectrum 60, delivered by the block 62 as signal 60'. The difference between the A-scan determined by the P points obtained in the MSI method and the A-scan determined by signal 60' is that if data in signal 60 is not organised linearly in optical frequency, then the A-scan 60' will decay much quicker with depth than 8.

Alternatively, when the embodiment in FIG. 7' is used in OCT, employing the lateral scanning device 51, then en-face OCT images (C-scans) can be inferred from different depths in two ways: (1) by creating P C-scans in parallel using signals provided by the P blocks 64(p) or 64'(p) or (2) by assembling the whole volume of the object 3 from HV A-scans made of FFT of the signal 60 and performing P cuts along the depths in the volume so created. The second procedure is the prior art and requires linearization of data.

Swept Source Based Interferometer and Swept Source Based OCT

FIG. 8 shows, in diagrammatic form, the main elements of a SS-OCT apparatus according to the invention. The optical source, 1, contains a tunable laser, 12. Here, the signal delivered by the photo-detector block 63 (in the case of flying spot implementation or camera, in the case of full field implementation) is delivered to a comparison block, 64. In one possible implementation, this could be a correlator. This compares the signal 60 proportional to the current measured delivered by photo-detector 63 with the signal 70 provided by the mask $M_p$, delivered by the Mask storage 7(p). In this case, for each mask 7(p), signal 8(p) delivers only one point within the axial range, corresponding to an OPD value for which the mask was recorded. The amplitudes of signals 8(p) are shown at the bottom of FIG. 8 and correspond to the usual decay of sensitivity with depth in SS-OCT.

For parallel processing, block 7 contains P masks, 7(p), block 64 contains P comparison blocks 64(1), 64(2), . . . 64(P) and block 66, contains P filters, to provide all P depths in parallel. As shown, P points are provided by P channels, each made of a comparison block 64(p) and a filter 66(p) delivering signal 8(p), i.e. the points of the A-scan shown at the bottom can be delivered in parallel.

FIG. 8' shows, in diagrammatic form, the main elements of a SS-OCT apparatus according to the invention where the comparison is performed by three FFTs. The blocks 64'(p) perform the operation of comparison by performing an inverse FFT of the product of signals 60' and 70'. Signal 60' is the FFT of the current channelled spectrum, CS, delivered by photo-detector 63. 70'(p) is provided by the mask 7'(p), which is the stored version of the conjugate of the channelled spectrum $M_p$, delivered by the Mask storage 7'(p). In this case, for each mask p, the filter 66(p) delivers the reflectivity of the scattering point, $A_p$, at depth $z_p$, corresponding to the $OPD_p$ value for which the mask '7'(p) was recorded. Signal 8 is made from a collection of signals 8(p) delivered in parallel by P channels, each made of a block 64'(p) and a filter 66(p). The amplitudes $A_p$ of components of signal 8 are shown at the bottom of FIG. 7' and they correspond to the usual decay of sensitivity with depth in SD-OCT. However, in comparison with the prior art, where the decay shown is that given by a single signal, 60', along a single line, delivered by FFT of the channelled spectrum 60, in this disclosure, 8 is made from many values at points, 1, 2, . . . P, all delivered in parallel by P channels. For parallel processing, block 7' contains P masks, block 64' is made from P comparison blocks and block 66' made of P filters, to provide all signals for all P depths in parallel. As shown, P points are provided as signal 8, i.e. the points of the A-scan shown at the bottom can all be delivered in parallel in the invention, as opposed to the prior art.

Embodiments in FIGS. 8 and 8' can perform versatile operation. As described above, a reflectivity profile in depth (A-scan) can be constructed in two different ways. This can be obtained by:

(1) synthesizing the A-scan from P points provided in parallel by the P blocks 64(p) or 64'(p) respectively or (2) by FFT of the channelled spectrum 60, delivered by the block 62 as signal 60'. The difference between the A-scan determined by the P points using MSI and the A-scan determined by signal 60' is that if the data in signal 60 is not organised linearly in optical frequency, then the A-scan determined by 60' will decay much quicker with depth.

Alternatively, when the embodiment in FIG. 8' is used in OCT, employing the transversal scanning device 511 and 512, then en-face OCT images (C-scans) can be inferred from different depths in two ways: (1) by creating P C-scans in parallel using signals provided by the P blocks 64'(p) or (2) by assembling the whole volume of the object 3 from HV A-scans given by 60' and performing P cuts along the depths in the volume so created. The latter procedure corresponds to the prior art and requires linearization of data.

In FIGS. 7, 7', 8 and 8', modulators 80 are not needed for the functionality explained, this why they are shown in dashed line. However, if used, the axial range of the embodiments is doubled and OPD=0 can be placed in the middle of the object 3, as explained above in relation to the embodiments in FIGS. 4a, 4b, 4a' and 4b'.

Comparison Operation Using a Limited Number of Multiplications in the Calculation of Correlation According to equation (10'), rectified (absolute value of) correlation followed by an windowing block 66 is equivalent with calculating the comparison result by using a limited number of delays applied to a rectified correlation function. This reduces considerably the number of multiplications needed:

$$A_p = A(OPD_p) = \qquad (18)$$

$$\sum_{s=-W_p}^{W_p} Comp_{out,s}(p) = \sum_{w=-W_p}^{W_p} Abs\left\{\sum_{k=1}^{2E} M_p(k+w) \cdot CS(k)\right\}$$

Here k is the pixel number along the wavenumber, k coordinate. Such an approach reduces the time required for the comparison operation implemented via correlation. If the windowing filter 66 selects only W=2W$_p$+1 delays points of the correlation result, then this means that out of the total of 4E+1 delays used in the full calculation of correlation, only W are retained. Signals of length 2E are multiplied W times only in equation (18).

An embodiment to perform a limited number of multiplications, W, to evaluate equations (10) or (10') as detailed in (18), is shown in FIG. 9, In order to speed up the processing, the mask, M$_p$ is delayed in 2W$_p$+1 versions and placed in the memory 7(p) with W$_p$ outputs as master reference signal 70(p). 2W$_p$+1 multipliers 92$_w$(p) multiply the master reference signals 70$_w$(p) for each delayed version of the mask 7$_w$(p) with the channelled spectrum 60. The summation of the product for each pixel along the wavenumber coordinate, k, is practiced in a summator 72(w), its result is then rectified by block 47$_w$ (to accomplish the absolute function in (18)). The outputs of all summed products are then added up in 72 which provides the correlation result 8(p), i.e. a point of the A-scan at depth z$_p$. Considering E=P, for each point p:

$$W_p = P - p + 1 \qquad (19)$$

i.e. the first point, A$_1$ requires 2P+1 multiplications, while A$_P$ only 3 in order to perform the averaging operation over one cycle of the ac modulation of the channelled spectrum. In practice it may be possible that a fixed number W$_p$ may suffice for all P points, to eliminate the phase instabilities between the mask and the channelled spectrum, with the advantage that each mask 7(p) requires the same memory space.

The procedure disclosed in FIG. 9 can be used in FIGS. 7 and 8 to replace each memory mask 7(p) and comparison blocks 64(p) and eliminate the windowing blocks 66(p). Even further, the multiplier blocks, 92$_w$ can be replaced by mixers if a digitizer is used to create an analogue signal for the stored versions of the masks, 7$_w$, as explained more below in connection with the embodiments in FIG. 12-15.

Production of Masks

FIG. 10 shows, in diagrammatic form, the preparation step of any of the above embodiments in FIGS. 7, 8 and 9 where initially, separate channelled spectra are acquired and stored as masks. Prior to any measurement, masks corresponding to various OPD values, M$_1$, M$_2$, ... M$_p$, M$_P$ (channelled spectra of different modulation frequencies) are recorded and stored in the Reference Block 7 (Storage of masks) as 70(p). For this step, the galvo-scanners 511 and 512 are kept at rest and not used.

FIG. 10' shows, in diagrammatic form, the preparation step of any of the above embodiments in FIGS. 7' and 8' where initially, separate channelled spectra are acquired and their conjugate FFTs are stored as masks. Prior to any measurement, masks corresponding to various OPD values, FFT*(M$_1$), FFT*(M$_2$), ... FFT*(M$_p$), ... FFT*(M$_P$) (complex conjugate versions of channelled spectra of different frequencies) are recorded and stored in the Reference Block 7' (Storage of masks). For this step, the galvo-scanners 51 and 52 are kept at rest and not used.

In the embodiments in FIGS. 10 and 10', a model object, 3', made from a mirror is used, 31. Let us say that the axial OPD range is 4 mm and the coherence length, cl=20 microns (calculated from the bandwidth Δλ of source 11 or from the tuning bandwidth of source 12). In such a case, P=200 pixels can be defined axially for an axial range Δz=2 mm, and a depth resolution of lc/2=10 microns. This requires a number of pixels of at least 2E=2P=400 in the camera in 61, when using SB-OCT or the same number of resolved points in the tuning spectrum of source 12 when using SS-OCT. The mirror 31 is placed at z$_p$ (with p=1, ... P) positions separated by l$_c$/2 and P channelled spectra, as P masks are acquired and stored in the Reference block 7 (Storage of masks), or 7'. These spectra in FIG. 10 (or their complex conjugate FFTs in FIG. 10') define the set of masks to be subsequently used in the measurement or imaging step. When masks M$_p$ are read in FIGS. 7 and 8, blocks 7(p) deliver corresponding signals 70(p), to be compared with the current measured signal 60. When masks M'$_p$ are read in FIGS. 7' and 8', blocks 7'(p) deliver corresponding signals 70'(p), to be compared with the current measured signal 60' (in fact, the comparison is still performed of signals 60 and 70 as in FIGS. 7 and 8).

In FIGS. 10 and 10', modulators 80 are not needed for the functionality explained, this why they are shown in dashed line. However, if used, the axial range of the embodiments is doubled and OPD=0 can be placed in the middle of the object 3, as explained above in relation to the embodiments in FIGS. 4a, 4b, 4a' and 4b'. This allows doubling the axial range to 24z, which requires collection of a double number of masks, P, acquired from positive as well as positive values of OPD, to generate full axial range OCT images, for the same axial resolution, in comparison to the case with no modulator 80. If block 80 is not used, then masks are collected from one sign of the axial range only.

A similar procedure is used when scanners 511 and 512 are replaced with cameras, such as in embodiments in FIGS. 26, 27, 28 and 29.

Dispersion Corrected Masks

If the object 3 to be measured or to be imaged is known, and its dispersive properties are also known, then the P steps used before to provide P axial positions are modified to include P thin slabs, 32, shown in dashed line in FIGS. 10 and 10', of $l_c/2$ thickness in air, made from the same material as the object 3, which are inserted in the path towards the mirror 31. The model object, 3' now consists from the slabs 32 and mirror 31. In this way, in the second process of measurement or imaging of objects made from a similar material, the dispersion introduced by the object material is automatically compensated for. For each new slab, a corresponding channelled spectrum is collected, distorted by dispersion of the material. Such a procedure eliminates the need of subsequent signal processing steps to correct for the distorted succession of troughs and peaks in the channelled spectrum due to dispersion.

Compensation for Curved Objects and Scanning Distortions

Alternatively, P masks are collected for each (h, v) pixel in transversal coordinate, as determined by 511 and 512, from a flat mirror 31. In the presence of such scanning distortions, the masks p from different pixels (h, v) differ. The utilization of such P masks in the $2^{nd}$ stage, imaging, with a set P for each pixel (h, v), allows for automatic compensation of scanning distortions.

As yet another possibility, the model object, 3', may consist in a curved mirror 31. P masks $M_{h,v}(p)$ are collected in the first stage, for each pixel (h, v), where p does not signify an OPD value but the number in the set of axial positions of the reference mirror, 4, used in FIG. 10 or 10' to collect the P masks. In this case, de-warping of curved objects with the same curvature is achieved in the $2^{nd}$ stage, imaging, by comparison of channeled spectra, 60, with such masks for each lateral pixel (h, v).

Software Generation of Masks

The masks 7, $M_p$, for embodiments in FIG. 4(b), FIG. 5(b), FIG. 7, FIG. 8 and FIG. 9 can also be generated in software. The masks 7', FFT*($M_p$) for embodiments in FIG. 4'(b), 5'(b), FIG. 7' and in FIG. 8' can also be generated in software. No measurement is needed. If the variation of the index of refraction with wavelength is known, then the shape of the channelled spectrum can be inferred theoretically and masks, $M_p$ and respectively FFT*($M_p$), can be created for each step increase of the dispersive material thickness of the object 3.

Further Improvement of Sensitivity

Comparison of masks with the channelled spectrum, CS, due to noise created by the reference power in the interferometer varies from mask to mask. Therefore, it may be necessary to store not only the masks of CS, but the noise created within signal 8 when no object is in place. Such noise values, $N_p$ are obtained as shown in the inset in dashed line in FIG. 10, containing P noise values, a noise value for each mask, that are stored in a separate memory, 7N(p), with p=1, 2 . . . P. These are stored to be deducted in the $2^{nd}$ stage, measurement, from the signal delivered by the comparison operation in 64, as described below in FIG. 11.

Similarly, in FIG. 10', noise values 7'N(p) are stored to be deducted from the signal 8. These are stored to be deducted in the $2^{nd}$ stage, measurement, from the signal delivered by the comparison operation in 64', as described below in FIG. 11'.

Comparison of Channelled Spectra

The MSI method and apparatuses disclosed can also be employed to recognize materials. As the method disclosed is based on comparison, only when the material in the object 3 produces an identical channelled spectrum to that expected, maximum of components 8(p) of signal 8 are produced in FIGS. 7, 8, 7', 8' and 9.

Generation of En-Face OCT Images in Real Time

FIG. 11 shows, in diagrammatic form, an embodiment of the invention that produces simultaneously P en-face OCT images. Comparison with each mask signal, Mp delivered by mask 7(p), can be performed via correlation, multiplication, or by any other means mentioned or known in the art, and provides an intensity, $I(x_h, y_v, z_p) = I_{h,v,p} = 8_{h,v}(p)$ in the final image corresponding to the transversal pixel (h, v) selected by the transversal scanners 511 and 512. For each transversal pixel (h, v) out of the matrix (H, V), the embodiment delivers P amplitudes $A_{h,v,1}, A_{h,v,2}, \ldots A_{h,v,p}, \ldots A_{h,v,P}$, each corresponding to a depth value, for each distinct resolved point along the depth axis in the object 3. An en-face image is formed from all signals with (h, v) indices of intensity $A(x_h, y_v, z_p) = 8_{h,v}(p)$, signals $8_{h,v}(p)$ generated for the same p value, where p=1, . . . P. The blocks 64(1), 64(2), . . . 64(P) deliver P values of the comparison results, output of the comparing procedures implemented. The comparison procedure compares the channelled spectrum currently acquired, delivered as signal 60, by 61 or 63, depending on the embodiment in FIG. 7 or 8 respectively, with the shape provided by each mask, $M_p$, for each $OPD_p$ value in 7(p). Each comparison block 64(p) is followed by a filter (windowing block) 66(p). The method disclosed is exquisitely suitable to parallel processing. The calculation of all P, 8(p) values for any given transversal pixel, (h, v), can be organised in parallel, in a time required to work out a single comparison, $T_{Comp}$.

For any given line in the frame, indexed by v, determined by the voltage on the frame scanner 512, comparison block 64 delivers a T-scan $8_{allH}(v, 1)$ from depth 1, a T-scan $8_{allH}(v, 2)$ from depth 2, . . . and a T-scan $8_{allH}(v, P)$ from depth P, ie a T-scan from each different depth p, with p=1, 2, . . . P, which are stored for further organisation of data. Then the process is repeated as shown by a second block on the right for a new index v to values 1, 2, . . . V by acting on the scanner 512. By collecting V T-scans for any given depth, p, en-face images C-scan(1), C-scan(2), . . . . C-scan(p) at respective depths, 1, 2, . . . P are assembled.

FIG. 11 determines simultaneous collection of signals to build P en-face images simultaneously from multiple depths, in the duration of scanning a single frame only. For position 1 (for the $1^{st}$ line in the frame) of the beam determined by the frame galvo-scanner 512, $8_{1,1}(1), 8_{1,1}(2), 8_{1,1}(3), \ldots 8_{1,1}(P)$, signals from P depths are collected when galvo-scanner 511 (line) points the beam towards point (1,1), then simultaneous collection of $8_{2,1}(1), 8_{2,1}(2), 8_{2,1}(3), \ldots 8_{2,1}(P)$ signals from P depths takes place when scanner 511 points the beam towards point (2,1) . . . and simultaneous collection of $8_{H,1}(1), 8_{H,1}(2), 8_{H,1}(3), \ldots 8_{H,1}(P)$ signals from P depths takes also place when scanner 511 points the beam towards point (H, 1).

The H points $8_{1,1}(1), 8_{2,1}(1), \ldots 8_{H,1}(1)$ form the $1^{st}$ T-scan, T-scan$_1$(1)=$8_{allH,1}(1)$ in the en-face raster (C-scan), at depth 1.

The H points $8_{1,1}(2), 8_{2,1}(2), \ldots 8_{H,1}(2)$ form the T-scan$_1$(2)=$8_{allH,1}(2)$ in the en-face raster at depth 2.

The H points $8_{1,1}(p), 8_{2,1}(p), \ldots 8_{H,1}(p)$ form the T-scan$_1$(p)=$8_{allH,1}(p)$ in the en-face raster at depth p.

Finally, the H points $8_{1,1}(P), 8_{2,1}(P), \ldots 8_{H,1}(P)$ form the T-scan$_1$(P)=$8_{allH,1}(P)$ in the en-face raster at depth P.

Then the process repeats for the scanner 512 pointing towards a direction determining the second line in the raster. $8_{1,2}(1), 8_{1,2}(2), 8_{1,2}(3), \ldots 8_{1,2}(P)$ signals from P depths are acquired when galvo-scanner 511 (line) points the beam towards point (1,2), then simultaneous collection of $8_{2,2}(1)$, $8_{2,2}(2), 8_{2,2}(3), \ldots 8_{2,2}(P)$ signals from P depths takes place when scanner 511 points the beam towards point (2,2) and simultaneous collection of $8_{H,2}(1), 8_{H,2}(2), 8_{H,2}(3), \ldots 8_{H,2}(P)$ signals from P depths takes place when scanner 511 points the beam towards point (H, 2).

The H points such collected form the 2nd lines in the en-face rasters, T-scans, at depth 1, 2, ... P. All such P T-scans are collected in the time required to collect a single T-scan.

The H points $8_{1,2}(1), 8_{2,2}(1), \ldots 8_{H,2}(1)$ form the $2^{nd}$ T-scan line in the en-face raster (C-scan), T-scan$_2(1)=8_{allH,2}(1)$, at depth 1.

The H points $8_{1,2}(2), 8_{2,2}(2), \ldots 8_{H,2}(2)$ form the $2^{nd}$ T-scan line, in the en-face raster at depth 2, T-scan$_2(2)=8_{allH,2}(2)$.

The H points $8_{1,2}(p), 8_{2,2}(p), \ldots 8_{H,2}(p)$ form the $2^{nd}$ T-scan line, in the en-face raster, T-scan$_2(p)=8_{allH,2}(p)$, at depth p and so on.

Finally, the H points $8_{1,2}(P), 8_{2,2}(P), \ldots 8_{H,2}(P)$ form the $2^{nd}$ T-scan line, in the en-face raster at depth P, T-scan$_2(P)=8_{allH,2}(P)$.

The process repeats, until the scanner 512 points towards a direction determining the last line in the raster. $8_{1,V}(1), 8_{1,V}(2), 8_{1,V}(3), \ldots 8_{1,V}(P)$ signals from P depths are collected when galvo-scanner 511 (line) points the beam towards point (1,V), then simultaneous collection of $8_{2,V}(1), 8_{2,V}(2), 8_{2,V}(3), \ldots 8_{2,V}(P)$ signals from P depths takes place when scanner 511 points the beam towards point (2,V) . . . and simultaneous collection of $8_{H,V}(1), 8_{H,V}(2), 8_{H,V}(3), \ldots 8_{H,V}(P)$ signals from P depths also takes place when scanner 511 points the beam towards the last point (H,V). The H points such collected form the last lines, V, in the en-face rasters, T-scans, at depths 1, 2, ... P, all such T-scans collected in the time required to collect a single T-scan.

The H points $8_{1,V}(1), 8_{2,V}(1), \ldots 8_{H,V}(1)$ form the $V^{th}$ T-scan line, in the en-face raster (C-scan), at depth 1, T-scan$_V(1)=8_{allH,V}(1)$.

The H points $8_{1,V}(2), 8_{2,V}(2), \ldots 8_{H,V}(2)$ form the $V^{th}$ T-scan line in the en-face raster at depth 2, T-scan$_V(2)=8_{allH,V}(2)$.

The H points $8_{1,V,P}, 8_{2,V,P}, \ldots 8_{H,V,P}$ form the $V^{th}$ T-scan line, in the en-face raster at depth P, T-scan$_V(P)=8_{allH,V}(P)$.

Finally, the V T-scans, made of $8_{allH,v}(1)$ points, with v=1, ... V, are put together to form the en-face image (C-scan) $8_{allH,allV}(1)$ at depth 1. Similarly, the V T-scans, $8_{allH,allV}(2)$ are put together to form the C-scan $8_{allH,allV}(2)$ at depth 2, and so on, the V T-scans, $8_{allH,v}(p)$, are put together to form the C-scan image $8_{allH,allV}(p)$ at depth p, and so on up to the last depth, P.

For improved signal to noise ratio, noise values, $N_p$, can be subtracted from each signal 8 as above using differential amplifiers 68(p), where $N_p$ values are stored in a separate memory 7N(p) for each mask stored 7(p), as explained in connection with FIG. 10.

FIG. 11' shows, in diagrammatic form, another embodiment of the invention that produces simultaneously P en-face OCT images (C-scans). The embodiment is similar to that in FIG. 11, with the difference that correlation is calculated via the algorithm described in FIG. 5'b. Here blocks 64(p)' are used instead, an FFT is performed in 62, part of 64', to obtain 60', and, 64(p)' performs multiplication of signal 60' with the masks FFT*($M_p$), 70'(p). The rest is the same as in FIG. 11.

For improved signal to noise ratio, noise values, $N'_p$ can be subtracted from each signal 8 as above using differential amplifiers 68(p), where $N'_p$ values are stored in a separate memory 7'N(p) for each mask stored FFT*($M_p$), as explained in connection with FIG. 10'.

The extraction of stored noise masks may not be necessary if the optical source and environment are not noisy; this is why the insets in FIGS. 10 and 10' and the differential amplifiers 68 in FIGS. 11 and 11' are shown in dashed line.

The time to collect spectral data from HV points in transversal section is $T_V$=HVT, for HV acquisitions, each of time T, where T is the period of SD-OCT scanning (either line rate of the camera in SB-OCT or source tuning rate in SS-OCT). If the line rate is 1 MHz, then T=1 µs. Let us say that H=V=500 and that the comparison time $T_{Comp}$, required by 64(p) in FIG. 11 (or by 64' in FIG. 11') can be made shorter than T=1 microsecond in the current technology. As the comparison blocks 64 (1 to P) perform all comparisons in parallel, all comparisons are instantaneous with data collection. Then, if all P comparisons are performed in parallel in a time for a single comparison procedure and $T_{Comp}$<T, then the time to create all P en-face images is: $t_{enface/Comp,min}=T_V+T_{Comp}$=0.25 s+1 µs, i.e. practically little time is required in addition to the acquisition time. If the processing is done afterwards, sequential for each pixel (h, v) in transversal section of object 3, then $t_{enface/Comp,max}=T_V+HVT_{Comp}$. Considering a $T_{Comp}$ equal to the time to produce 2 FFTs, 2 µs, this gives: 0.25 s+0.5 s=0.75 s. This estimation considers that the comparison operations start after the acquisition of data, however in practice comparison operations may start with the acquisition and the overall time is between $t_{enface/Comp,min}$ and $t_{enface/Comp,max}$. For each point (h, v), P points are instantaneously placed within the P en-face frames at the same position (h, v) determined by the voltages on the scanners 511 and 512. The process runs in parallel and data is written in buffers with a buffer for each en-face OCT image at each depth p. Extra time, $t_D$, is only required to fetch the corresponding image from the buffers, which is in the range of microseconds.

Let us evaluate the time to create all en-face images in the prior art technology, via FFT, linearization, and software cut. The minimum time is given by the time to acquire the volume of data, $T_V$, plus the time to assemble all data in a volume of HV A-scans, $T_A$, plus the time to produce the software cut for all P C-scans, in a time $T_{cut}$: $t_{enface/FFT,min}=T_V+T_A+T_{cut}+T$. Here it was considered that FFT for all transversal pixels is evaluated on the fly, in the scanning time T, therefore only one time interval is required after all HV scans, and the P cuts are done in parallel by a graphics card in the time to perform a single $T_{cut}$. This gives 0.25 s+1 µs as above, $+T_A+T_{cut}$. These extra times may require several milliseconds. This shows that the minimum achievable time in prior art and using the technology disclosed here is similar if no linearization is required. In many reports in prior art, the FFT cannot be done on the fly. The process of linearization, zero padding, etc, followed by Fourier transformation requires a much longer time, $T_{FFT}$, for each pixel in transversal section, (h, v), ie $T_{FFT}$>>T. In this case the time to produce P en-face images is: $t_{enface/FFT,max}=T_V+HVT_{FFT}+T_A+PT_{cut}$. In practice, graphic cards again can be used to perform parallel processing of each scan, i.e. linearization and FFT, so the overall time is between $t_{enface/FFT,min}$ and $t_{enface/FFT,max}$.

The current invention eliminates the need for linearization and all other signal processing steps required by FFT. If T$_{FFT}$>$T_{Comp}$, then $t_{enface/Comp,max}$ is less than $t_{enface/FFT,max}$. Normally, if the comparison process uses correlation, then when using two FFTs as presented above in FIGS. 5'a and 5'b, $T_{Comp}=2T_{FFT}$. The process of linearization and zero padding may however be more time consuming than the time to produce an FFT.

The stored masks are themselves nonlinear, but this is not a problem now, as the nonlinearity is present in both terms being compared by 64 (64'), in the current measurement, signal 60, and in the measurement step producing the mask, signal 70 (70'). While linearization is required of data in prior art, in the present invention, maximum of signal is obtained when comparing two similar nonlinearly chirped signals as well as when comparing two linearized signals.

For comparison, let us now consider that FFT of the signal delivered by 61 or 63 can be produced in the time T (scanning time) for each (h, v) pixel in transversal section. In this case, a similar parallel procedure as that described in FIG. 10 can be implemented in prior art, where $A_{h,v,p}$ amplitudes of signals are delivered for each p depth, p=1, . . . P, towards assembling P en-face OCT images. The process runs in parallel and data is written in buffers with a buffer for the en-face OCT image at each depth p. Extra time, $t_D$, is only required to fetch the corresponding image from the buffers. So similar time may be achieved using the prior art, FFT processing technique in order to produce a batch of en-face OCT images and store them. However, such a procedure would be based on FFT, therefore the data delivered by 61 or 63 needs to be linear on optical frequency. Similar performance with the procedure in the current disclosure can be achieved only if the signal 60 is delivered in equal optical frequency slots.

As the method according to the invention relies on parallel processing, as shown in FIG. 11 and FIG. 11', the method can take advantage of superior computational power of graphics cards. Such procedures, as required for the operation of systems in FIGS. 6, 6', 7, 7', 8, 8' and 9 are better suited to be implemented by graphics cards than by central processing units in PCs. Comparison with all P masks stored can be done in parallel for all depths. The applicability of graphics cards for parallel processing in OCT has been proven in several reports, such as in "Real-time resampling in Fourier domain optical coherence tomography using a graphics processing unit", published by S. Van der Jeught, A. Bradu, A. Gh. Podoleanu in J. Biomed. Opt., Vol. 15, Issue 3, JBO Letters, 030511 (2010); J. Biomed. Opt./Vol. 15/doi:10.1117/1.3437078. Alternatively, parallel processing can be implemented using Field Programmable Gate Arrays (FPGA), according to means known in the art.

Similarly, if flow information is to be extracted, consecutive acquisitions of CS, signal 60, are compared with the masks, for each channel p, differences are created in parallel. In this way, P en-face images of flow are obtained from P depths. This requires a simple modification of the last process in the diagram in FIGS. 11 and 11', to compare the results obtained over repetitions of acquisitions.

FIG. 12 shows a different embodiment than that in FIG. 7, where the mathematical operation of comparison is replaced with instantaneous recognition of shape using a mixer. Block 65 represents a mixer followed by a low pass filter. One input to 65 is provided by the camera in the spectrometer 61, signal 60. The other input is provided by a SB-OCT set-up, a Master interferometer 10M, in fact a SD interferometer where no lateral XY-scanner 51 is employed and as a model object, a mirror 31 is used. This system operates as a SD interferometer, providing a reference-channelled spectrum due to the OPD value selected by the axial position of mirror 31. A complete OCT system, the Slave interferometer 10, is shown on the right, equipped with transversal scanners, 51, and collecting images from the object 3.

Alternatively, scanners 51 are eliminated and the interface optics 51 accommodates pixels in a 1D or 2D camera (like many pinholes in 52 in a camera, with a pinhole for each pixel).

The channelled spectrum delivered by the Master interferometer 10M acts as a mask for the channelled spectrum read by the Slave interferometer 10 from the object 3. In other words, the Slave interferometer 10 outputs signal for an $OPD_p$ value dictated by the Master interferometer 10M. Both SB-OCT systems are driven by the same optical broadband source, 11 in 1 and they should contain similar optical devices, such as lenses and fibre couplers, in order to produce similar channelled spectra for similar OPD values. A similar camera based spectrometer 61M to the camera based spectrometer 61 is employed by 10M, delivering master reference signal 70. By reading the two cameras in the two spectrometers 61 and 61M in synchronism secured by line 13, the mixer 65 mixes signals 60 and 70 and provides signal 8, only when the channelled spectra delivered by the two OCT systems are identical. In other words, mixing will only provide strong signal for that channelled spectrum read from the object 3, which coincides with the channelled spectrum from the depth $z_p$ selected by the axial position of mirror 31 in the master interferometer 10M.

FIG. 13 represents an improvement on the embodiment in FIG. 12. Here the Master interferometer 10M providing the mask is replaced by a digitizer, 71, which reads a selected mask from the bank of stored masks in the storage of the Reference block/Mask storage 7. The Mask storage 7 and its digitizer 71 reading the masks are together equivalent to the SB-interferometer system 10M in FIG. 12. Instead of reading two similar cameras in the spectrometers 61 and 61M in FIG. 12, here an electrical line 13 synchronously reads the mask $M_p$ provided by the digitizer 71 in synchronism with reading the camera in the spectrometer 61. A similar signal 70, to that delivered by 61M in FIG. 12 is delivered by the digitizer 71 in FIG. 13.

FIG. 14 shows a different embodiment than that in FIG. 8, where the mathematical operation of comparison of channelled spectra in an SS-OCT system is replaced with instantaneous recognition of shape using a block, 65. A possibility for 65 is to use a mixer followed by a low pass filter. One input to 65 is provided by the photo-detector block 63. The other input is provided by a SS-OCT set-up, in fact a SD Master interferometer, 10M, where no lateral XY-scanner 51 is employed and as model object, a mirror, 31 is used. This is the Master interferometer 10M. This system operates as a SD interferometer, providing a reference-channelled spectrum due to the OPD value selected by the axial position of mirror 31. A complete OCT system, the Slave OCT system, 10, is shown on the right, equipped with transversal scanners, 51, and collecting images from the object 3. The channelled spectrum delivered by the SS-Master OCT, 10M, acts as a mask for the channelled spectrum read by SS-Slave OCT10 from the object 3, delivering signal 70. In other words, the slave OCT system outputs signal for an OPD value dictated by the Master interferometer 10M. Both SS-OCT systems, Master and Slave are driven by the same optical source, 12 and they should contain similar optical devices, such as lenses and fibre couplers, in order to produce similar signals for similar OPD values. By sweeping the frequency of the swept source 12, the mixer 65 mixes signals 60 and 70 and provides signal 8, with significant strength only when the channelled spectra delivered by the two OCT systems are identical. In other words, mixing will only provide strong signal for that component in the channelled spectrum read from the object 3 by 10, which coincides with the channelled spectrum from the depth $z_p$ selected by the axial position of mirror 31 in the SS-Master OCT 10M.

FIG. 15 represents an improvement on the embodiment in FIG. 14. Here the SS-Master interferometer system providing the mask is replaced by a digitizer, 71, which produces a signal to the mixer 65 by reading the selected mask from the bank of stored masks in the Reference Block 7. The block 7 and its reader 71 are together equivalent to the SS-Master interferometer 10M in FIG. 14. Instead of having the same SS 12 driving the two interferometer systems, 10 and 10M in FIG. 14, here the mask $M_p$ is read in synchronism with sweeping the frequency of the SS, 12, synchronism secured by line 13'. A similar master reference signal 70, to that delivered by photo-detector 63M in FIG. 14 is delivered by the digitizer 71 in FIG. 15.

The embodiments in FIG. 12-15 present an important advantage in comparison with the report mentioned above, by B. R. Biedermann, W. Wieser, C. V. Eigenwillig, G. Palte, D. C. Adler, V. J. Srinivasan, J. G. Fujimoto, and R. Huber in Optics Letters, Vol. 33, No. 21/1, (2008), pp. 2556-2558. In the embodiments in FIG. 12-15, the signal 60 does need to be resampled and interpolated (linearized or calibrated). A chirped signal delivered by the spectrometer 61 or photo-detector 63, in the slave interferometer 10, is compared with an equivalent chirped signal delivered by the master interferometer 10M. The mixer 65 will deliver a maximum only if the two signals coming from the two interferometers are adjusted on similar OPD values and are chirped in the same way. All other signals will produce modulations, which will be rejected by the low pass filter following the mixer in 65.

Simply, the embodiments in FIG. 12-15 tolerate chirped signals and do not require linearization/calibration.

Similarly, if flow information is to be extracted using the embodiments in FIGS. 12 to 15, consecutive acquisitions of CS(OPD), signal 60, are compared with the mask signal provided by 71, for each channel p, and differences are created of signals 8, obtained of such repetitions of acquisitions. In this way, an en-face image of flow is obtained from the depth, corresponding to the shape of the channelled spectrum synthesized by the synthesizer 71.

Depth Resolution Adjustment

In the embodiments presented above, thin C-scans are obtained, with the thickness of the cl/2. By averaging together several C-scans obtained in FIG. 7, 7', 8 or 8', let us say, m, collected at an axial interval δz between the masks, a compound C-scan image is obtained, of thickness mδz. Simply, this can be done by reading simultaneously m masks and compounding m components of the signal 8. Alternatively, in the equation (10), the frequency interval Δk can be enlarged, with the effect of increased thickness and poorer depth resolution. The same enlargement of resolution happens when performing multiplication, according to equation (17), in which case 66 is a low pass filter. The same effect is obtained in equation (18), by increasing the number of delays W.

In FIGS. 12-15, by increasing the bandwidth of the low pass filter in the mixer in 65, the axial thickness of the C-scan image can be increased. Alternatively, applying P several masks of P stored signals via synthesizer 71, to a collection of P mixers, 65, each mixer will return signal for several C-scan images simultaneously, determining several components in the signal 8, to create a compound, thicker C-scan image. Without loss of generality, FIGS. 12-15 presents production of a single point along the A-scan, however it should be obvious in the spirit of multichannel architecture illustrated in FIGS. 7, 7', 8, 8', that the same can be achieved here, with a set of mixers 65(p) (which include low pass filters) and a set of masks 7(p). For clarity, the operation of a single channel is described in FIGS. 12-15 only, but they could easily be expanded to parallel provision of points P along the A-scan and together with the scanners 51, to parallel provision of P en-face images.

Alternatively, the signals 60 and 70 to be compared can be truncated, by selecting their central parts only. This leads to less sensitivity, less axial resolution, but may increase the speed in providing images. To secure sufficient sensitivity, preferably the channelled spectrum delivered by masks, 70, is truncated only.

As another alternative, mixers can be used to implement the multiplication operations part of the processing in equation (18). Therefore, in FIG. 12-15, the individual mixer 65 can be replaced with W mixers to implement the operation of W multipliers, 92$_w$, followed by summation blocks 72$_w$ in FIG. 9. In addition, the individual storage 7 is replaced with multiple W delayed versions of the same, 7$_w$, and the digitizer 71 provides analogue signals to the W mixers.

Parallel Reading of the Spectrum

Modern technology of fast spectrometers can provide reading in parallel. The simplest solution is that of an array of photo-detectors to replace the linear camera in the spectrometer 61 in FIG. 7. An array of 256 photo-detectors with 256 wires can be constructed from 16 commercial arrays, each of 16 photo-detectors.

Another alternative is that of array of waveguides. Telecom industry has developed array waveguide devices (AWD), these can provide multiple optical windows from one optical waveguide, in parallel. Terminating the output waveguides with photo-detectors create a parallel reading spectrometer. However the channels may not be exactly spaced in optical frequency, which again would require calibration in case FFT is employed.

Comparison methods are better suited than FFTs when data is provided in parallel, and this is the principle applied in FIG. 16.

Let us say that the spectrometer 61 in FIG. 7 can provide Q channels in parallel, a minimum would be let us say Q=256 to ensure an axial range of 1-2 mm in depth. In this case, the line signal 60 contains 256 parallel lines. Each channel q in the spectrometer produces a maximum photo-detector current when the optical frequency at the spectrometer input aperture is within a spectral window, $k_q$. The Q channels may split the channelled spectrum uniformly or non-uniformly. In this embodiment, the comparison block 64 is a digitizer with 2Q inputs, Q inputs being connected to the parallel spectrometer 61 and the other Q inputs being connected to block 7 which provides also the mask signals, in parallel. The Q comparison blocks in 64, 69(1), 69(2), ... 69(Q) operate by comparing like with like, i.e. each comparison block compares the q channel from 60 with the q channel from 70.

A simple procedure for comparison is for 64 to contain Q AND gates with two inputs. The two inputs of each AND gate 69 are connected to the same optical channel in 60 and 70. When the two spectra provided along lines 60 and 70 are similar, all Q gates will respond with a maximum signal cumulated into a global output sent to a processing block 88. However, phase variations of the OPD may lead to the two channelled spectra 60 and 70 to be out of phase or even in anti-phase. To reduce the sensitivity to phase instabilities, the comparison procedure can be modified in two possible ways, by using the modulator 80, now a phase modulator. A first possibility is to repeat acquisition for several values of phase steps applied to 80. A second possibility is to modulate the phase via 80 at a high frequency, F, which results in modulation of the interferometer signal at the same rate. In this case, the Q AND gates 69 are replaced with Q product gates. Each product block produces a signal pulsating at the same frequency F, as long as the channelled spectrum in 60 is similar to that in 70. When the channelled spectra are different, the signal output from the multiplying block pulsates at a frequency different from F and can be rejected by a filter on each output within 88.

The phase modulator 80 can operate at frequencies above 100 MHz, 10 cycles averages would mean 100 ns. This corresponds to providing all en-face OCT images in 100 ns, with tremendous advantages in terms of tolerance to movement.

Experimental Demonstration

A proof of concept of the method disclosed is demonstrated using a SS-OCT system, based on a balanced OCT system driven by an Axsun SS, 12, at 100 kHz line rate. The basic configuration implemented is that in FIGS. 8 and 8', with a more detailed presentation of the interferometer part in FIG. 17. A two-coupler configurations is employed, fibre coupler 2 and 21 in FIG. 17, replacing the generic splitting element 2 in FIG. 8, terminated with a balance detection receiver, 63, made from a differential amplifier 633 equipped at its inputs with photo-detectors 631 and 632. A balance photo-detector unit from Thorlabs, model PDB460C was used. The reference beam is routed in transmission towards the balanced coupler 21, via mirrors 43 and 44 replacing generic mirror 4 in FIG. 8, placed on a translation stage 45, to adjust the air path of the reference arm. Focusing elements 41 and 42 are used to collimate and respectively focus light back into fibre. Light in the object arm coming from single mode fibre 211 is collimated with focusing element 513, towards a Cambridge Technology 6115 pair of scanners, 511, 512, followed by an interface optics, equipped with lenses 514 and 515. The signal 60 from the balanced receiver 63 is sent to the display and measuring block 100, inside a personal computer (PC), equipped with a digitizer 90 and a processing block, 91, implementing the functions of blocks 7, 64 and 66, under the software control. As digitizer 90, an Alazartech dual input digitizer board, 500 MB/s, (model ATS9350) was used. Its second input is used for the clock signal delivered by the clock block, 75 in the Axsun swept source, 12, part of the calibration block, 620 in prior art, shown in dashed line. The digitizer 90 accomplishes the functions of the multiple channel comparison block 64. The digitizer was also used to produce the FFT of the signal 60, i.e. was also used to operate as block 62 and 620 in FIG. 2 (this is why 620 is shown sharing some part with 90), to provide comparative data with the prior art based on FFT, as detailed below. This is why 620 and 75 are shown in dashed line, as they are not necessary for the scope of the invention, here being used for calibration, as required by the prior art, for the scope of presenting comparatively results obtained by using the conventional FFT-SDI method and the MSI method disclosed here.

The channelled spectrum delivered by the slave measuring interferometer is compared with masks measured with the same set-up. The comparison method used is correlation.

The proof of concept set-up in FIG. 17 was used in two steps, as described in the disclosure, in relation to FIG. 5b. In the first step, P channelled spectra, $M_p$ were recorded using a mirror acting as a model object, set at $z_p$, p=1, 2, . . . P. The depth separation, δz, between consecutive measurements, using the slave interferometer as a master interferometer to record the masks, displacing the mirror in the model object, was different depending the case in FIG. 18, 19, 20, 21, 21', as explained below. In the process of recording the P reference channelled spectra for the P masks, 511 and 512 were held at rest, sending the beam on axis.

A Labview program, ProgCorr was developed, based on National Instruments virtual instruments, which implements correlation based on 3 FFTs, according to equation (5). Using this Labview program, correlation was performed of all $M_p$ masks with the signal 60, delivered by the photo-detector 63, to deliver the signal amplitudes 8(p), $A_1, A_2, \ldots A_P$.

A second Labview program, ProgCorr', was devised to implement the comparison operation in FIGS. 7' and 8', where one FFT operation is placed in the memory 7'.

A third Labview program, ProgMult was implemented for equation (18).

A fourth program, ProgFFT, was implemented for prior art, conventional FFT processing, to accomplish the function of block 62. The software devised to acquire and manipulate data was implemented using Labview 2012, 64 bit, from National Instruments.

The four programs have a common coding core that acquires and digitizes data from the photo-detector 63 via the Alazartech digitizer. The core of the programs also included the necessary code to drive the galvo-scanners 511 and 512 and also to feed the Alazartech board with one of the TTL signals required to build an en-face or a volumetric 3D image (via a DAQ board from National Instruments, model 6071E), the second TTL signal required being made available by the Axsun SS (to mark the stop and start of tuning).

FIGS. 18, 19 and 20 illustrate the capabilities of the MSI method disclosed in comparison with the conventional SDI method based on FFT. In this case, the object 3 is a mirror.

FIG. 18 shows the sensitivity drop-off profiles for both the FFT method (ProgFFT) and using the MSI method according to the invention, based on correlation (ProgCorr). If the linewidth of the swept source spectrum determines a number of 2E pixels along the coordinate wavenumber k, in sampling the optical spectrum at the interferometer output, the summation of products of the two terms to evaluate eq. (3) is performed over 4E+1 points in wavenumber, k. For the data in FIG. 18, FIG. 19 and FIG. 20, 4E+1=2561 points. The integral over the window 67 is worked out as a summation over the correlation results, within a window of W points around k=0 in the wavenumber space, along k in equation (10').

It is however expected for the signal to noise ratio to reduce with the window size. For the MSI method, the SNR, is defined as:

$$SNR(Corr) = 20\log\left[\frac{A(OPD), \Delta k, \text{sample arm unblocked}}{A(OPD), \Delta k, \text{sample arm blocked}}\right] \quad (20)$$

This is similar to time domain interferometry case and time domain OCT, where signal is delivered from a single depth at any given time. The result, for different values of the window Δk, is shown by the curved curve with a maximum in FIG. 20b.

For the FFT based a priori method, shown by the constant curve in FIG. 20b, the SNR is defined as:

$$SNR(Corr) = 20\log\left[\frac{\text{Amplitude } FFT \text{ signal } (OPD)}{\text{Amplitude noise floor}}\right] \quad (21)$$

The sensitivity of the both methods was measured by first adjusting the reference arm signal, such that the spectrum at the photo-detectors was near to their saturation value. Then a neutral density filter, characterized by an optical density OD=2 was placed into the sample arm and equations (20) and (21) were used to which 40 dB was added to take into account the OD=2.

The sensitivity drop-off in FIG. 18 is normalized for z=0.25 mm in both situations: A-scan produced by FFT (dashed line) and by correlation (solid line), for three values of the window width, W: 10, 100 and 320. To produce the A-scan in FIG. 18 with the method according to the invention (solid line), the channelled spectrum acquired, 60, was cross-correlated with P masks, $M_p$, providing P points (P=8) of the A-scan, measured a priori for 8 OPD values distributed from 0.25 mm, then at 0.5 mm steps from 0.5 mm all measured in air, with a point for each mask, as delivered by the ProgCorr. To produce the A-scan based on the conventional FFT technology (dashed line), ProgFFT was employed to perform the function of the FFT processor, 62. As it can be noticed, the slope of the sensitivity drop-off is quite similar in both cases, between 5-6 dB.

To demonstrate that the comparison method is immune to non-calibrated data, A-scans for both, calibrated and non-calibrated channelled spectra were acquired. FIG. 19*a* shows A-scans produced by FFT and by correlation for a re-sampled channelled spectrum (the external k-clock signal provided by the swept source was used to perform the re-sampling), and in FIG. 19*b*, the channelled spectra used to produce the A-scans was not re-sampled (the internal clock of the digitizer was used for sampling the data). The full width at half maximum of the A-scan peaks corresponding to the OPD of the mirror position used as object 3, defines the depth resolution of the system. The OPD in the interferometer was adjusted on 1.28 mm.

When the prior art FFT based SDI method is used, the depth resolution depends on the quality of the clock signal. A depth resolution as small as 21 µm is achieved when using the external k-clock (dashed curve in FIG. 19*a*), which can be as large as 106 µm when no re-sampling is performed (dashed curve in FIG. 19*b*). On the other hand, the MSI technique is completely immune to the way in which data are sampled, the depth resolution in both situations is the same (14 µm), solid lines in both FIGS. 19*a* and 19*b*. For this measurements, using a mirror and the scanners at rest, the OPD values were adjusted in 64 positions, symmetric, around an OPD value of 1.28 mm, using the translation stage 45, controlled in steps of 1 µm. P=64 channelled spectra were collected and stored as memories M(p). A set of masks was acquired while using the clock on and off and the respective set was used for each case. In FIG. 19*a*, the solid line was obtained by using the clock on and employing the masks acquired with the clock on. In FIG. 19*b*, the solid line was obtained by using the clock off and using masks recorded with the clock off.

It is also demonstrated that by conveniently windowing the correlation signal, 67(p) in the filters 66(p) according to FIG. 5*b* and FIG. 6, it is possible to achieve better depth resolution than in conventional systems where the quality of data re-sampling impacts the level of depth resolution that could be achieved. To obtain a meaningful signal, with a maximum corresponding to a restricted interval around the depth to be measured, the signal obtained by correlation, 640(p), is windowed around the zero frequency, according to equation (10'). In this way, by applying a window around the k=zero value, the signal is enhanced. This window can be also conveniently used to define the depth resolution of the system. The smaller the window width value W~Δk, the narrower the profile of the output signal, versus OPD and the better the axial resolution achieved. This effect, of using block 66, is demonstrated in FIG. 20*a*, where the depth resolution of the system was measured as a function of the window size applied to the corre-lation signal. A number of 2E=1280 sampling points were used to digitize the signal corresponding to a sweeping scan of the full spectral range. As a consequence, the maximum width of the window which can be applied to the correlation signal is W=2561. For a very narrow window size (<10 points), a depth resolution as small as 10 µm could be achieved. This is smaller than the best value experimentally obtained using the FFT method in FIG. 19*a*.

Then the proof of concept set-up in FIG. 17 was used to produce en-face OCT images of tissue. A telescope of two lenses, in 4f configuration was used between the scanners 511/512 and the eye of a volunteer to obtain images of the lamina cribrosa in the optic nerve. To obtain images from the skin of a thumb of a volunteer, an extra lens of 2 cm focal length was used after the telescope above. The images are all 200 pixels×200 pixels. To produce an en-face image using ProgCorr, no resampling of data, FFTs or software cutting were performed. Instead, correlations between stored masks and channelled spectra were calculated using the techniques specified above. The depth separation between consecutive C-scans is 30 µm measured in air, determined by the density used in collecting the masks in the $1^{st}$ stage of the measurement process.

To produce an en-face image using ProgFFT, after acquisition and digitization, A-scans corresponding to each sweep were produced by FFT (like using the 62 and 620 in FIG. 2). For benchmarking purposes data were resampled using a cubic spline interpolation prior to FFT. The volumetric data made of the 40,000 A-scans was then software cut to produce an en-face image at the depth required.

The optic nerve and finger were placed slightly away from OPD=0 to avoid mirror terms disturbing the image. Therefore, out of the 64 images, only 48 C-scan images of lamina cribrosa are shown in FIG. 21, from the middle of the set. Out of the 64 images, only 36 C-scan images of skin are shown in FIG. 21', from the middle of the set. In FIGS. 21*a* and 21'*a*, images were obtained using the conventional FFT technique, linearization, calibration and software cut of the 40000 A-scan volume. In FIGS. 21*b* and 21'*b*, images were obtained with the MSI method disclosed here and employing correlation. The voltage on the lateral scanners 511/512 was adjusted to have the lamina fill the entire image in FIG. 21. The voltage on the lateral scanners 511/512 was adjusted to cover a size of 4.4 mm×4.4 mm of skin.

Similar images are obtained with both methods. To produce the images using the conventional FFT technique, deduction of an average image from all B-scans was used to reduce the noise, according to normal practice, as described in "Fourier domain optical coherence tomography system with balance detection", *Opt. Express* 20, 17522-17538 (2012), by Bradu, A. and Podoleanu, A. Gh. This method however creates saturation lines in the images in points where there is a strong reflectivity signal. The novel method, based on correlation, is immune to this phenomenon, as another advantage. The images in FIG. 21'*b* are free from this pattern noise.

The experiment performed allowed an evaluation of the time required and resources by the two methods, FFT based SDI (prior art) and the novel method, MSI, both applied to SS-OCT. The results obtained are shown in Table 1. An Intel® Xeon® CPU, model E5646 (clock speed 2.4 GHz, 6 cores) was used. For 200×200 pixels in transversal section, 40,000 channelled spectra are collected in 0.4 s. 1280 spectral points are acquired, i.e. E=640. An FFT operation requires as little as 2.825 µs while correlation takes up to 9.2 µs. If linearization of data is needed, then an A-scan is obtained in 69 microseconds and an en-face OCT image only after the cut of the volume (0.22 s), which leads to a time of 3.5 s.

Performing two FFTs (when the masks stored are already FFT*s) to implement correlation is obviously longer than a single FFT, but much shorter than the time required for linearization plus FFT. This determines a net advantage of the method presented here. The one frame volume was acquired in 0.4 s. Then, the production of each en-face image using the MSI method takes 368 ms. This leads to a time to produce an en-face OCT image using the MSI method of 0.768 s.

To produce 200 cuts, the prior art method required 47.48 s and the MSI method needed 74 s. If graphic processing cards would be used, with parallel processing, such as via a compute unified device architecture (CUDA) platform, NVIDIA, then all 200 calculations would reduce the time to that required for a single calculation, to an estimated 0.62 s for the FFT based SDI and 0.4 s for the MSI method.

Because the A-scan is produced by parallel comparisons (correlations), it takes long. However, using P=640 processors in parallel, an A-scan can be produced using the MSI method in the time for a single comparison step (correlation) of 9.2 us, comparable with the time achieved by the FFT based priori art of 2.825 us.

All these numerical values demonstrate that the MSI based OCT can be implemented in principle with similar acquisition and processing time as the prior art, however with no need for calibration and linearization. Also, the MSI method and MSI set-ups allow a quicker production of an en-face OCT image In top of this, other advantages have been demonstrated in FIGS. 18-21, as well as cost reduction.

TABLE 1

| | | | | | | | |
|---|---|---|---|---|---|---|---|
| | | | | | | 1 En-face image | 200 En-face images |
| | | | | 1 | | (acqusitions + | (acqusition + |
| | | | | En- | | FFT + | FFT + |
| | | | | face | 200 | Interpolation + | Interpolation + |
| Time | Acquisition | FFT | Interpolation | Cut | Cuts | 1 cut) | 200 cuts) |

Prior art (FFT based Spectral Domain Interferometry based OCT using ProgFFT)

| Time | Acquisition | FFT | Interpolation | 1 En-face Cut | 200 Cuts | 1 En-face image | 200 En-face images |
|---|---|---|---|---|---|---|---|
| A-scan | 10 us | 2.825 us | 69.175 us | 221 ms | 44.2 s | 3.501 s | 47.48 s |
| B-scan | 2 ms | 565 us | 13.835 ms | | | | |
| Volume | 400 ms | 113 ms | 2.767 s | | | | |

| Time | Acquisition | Correlation with one mask | A-scan (1 CS acquisition + 640 correlations) | B-scan (200 CS acquisitions + 200 × 640 correlations) | 1 En-face image (4000 CS acquisitions + correlation) | 200 En-face images (acquisition + 200 correlations) |
|---|---|---|---|---|---|---|

Master/Slave Interferometry based OCT, where the comparison consists in correlation evaluated using 3 FFTs (ProgCorr)

| | | | | | | |
|---|---|---|---|---|---|---|
| 1 CS | 10 us | 9.2 us | 5.881 ms | 1.179 s | 768 ms | 74 s |
| 200 CS | 2 ms | 1.84 ms | | | | |
| 40,000 CS | 400 ms | 368 ms | | | | |

Master/Slave Interferometry based OCT, where the comparison requires time for 2 FFTs with the third FFT stored (ProgCorr')

| | | | | | | |
|---|---|---|---|---|---|---|
| 1 CS | 10 us | 5.25 us | 3.881 ms | 0.674 s | 610 ms | 42.4 s |
| 200 CS | 2 ms | 1.05 ms | | | | |
| 40,000 CS | 400 ms | 210 ms | | | | |

Master/Slave Interferometry based OCT, where the comparison consists in correlation evaluated through a limited number of multiplications (W = 11) in equation (18) (ProgMult)

| | | | | | | |
|---|---|---|---|---|---|---|
| 1 CS | 10 us | 2.3 us | 1.472 ms | 0.296 s | 493 ms | 19 s |
| 200 CS | 2 ms | 0.46 ms | | | | |
| 40,000 CS | 400 ms | 93 ms | | | | |

Correlation with one mask for different number of delay steps W in equation (18)

| | W | | | | | |
|---|---|---|---|---|---|---|
| | 0 | 3 | 11 | 11 | 51 | 101 | 2001 |
| Time (μs) | 0.85 | 0.95 | 2.3 | 4.0 | 9.0 | 17.9 | 34.5 |

Experimental Demonstration of Full Axial Range

To experimentally demonstrate the full axial range capability of the MSI method, dispersion was inserted in the system presented in FIG. 17 by making the optical fibre 211 in the object arm much longer and compensating for its wave path length with a corresponding air path in the reference arm by translating 45. The extra fiber makes for the block 80. The reduction of the mirror terms hence full axial range imaging, is possible due to the unbalanced dispersion that makes the channelled spectrum modulation for positive OPD different from the channelled spectrum for the same modulus of OPD, but negative and presence of the modulation even for OPD=0. This is illustrated in FIG. 22. FIG. 22a shows the channelled spectrum for positive OPD, FIG. 22b for OPD=0 and 22c for the same modulus of the OPD used in FIG. 22a but negative. The three channelled spectra were produced using a high reflective object, so they can be used as masks $M_p$, (p=−1, 0, 1 in this case) to produce en-face images corresponding to the three OPD values. A conical shaped object was used for imaging. The tip of the coin was approximately placed near OPD=0. Three en-face images obtained using the masks from FIG. 22a-c are shown in FIG. 22d-f. The correct (real) images are 22(d, e) while 22f is the mirror image of 22d. It is clear that 22f is less bright than 22d. For the extra amount of fibre (4 m) added to 211, the mirror terms were reduced by a factor of 20. This number represents how different the shapes in FIG. 22 a-c are, while comparison of each mask shape with itself gives maximum.

Master Slave OCT Used in Generation of Cross Sections (B-Scans)

The embodiment in FIG. 23 implements a flying spot OCT system according to the embodiments in FIG. 8 or FIG. 8', that uses a swept source 12, equipped with only one transversal scanning in the scanning head, 511, instead of two. This details how the embodiments in FIG. 8 or FIG. 8' can be also used to produce B-scan OCT images only. For each position, h, of the X-scanner 511, along the T-scans in the final B-scan image at the bottom, an A-scan, $A_h$, is obtained from P points, produced by signal 8(1), 8(2) and so on, 8(p), in parallel. This is done for all positions, h, of the flying object beam, where h=1, 2, ... H, as determined by the angle of the scanner 511. The B-scan OCT image is formed from H A-scans, $A_1$, $A_2$, ... $A_h$, ... $A_H$ obtained for all H positions of the transversal scanner 511. The P points on each A-scan are delivered by P comparison blocks 64, comparing the current channelled spectrum signal, 60, delivered by photo-detector 63, with the stored versions of the channelled spectra in the memory storage block 7, inside the digitizer 90. Seen differently, the final B-scan image can be considered as containing P T-scans, for P depths, each T-scan produced using signal 8(p). P such T-scans are generated, with T-scans made from signals acquired for all points H within the lateral size of the B-scan image, $T_1$ from all H signals $8_{allH(1)}$, $T_2$ from all H signals $8_{allH(2)}$, $T_p$ from all H signals $8_{allH(p)}$, and $T_P$ from all H signals $8_{allH(P)}$.

Seen differently, for each position h of the 511 X-scanner, points are created on each of the scan lines $T_1$, $T_2$, ... $T_p$ with signals 8 from all P comparison blocks 64, for each tuning event of the swept source 12, for a full swept range. The line 13' from swept source 12 towards the final production of the B-scan signifies the tuning step, h, for each pixel h, from 1 to H along the T-scans, of period $T_{SS}$. Parallel processing as disclosed above provides P image points in parallel, for each pixel h from 1, 2, to H addressed by the scanner 511, completing an image point on each T-scan, in total P such points, a point on each T-scan, for each position h of the 511 scanner. If tuning takes place in $T_{SS}=T_Z=10$ microseconds, then a B-scan of H=1000 pixels is created after $T_H=HT_{SS}=10$ ms. This is obviously the time for a full scan of the line scanner 511 over the lateral size of the object 3. Then, some time is required for parallel processing of the P signals, 8(p), for each tuning step out of total H tuning steps.

Alternatively, the masks 7 can be replaced with masks 7' and the comparators 64, based on correlation, with comparators based on two FFTs as in FIG. 8'

FIG. 23' discloses a detailed diagram of an embodiment to generate cross section B-scan OCT images using a broadband source 11 and a spectrometer, 61, made from a collimating lens 611, a diffraction grating in transmission 612, focusing element 613 and a linear array of photo-detectors 614, a CCD or a CMOS linear camera, similar to the embodiment in FIG. 7 or 7', but here having a single scanner 511 only. The splitter 2 is implemented in fibre, using a directional coupler, as known in the art, with fibre along the object arm, 211, and the reference path is equipped with focusing element 41 to collimate the reference beam towards mirror 4 on translation stage 45. A download of the charge in the linear camera 614 provides the channelled spectrum measured signal, 60, for each position, h, of the X-scanner 511.

Let us say that the transfer of charge from the CCD or CMOS camera 614 takes place in $T_{Sp}=T_z=10$ microsecond, for H=1000 pixels along the T-scans, the time for a B-scan is the time for a full scan of the line scanner 511, $T_H=N_HT_Z=10$ ms. For each position h, P imaging points belonging to P T-scan lines are provided, from P depths, as delivered for each depth, p, by each comparison block (correlator) 64, signal 8(p). H channelled spectra 60 are acquired for each of the H pixels along the T-scan lines, each channelled spectrum 60 providing signal for P points along each A-scan $A_h$ in the B-scan final image, a point image on each T-scan, for each h pixel. The dashed line 13 from the camera 614 towards the final production of the B-scan signifies the reading of camera step, h, for each pixel h, from 1 to H along the T-scans, of period $T_{Sp}$. Parallel processing as disclosed above provides P image points in parallel, for each pixel h from 1, 2, to H addressed by the scanner 511, completing an image point on each T-scan, a total of P points, a point on each T-scan, for each position h of the 511 scanner.

Alternatively, the masks 7 can be replaced with masks 7' and the comparators 64, based on correlation, with comparators based on two FFTs as in FIG. 7'.

In FIGS. 23 and 23', in case the data is placed in a memory 30, the memory is subsequently read in synchronism with the masks in 7, synchronism secured by 13'. The operation of the two embodiments in FIGS. 23 and 23' is identical, where for each pixel h in transversal section of object 3, either the swept source 12 is swept in FIG. 23 in time $T_z$ or the linear camera 614 in FIG. 23' is read in a similar time $T_z$ according to the numerical examples above.

It should be obvious for those skilled in the art to add another transversal scanner, 512, to the detailed embodiments in FIGS. 23 and 23', to collect a whole volume of data, in which case C-scan (en-face) OCT images can also be acquired.

In comparison with the prior art spectral domain technology, the embodiments in FIGS. 23 and 23' present the important advantage of delivering the B-scans with no need for data calibration. When the set-ups are equipped with dual transversal scanners, a second advantage gained in comparison with prior art is that of direct and quicker production of en-face OCT images, as demonstrated using the embodiment in FIG. 17, where the scanning head 51 is equipped with two transversal scanners 511 and 512.

It should be realised that in FIG. 23 and FIG. 23', if only a single T-scan was targeted from a certain depth, then the basic MSI embodiment in FIG. 4(a) could have been used.

FIG. 24 discloses two methods of producing T-scan based B-scan images. (a) The channelled spectra are first acquired and stored in memory 30. A T-scan $T_p$ is obtained by comparing H versions of the channelled spectra 60, in their digital form, 60d(h), with h=1, 2 ... H, corresponding to the H positions of the galvo-scanner GX ($CS_1$, $CS_2$, ... $CS_h$, ... $CS_H$) with a mask $M_p$ corresponding to the depth p, 70(p). A comparison block 64(p) is used sequentially or H comparison blocks 64 are used in parallel to compare the mask $M_p$ with the components of acquired CS signal, 60, for all H pixels along the T-scan. (b) On the fly procedure of producing A-scan based B-scan images. An A-scan is obtained by comparing each channelled spectrum 60d(h), as acquired, for each pixel h, $CS_h$, signal 60d, with all P masks corresponding to different depths, p, master reference signal 70. The procedure is then repeated for all H pixels.

FIG. 24' discloses two more procedures of producing T-scan based B-scan images. (a) The channelled spectra are first acquired and stored in memory 30. A T-scan $T_p$ is obtained from H reflectivity points, each obtained by performing an inverse FFT of the product of the FFT of the channelled spectrum corresponding to an h position of the galvo-scanner GX ($CS_1, CS_2, \ldots CS_h, \ldots CS_H$) with the FFT* of the mask $M_p$ corresponding to the depth p, 70'(p). A comparison block 64'(p) is used sequentially or H comparison blocks 64' are used in parallel to work out the correlation of mask $M_p$ with the components of acquired CS signal, 60, for all H pixels along the $T_p$-scan. (b) On the fly procedure of producing A-scan based B-scan images. An A-scan is obtained from P reflectivity points, each obtained by performing an inverse FFT of the product of each FFT of the channelled spectrum, as acquired, for each pixel h, $CS_h$, signal 60, with each mask, corresponding to different depths, master reference signal 70'(p).

Both embodiments disclosed in FIGS. 23 and 23' above and procedures disclosed in FIGS. 24 and 24' are compatible with 1D scanning heads used in OCT endoscopy.

FIG. 25(a) illustrates a probe head for OCT endoscopy, where the endoscope tip is connected to the object fibre 211 and along the fibre 211, a wire 212 carries electrical signal to drive the scanning head equipped with a transversal scanner 511. These probe heads replace the scanning head 511 in FIG. 23 and FIG. 24 with a fibre solution, which can be rolled inside a protective endosheath or into an endoscope channel. For example, the fibre 211 can be oscillated inside the cylinder probe, 213, by magnetic interaction, where a miniature electromagnet on the fibre 211 oscillates between tiny magnets. Alternatively, piezo interaction and a piezo tube can be used. The electromagnetic or piezo interaction determines the fibre end 211 to vibrate in front of the lens 214. In this way, a line is projected over the object 3, covering H pixels. Such probe heads can be used for forward scanning to produce B-scan OCT images from the internal tissue, in the same way as described above in connection with the embodiments in FIGS. 23 and 24. MEMS devices can also be employed to move the fibre end laterally, or two such MEMS can be employed to ensure 2D raster scanning as in FIG. 17. Such tiny devices can replace the galvo-scanners normally used in OCT ophthalmology.

FIG. 25(b) illustrates the B-scan image formed from A-scans, $A_h$, each consisting in P points, delivered in parallel by embodiments of the present invention, such as disclosed in FIGS. 23 and 23'. By connecting all points h=1 to H for each depth p, T-scans, T(p) can be identified, a T-scan at each depth p.

Magnetic interaction can also be provided by a large oscillating or rotating magnetic field produced by a NMR machine, from outside the body. In this case, there is no need of internal electromagnets, but only of a miniature magnet placed on the fibre 211. The object 3 is now an organ within the human or animal body to be imaged. After each repositioning on yet another lateral pixel, h, the swept source 12 in FIG. 23 or the camera 614 is read in FIG. 23'.

Alternatively, as shown in FIG. 25(c), a rotating shaft (using means known in the art) can be used to rotate the fibre 211 and its end, equipped with a GRIN lens, 215 and a tiny prism, 216. This scanning head is typical for scanning tubular structures, such as vessels, arteries and veins as object 3. For each angular position of the deflected object beam, which defines the position of the lateral pixel, 1, 2, . . . h, . . . H, P masks (memories), 7 or 7', provide signals for P comparison blocks (correlators) 64 or 64' in 91, according to strategies presented in FIGS. 24 and 24' respectively. In this way, P points of each A-scan, $A_h$ are placed in the B-scan image. By joining all H points for similar p depth values, a circular T-scan can be identified, as shown in FIG. 25(d).

Using the scanning heads in FIGS. 25(a) and (c), Master-Slave OCT endoscopy can be performed based on the MSI method according to the invention, where the channelled spectrum provided by the OCT interferometer is processed via comparison blocks 64 (64') providing a plurality of P signals per A-scans and not by using the prior art based on FFT providing a single signal per A-scan. The construction of B-scan OCT images from the parallel provision of signals is shown in FIG. 25(b) and FIG. 25(d).

In all the above figures, a B-scan can be made in two ways. If the P comparators 64 (64') work as fast as the time the beam sits on each lateral pixel h, then A-scans are formed with the P points from different depths, as in FIG. 24(b) and FIG. 24(b)'. If the speed of comparison is not that fast, then all H channelled spectra CS are acquired into a memory, 30, and then processed later, as in FIG. 24(a) and FIG. 24(a)'. In this post acquisition process, again, P comparators can deliver the P points along each A-scans, or the memory is read repetitively and for each reading, a single mask, 7(p) or 7(p)' is used, to provide reflectivities for points from the same depth p, which are then assembled into a T-scan(p). In P readings of the storage, P T-scans are produced.

In order to compensate for scanning distortions or flatten the B-scans for curved tissue, a different set of masks, P, can be used for each transversal pixel, h.

Full Field Embodiments

Embodiments of the invention in FIGS. 3'(b) can be implemented in practice by replacing the beam scanning with cameras. Linear or 2D cameras can be used.

FIG. 26 presents an embodiment according to the invention, to implement 1D full field imaging using a swept source, 12, and a linear array of photo-detectors 630 (a linear CCD or a CMOS linear array) to produce B-scan OCT images. Here the linear array of photo-detectors 630 is used to replace the lateral scanning using scanner 511 in the previous embodiment in FIG. 23. The full-field configurations are not compatible with fibre optics, therefore bulk optics is employed. A converging element 521 is used to collimate the beam. A line is projected on the object 3, using a cylindrical lens 522 and a converging element 523, then the signal from the line on the object is redirected via the splitter 2 towards the linear array of photo-detectors 630. The converging elements, for instance spherical lenses, 523 and 524 are used as a telescope to project the line from the object 3 on camera 630. Similarly, lenses 524 and 525 project the line from the reference mirror 4 to interfere with the line from the object, on the linear array of photo-detectors 630.

Each photo-site or photo-detector, 630(h), where h=1 to H, acts as a generic pinhole 52 and photo-detector 63 in FIG. 8 which provides the signal to be used according to the MSI method disclosed here, to produce reflectivity data from P depths in the object 3, simultaneously. Because the photo-sites 630(h) are read sequentially, and a line reading for each frequency step of the swept source 12 does not provide the channelled spectrum, the signal is stored in a memory block, 30, for each tuning step. In order to be able to demodulate a channelled spectrum corresponding to P axial depths, at least 2P points of the spectrum need to be read. This means that the swept source 12 is tuned in K frequency or wavenumber steps, where the wavenumber WN assumes K values, 1, 2, . . . k, K, where K needs to be larger than 2P. In other words, the number of steps K should be at least equal to the number of resolved spectral points, $2E = \Delta\lambda/\delta\lambda$. The H photo-sites 630(h) are read for each wavenumber value, so HK values are stored in the memory block 30. Then the memory block 30 is read along the verticals, where column h will provide the digitized version of the channelled spectrum signal $60d_h$ from photo-detector $630(h)$. The signal $60d_h$ is then correlated with P masks to provide P points in depth of the A-scan, $A_h$, for each photo-detector $630(h)$. In FIG. 26, to speed up the process, for each photo-detector site h, P comparison blocks (correlators) 64 and their P filters (windowing blocks) 66 are used in parallel. $64_h$ and $66_h$ are replicated in P versions and they process in parallel the signal $60d_h$, where h=1, 2, ... H, to deliver P points of each $A_h$ scan. Using PH such pairs of blocks 64 and 66, H A-scans are delivered in parallel to synthesise a B-scan OCT image.

The comparison blocks $64_1$ to $64_H$ each contain P comparison blocks, $64_h(p)$ and similarly the window blocks $66_1$ to $66_H$ contain P blocks $66_h(p)$, where p=1, ... P. Channelled spectrum stored in memory $7(p)$ is fed to one of the inputs of all H comparison blocks $64_1(p), 64_2(p) ... 64_h(p) ... 64_H(p)$, while their other input is tied up to signal $60d_h$. Synchronism in reading the masks in the memories 7 is secured by line 13".

For better demodulation, in case dispersion varies from a lateral pixel to the next, possible due to different thickness of lenses in the object arm, then P masks, $7_h$ are recorded in the first stage for each of the P OPD values for each photo-site, $630(h)$. In this way, a set of PH masks $7_h$ are recorded for each lateral pixel h and each comparison block (correlator) 64$_h$, uses its own set of masks, $7_h(p)$.

The inset underneath shows the B-scan OCT image so created, where P points of each $A_h$ scan, from 1, 2 ... h, ... to H are produced by P comparison processes. Equivalently, the B-scans can be seen as consisting from P T-scans organized orthogonally over the discretely sampled H A-scans in P points along their depth. The P T-scans are made from signals acquired for all points H within the lateral size of the B-scan image, a lateral succession of points, from 1 to H, all for the same depth, p=1 to P, with a T-scan, $T_{(p)}$ for each depth p.

If tuning takes place in $T_Z$=10 microsecond, and the linear array of photo-detectors 630 can deliver the H=1000 pixels in a time $T_H$=10 microseconds, then K=2P, with P=1000 points in the A-scans require $2PT_H$=20 ms to acquire all data to be stored in the memory block 30. This determines a much slower tuning rate for the swept source 12 in comparison to the embodiment in FIG. 23, of only 50 Hz, which represents an advantage in terms of the cost of the swept source.

If processing is performed using GPU cards in parallel, the extra time required is that of producing the reflectivity for P points in each A-scan, i.e. the time for a single comparison (correlation) calculation, as all PH comparison (correlation processes) can be performed in the time for a single comparison process. No time needs to be allocated to linearization or calibration like in the prior art.

FIG. 27 describes another embodiment of the apparatus according to the invention, for 1D full field swept source OCT imaging, where the H photo-sites of the array of photo-detectors 630 are read in parallel. In this case, a single sweep of the swept source 12 is sufficient, the sweeping does not need to be repeated for K times as in the previous embodiment in FIG. 25, and much faster display of images becomes possible. A single sweep suffices here instead and also, the sweep can be fast. Let us consider that the tuning speed can be performed in $T_z$=10 microseconds. There is no need of the memory block 30 in this case, and P points of the H A-scans, $A_1, A_2, A_h, A_H$ are all delivered in parallel using CUDA on graphic cards processing or FPGAs, as in the embodiments in FIG. 8' and in FIG. 23. By reading the photo-sites in synchronism with reading the masks from 7, each photo-site delivers the channelled spectrum $60d(p)$ at the same time with all others. This synchronism is ensured by line 13'.

Similar to FIG. 25, the comparison blocks $64_1$ to $64_H$ each contain P comparison blocks, $64_h(p)$ and similarly the window blocks $66_1$ to $66_H$ contain P blocks 6640. Channelled spectrum stored in memory $7(p)$ is fed to one of the inputs of all H comparison blocks $64_h(p)$ while their other input is tied up to signal $60d_h$.

In the embodiment in FIG. 23, H sweeps are required to complete a B-scan, because the H pixels are accessed sequentially by the flying spot object beam. In FIG. 27, a single sweep is sufficient, as channelled spectra for all pixels H are read in parallel and all PH points in the image can in principle be delivered in the short time $T_z$.

FIG. 28 discloses an embodiment of the apparatus according to the invention to perform 2D full field OCT imaging using a 2D camera, 650, and a swept source, 12. An example of prior art OCT based on this principle was published in "Evaluation of the signal noise ratio enhancement of SS-OCT versus TD-OCT using a full field interferometer", published by J. Wang, M. Hathaway, V. Shidlovski, C. Dainty, A. Podoleanu, in Proc. SPIE 7168, 71682K (2009). Here, a collimated beam is formed from the swept source 12 using focusing element 521. Then, the telescope using converging elements 522 and 523 project a circular beam over the object 3, which is projected back via the telescope of converging elements 523 and 524 on the 2D camera 650, while the telescope consisting in the converging elements 525 and 524 project the reference beam on the camera 650 to interfere with the object beam from 3.

The swept source 12 is swept in K step values for the wavenumber WN, and the values are stored for all HV pixels in the camera 650, into a memory block 30, of HV columns of K cells, a total of HVK cell data. The data is acquired frame by frame, into K frames, a frame for each value of the wavenumber, $WN_1, WN_2, ... WN_k, ... WN_K$, of the swept source, 12. This embodiment is equivalent to that in FIG. 26, but this time a 2D camera is used and the object is illuminated not by a line, but by a 2D area spot.

The processing block 91 consists in the memory block 7 for the masks and in HV pairs of comparison blocks $64_{h,v}$ and windowing blocks $66_{h,v}$. The memory 30 accomplishes the function of digitising the signal as well. The synchronism in reading the memory 30 and the stored mask is ensured by line 13'. Each pair of 64 and 66 blocks processes the channelled spectrum $60d_{h,v}$, delivered by each column, (h, v) of the memory 30, by comparing it with the channelled spectrum stored, $M_{h,v}$, in 7, for each pixel in the camera 650. Each such pair of blocks contain in fact P blocks $64_{h,v}(p)$ and $66_{h,v}(p)$, as in FIG. 26 and FIG. 27, for p=1, 2 ... P. To store masks in the memory block, 7, in a $1^{st}$ stage, the object 3 is replaced with a mirror. The data collected in the memory 30 is transferred to a similar capacity memory 7, of HVK cells. In the 2nd stage, both mask memory block 7 and memory 30 are read along the same column indexes, (h, v) in both storages, 7 and 30, under synchronism ensured by line 13". In this way, the channelled spectrum stored as mask in the column (h, v) in the Mask memory block 7 is compared (correlated) with the current channelled spectrum in the column (h, v) in the memory block 30. If parallel processing is employed, then all HV comparison processes can be performed in the time of a single comparison, so the longest time of the process is that of populating the memory 30.

Alternatively, a single column mask 7 is measured in the $1^{st}$ stage, employing a single pixel in the camera 650, subsequently utilized for comparison of all HV acquired channelled spectra, $60_{h,v}$, in all HV columns of the memory 30. This simplifies all the storing process and comparison process.

Such an embodiment can produce C-scan OCT images as well as B-scan OCT images, with no need to linearize the data.

Alternatively, the process of storing the masks uses a tilted mirror as model object. In this way, masks for all necessary depths are collected in one acquisition process with no need to change the optical path difference.

In FIG. 26, 27, 28 above, comparison can be also achieved by implementing 3 FFTs, as in FIG. 8', where 7' replaces 7 and 64' comparison blocks replace 64 blocks.

FIG. 29 discloses another embodiment of the apparatus according to the invention, for 1D full field OCT B-scan imaging, using a broadband optical source, 11 and a 2D camera, 650, which can provide a B-scan with no flying spot scanning. Example of prior art technology using such an OCT configuration can be found in "Line-field spectral domain optical coherence tomography using a 2D camera", by J. Wang, C. Dainty, A. Gh. Podoleanu, published in Proc. SPIE 7372, 737221 (2009). The 2D camera 650 is here placed behind a diffraction grating 612 employed in transmission. A line is projected onto the object 3, using a cylindrical lens 521, covering H pixels along the lateral size of the object, where the object is in pixel to pixel correspondence with the lines in the camera 650. For each photo-site h=1 to H pixel within the line over the object 3, the diffraction grating 612 diffracts the two superposed beams, from object and reference, along the V columns of the 2D array, 650. The diffraction direction is that along the V axis over the camera 650.

The frame from the camera 650 is read fast along the vertical columns of the camera, along pixels v=1, 2, . . . V for each pixel h. The fast digital reading in the digitiser 90($h$) provides a digital version for the channelled spectrum, $60d_h$ for each pixel h. This is similar to the case of having a single line camera 614 providing a channelled spectrum by reading it sequentially, for each pixel h=1, 2 . . . to H using a line scanner 511, like in FIG. 23'. Here, the scanner 511 is replaced by the extra dimension on the reading element, 650. Such an embodiment can deliver B-scan OCT images only. To produce C-scans OCT images, a transversal scanner, 512 can be added to move vertically the horizontal line created by the cylindrical lens, 521, and collect a volume of several B-scans, which subsequently can be software cut.

For more sharpness of the interference signal (channelled spectrum), the collimated beam after 524 is further spatially filtered using a linear slit and another lens (not shown) before the diffraction grating 612, as described in the paper by J. Wang mentioned immediately above.

In FIG. 29, comparison can be also achieved by implementing 3 FFTs, as in FIG. 7', where masks 7' replace 7 and 64' comparison blocks replace 64 blocks.

In FIGS. 26, 27, 28 and 29, comparison in 91 can also be organized using the calculation of correlation via a reduced number of multiplications, as disclosed in FIG. 9.

FIG. 30 shows a flow chart describing a full procedure of simultaneously producing P en-face images of size H×V with the embodiments in FIG. 7, 8, 9 or 28 using stored versions of masks and of channelled spectra for all pixels in transversal section HV. This procedure requires 3 steps:

Step 1: P masks $M_p$ (1≤p<P) are stored in the Mask storage memory 7. This process can be automatized by repeating the measurements using the embodiment in FIG. 10, (for embodiments in FIGS. 7, 8 and 9) by altering the position of the reference mirror 4, so that P masks from P depths are acquired. Noise masks, 7N, may also be captured and stored. For the embodiment in FIG. 28, masks are acquired by using a tilted mirror instead of the object 3. If mirror is perpendicular to the plane of the FIG. 28, then each line of pixels h1, h2, . . . hV will determine a mask for a given depth, for V different depths, recorded versus optical frequency of the swept source 12 (if V<P, or the tilt of mirror as model object does not cover the axial range targeted, then repetition of acquisition of masks for different positions of the mirror 4 is necessary).

Step 2: H×V channelled spectra $S_{h,v}$ (1≤h≤H, 1≤v≤V) are stored in a memory. The h,v values are determined be the voltages applied to the fast scanner (511) and to the slow scanner (512) respectively in FIGS. 7,8 and 9 and by the pixel position on the camera 650 in FIG. 28.

Step 3: P simultaneous en-face images $8_{allH,allV}(p)$ (C-scans), are produced by comparing the previously recorded channelled spectra $S_{h,v}$ with all P masks stored, $M_p$. All the OCT en-face images are created in parallel. Production of signal 8 may also include deduction of noise masks 7N(p), as shown in FIG. 10.

FIG. 30' shows a flow chart describing a full procedure of simultaneously producing P en-face images of size H×V with the embodiments in FIG. 7' or 8'. This procedure requires 3 steps:

Step 1: P masks FFT*($M_p$) (1≤p<P) are stored in the Mask storage memory 7'. This process can be automatized by repeating the measurements using the embodiment in FIG. 10', by altering the position of the reference mirror 4, so that P masks from P depths are acquired. Noise masks 7'N may also be captured and stored.

Step 2: H×V FFTs of the channelled spectra $S_{h,v}$ (1≤h≤H, 1≤v≤V), FFT($S_{h,v}$), are stored in a memory in FIG. 7' or 8'. The h,v values are determined be the voltage applied to the fast scanner (511) and slow scanner (512) respectively.

Step 3: P simultaneous en-face images $8_{allH,allV}(p)$ (C-scans), are produced by calculating products of the previously recorded FFTs of channelled spectra $S_{(h,v)}$ with all P masks stored, FFT*($M_p$) followed by an inverse FFT. All the C-scan OCT images are created in parallel. Production of signal 8 may also include deduction of noise masks 7'N(p), as shown in FIG. 10'.

FIG. 30' is equally applicable to the embodiment in FIG. 28, if the comparison operation is correlation via FFT, where the masks 7 are replaced with 7' storing FFT* of the signal recorded after a complete sweep during the 1$^{st}$ stage of mask recording, and where the comparison blocks 64 are replaced with blocks 64' (containing an FFT of signal delivered by 30 to produce 60' and an inverse FFT of the product of 60' with 7').

In case correction for scanning distortions are needed, or in order to obtain flattened C-scans of curved tissue, the iteration in the loops above over the set of values p may change from lateral pixel (h, v), to the next.

The foregoing disclosure has been presented for the sake of illustration and description only. As such, it is not intended to be exhaustive or to limit the invention to the precise form disclosed.

The comparison operation mostly referred here is the correlation. However, this should not be interpreted as restricting the generality of the comparison operation performed by the comparison blocks 64(p), or when performing correlation via FFT, using blocks 64'(p). Other comparison operations are known in the art and can be performed, without recurring to correlation, and the technology may evolve to achieve recognition of similar channelled spectra patterns using other operations than correlation. Orthogonality of basis elements $CS(OPD_p)$ can be used without correlation. Pattern recognition methods inspired by sparse signal processing, probability measures based on definition of distances between features in multidimensional space can be defined to accomplish the function of comparison. Detection and sensing of similarity can proceed according to many other ways, without deviating from the spirit of the present invention.

Reference was primarily made to electrical signals, 60, being delivered by 6 (61 or 63) and to the master reference signal 70 (70'). Equally, it should be obvious for those skilled in the art, that these electrical signals, 60, 70, or the shapes of channelled spectra they represent, can be translated, for the sake of comparison operation, back into optical format, to be subject for instance to optical correlation.

Reference was primarily made to measurements and imaging in reflection, however measurements and imaging in transmission could equally be performed. The embodiments presented are not exhaustive, have been presented as a matter of example and modifications and variations are possible in light of the above teaching which are considered to be within the scope of the present invention. Thus, it is to be understood that the claims appended hereto are intended to cover such modifications and variations, which fall within the true scope of the invention.

Other modifications and alterations may be used in the design and manufacture of the apparatus of the present invention and in the application of the methods disclosed without departing from the spirit and scope of the accompanying claims.

For instance, reference was made to Michelson interferometers, however any other interferometers in the practice of SDI and SD-OCT can be used, Mach Zehnder, Sagnac, or any others.

In using the memories, as masks for comparisons, it should be obvious that comparison operations for production of an en-face image can use different masks, a mask for each pixel (h, v), to produce curved C-scans or to compensate for known curvature of the tissue. This was explained in conjunction with FIGS. 10 and 10', when using 51, but equally, the procedure can be used in all full field embodiments in FIG. 26-29. Such a procedure may be especially useful in generating en-face OCT images of the retina, which is known that is curved, in order to produce C-scans from apparently flattened retina. Similarly, in embodiments producing B-scans only, the T-scans generated can be curved in depth by performing comparison of channeled spectrum, 60, with masks from OPD values around the main depth targeted by p, ie not with the same mask p, but with some surrounding values. Curvature of object or tissue may be measured or inferred to determine what mask to be used for each transversal pixel (h, v) in the T-scans to be subsequently employed to assemble C-scans or B-scans.

Similar to the flying spot case, detailed in FIGS. 10 and 10', equally in full field embodiments, the model object may consist in a curved mirror, in which case, de-warping of curved objects with the same curvature is achieved by comparison of channeled spectra with such masks for each lateral pixel. In this case, masks $M_{h,v}(p)$ are collected in the first stage, where p does not signify an OPD value but the number in the collection of reference values set for the stage 45 to acquire the P masks.

The optical source can be pulsed. The optical source may also be continuous (CW).

Variations may also include the operation of the invention in diverse areas of sensing and of OCT imaging, especially where there is a need for en-face display, such as in adaptive optics, confocal microscopy and optophysiology.

For those skilled in the art it should be obvious that the set-ups of embodiments in FIGS. 4, 7, 7', 12, 13, 23' and 29 provide a generic description of the SB principle. This should include the case where the two beams, from the object, 3 and from the reference, 4, are conveyed on separate paths towards the spectrometer 61 in 6, to implement Talbot bands configurations of SB-OCT, as disclosed in the U.S. Pat. No. 7,995,207 patent.

Graphics cards and field programmable gate arrays (FPGAs) can be used to perform the comparison operation in parallel on all channels, process and display the data in parallel in combination with central processing units to speed up the investigation, according to progress in programming and development of signal processing interfaces and procedures.

A photo-detector, 63 and a spectrometer, 61 were mentioned as ways of example only. A balanced detector is usually employed in SS-OCT as shown in FIG. 17 as 63 and balance detection can also be employed using cameras in SB-OCT, as described in the paper "Fourier domain optical coherence tomography system with balance detection", *Opt. Express* 20, 17522-17538 (2012), by Bradu, A. and Podoleanu, A. Gh.

The generic description used interchange of the concept of flying spot, involving scanners, with that of full field using 1D or 2D cameras to collect light from pixels in transversal section illuminated at once by the optical source.

When using a master interferometer, the same source as that employed by the slave interferometer was shown in the disclosure. The principles described are equally functional if a different optical source is used by the master interferometer. Even more, different SDI methods can be employed by the master interferometer and by the slave interferometer in the same system, for instance SS in the MI and SB in the SI or SB in the MI and SS in the SI respectively. The process of writing the masks can use a different SD principle than that to be employed by the measuring slave interferometer.

The invention claimed is:

1. A method for spectral domain interferometry of an object using a slave measuring interferometer having a pair of interferometer arms, comprising:
   in a preliminary step, preparing a master reference signal, deposited in a master reference block, wherein the master reference signal comprises a plurality of mask signals $M_p$ with p=1 . . . P for P respective values of the optical path difference in the slave measuring interferometer, the P respective values of the optical path difference corresponding to respective depths in the object, and
   in a second step, acquiring a slave signal proportional to the shape of an optical measuring spectrum at the output of the slave measuring interferometer, with an object placed in one of the slave measuring interferometer arms; and
   comparing the slave signal with each mask signal $M_p$ of the master reference signal delivered by the master reference block in order to recognize the respective parts of the slave signal due to each respective depth in the object corresponding to each respective mask signal $M_p$ of the master reference signal; and
   delivering for each mask signal $M_p$ a signal whose strength is based on the degree of similarity between the slave signal and the mask signal $M_p$ corresponding to the respective optical path difference.

2. The method for spectral domain interferometry according to claim 1 where the comparison method comprises calculating the correlation between the slave signal and each mask of the master reference signal.

3. The method for spectral domain interferometry according to claim 1, wherein the step of comparing comprises mixing of the slave signal provided in the acquisition of the measuring spectrum with each mask of the master reference signal.

4. The method for spectral domain interferometry according to claim 1 where the process of acquiring a slave signal comprises providing a broadband source driving the interferometer and a spectrometer, or providing a narrow band tunable source driving the interferometer and a photo-detector block.

5. The method for spectral domain optical interferometry according to claim 4 wherein the method is used to carry out optical coherence tomography (OCT) to produce en-face OCT images, wherein:

in the preliminary step, signals proportional to the spectra at the slave measuring interferometer output are acquired from a model object containing a mirror, placed in the slave measuring interferometer for P values of the optical path difference in the measuring slave interferometer, values indexed by p=1, 2 ... P and where for each such value, a signal proportional to the channelled spectrum is stored as a mask $M_p$, with p=1 to P, providing the P mask signals of the master reference signal; and in the second step the object replaces the model object and a signal $S_{h,v}$ proportional to the shape of the spectrum at the output of the slave measuring interferometer is acquired for each pixel (h,v) in the two lateral directions across the object, produce a volume of data from the object with the third coordinate the optical frequency, and where the signal $S_{h,v}$ collected for each (h,v) pixel in transversal coordinate, is compared, using a comparison method, with each of the masks $M_p$ of the master reference signal and a recognition result, $C_{h,v}(p)$ is obtained as the signal whose strength is based on the degree of similarity between $S_{h,v}$ and $M_p$, followed by creation of P en-face OCT images, where the brightness in each pixel (h,v) of the en-face OCT image from the depth indexed by p is proportional to $C_{h,v}(p)$ versus (h,v) for each p=1, ... P.

6. The method for spectral domain optical interferometry according to claim 4 wherein the method is used to carry out optical coherence tomography (OCT) to produce en-face OCT images, wherein:

in the preliminary step, signals proportional to the spectra at the slave measuring interferometer output are acquired from a model object containing a mirror placed in the slave measuring interferometer for P values of the optical path difference in the measuring slave interferometer, values indexed by p=1, 2 ..., and where for each such value, a signal proportional to the conjugate Fourier transformation of the channelled spectrum is stored as a mask, $FFT^*(M_p)$, with p=1 to P, providing the P mask signals of the master reference signal; and in the second step the object replaces the model object and a signal S(h,v) proportional to the spectrum at the output of the slave measuring interferometer is acquired for each pixel (h,v) in the two lateral directions across the object producing a volume of data from the object with the third coordinate the optical frequency, and where a Fourier transform of the channelled spectrum is produced, $FFT\{S_{h,v}\}$, followed by multiplication of the $FFT\{S_{h,v}\}$ with the masks $FFT^*(M_p)$, and then followed by an inverse Fourier transform of this product, and obtaining a recognition result, $C_{h,v}(p)$ followed by the creation of en-face OCT images (C-scans), where the brightness in each pixel of the en-face OCT image from the depth indexed by p is proportional to $C_{h,v}(p)$ versus (h,v) for each p=1, ... P.

7. An apparatus for spectral interferometry using a slave measuring interferometer having a pair of interferometer arms, comprising:

a slave measuring interferometer driven by an optical source;

a detecting block configured to detect a signal proportional to the shape of the optical spectrum signal at the output of the slave measuring interferometer;

a master reference block providing a plurality of master reference signals comprising a plurality of mask signals $M_p$ with p=1 ... P for P, wherein each mask signal $M_p$ of the master reference signal is a spectral interferometric signal that corresponds to a respective optical path difference in the slave measuring interferometer, the P respective values of the optical path difference corresponding to respective depths in an object;

one or more comparison blocks arranged to compare the signal at the output of the detecting block when the object is placed within one of the pair of arms of the slave interferometer, with each mask signal $M_p$ of the master reference signal provided by the master reference block configured to select respective parts of the slave signal at each respective depth in the object; and a signal delivered for each mask signal $M_p$ which has a strength based on the degree of similarity between the slave signal and the mask signal $M_p$ corresponding to the respective optical path difference.

8. The apparatus according to claim 7, wherein the one or more comparison blocks are correlators.

9. The apparatus according to claim 7, wherein the one or more comparison blocks are mixers.

10. The apparatus according to claim 7, wherein the master reference block comprises a storage block of P masks corresponding to the $M_p$ mask signals and the apparatus is arranged to synchronously read the detecting block and the P masks in the storage block to provide as many components of the master reference signal, as the number of masks P.

11. The apparatus according to claim 10, where a reflectivity profile in depth in the object is constructed from amplitudes of the P signals delivered by the P comparison blocks.

12. The apparatus for spectral interferometry according to claim 7 further comprising a scanning device and interface optics configured to scan an optical output beam across the object in order to generate P en-face OCT images from P depths in the object as determined by each mask of the P master reference signals.

13. The apparatus for spectral domain optical interferometry according to claim 7, wherein the detecting block includes a linear photo-detector array or a two-dimensional photo-detector array.

14. The apparatus according to claim 7, wherein a dispersing device is placed in one of the arms of the slave measuring interferometer, or different signs of dispersion are induced in both arms of the slave measuring interferometer.

15. The method for spectral domain interferometery according to claim 1, where each mask signal $M_p$ stores a signal proportional to the shape of the spectrum acquired at the output of the slave measuring interferometer, when the object is replaced by a model object, where the model object is a mirror, for different p values of the optical path difference in the interferometer.

* * * * *